Nov. 5, 1963 L. R. BREESE 3,110,013
SUPERVISORY CONTROL AND COMMUNICATIONS SYSTEM
Filed July 11, 1960 31 Sheets-Sheet 1

INVENTOR.
LEMUEL R. BREESE
BY

Nov. 5, 1963 L. R. BREESE 3,110,013
SUPERVISORY CONTROL AND COMMUNICATIONS SYSTEM
Filed July 11, 1960 31 Sheets-Sheet 3

CONTROL STATION

| FIG. 8 | FIG. 9 | FIG. 10 | FIG. 11 | FIG. 12 | FIG. 13 | FIG. 14 | FIG. 15 | FIG. 16 | FIG. 17 | FIG. 18 | FIG. 19 |
|---|---|---|---|---|---|---|---|---|---|---|---|

CONTROLLED STATION

| FIG. 20 | FIG. 21 | FIG. 22 | FIG. 23 | FIG. 24 | FIG. 25 | FIG. 26 | FIG. 27 | FIG. 28 | FIG. 29 | FIG. 30 |
|---|---|---|---|---|---|---|---|---|---|---|

INVENTOR.
LEMUEL R. BREESE

CONTROL STATION

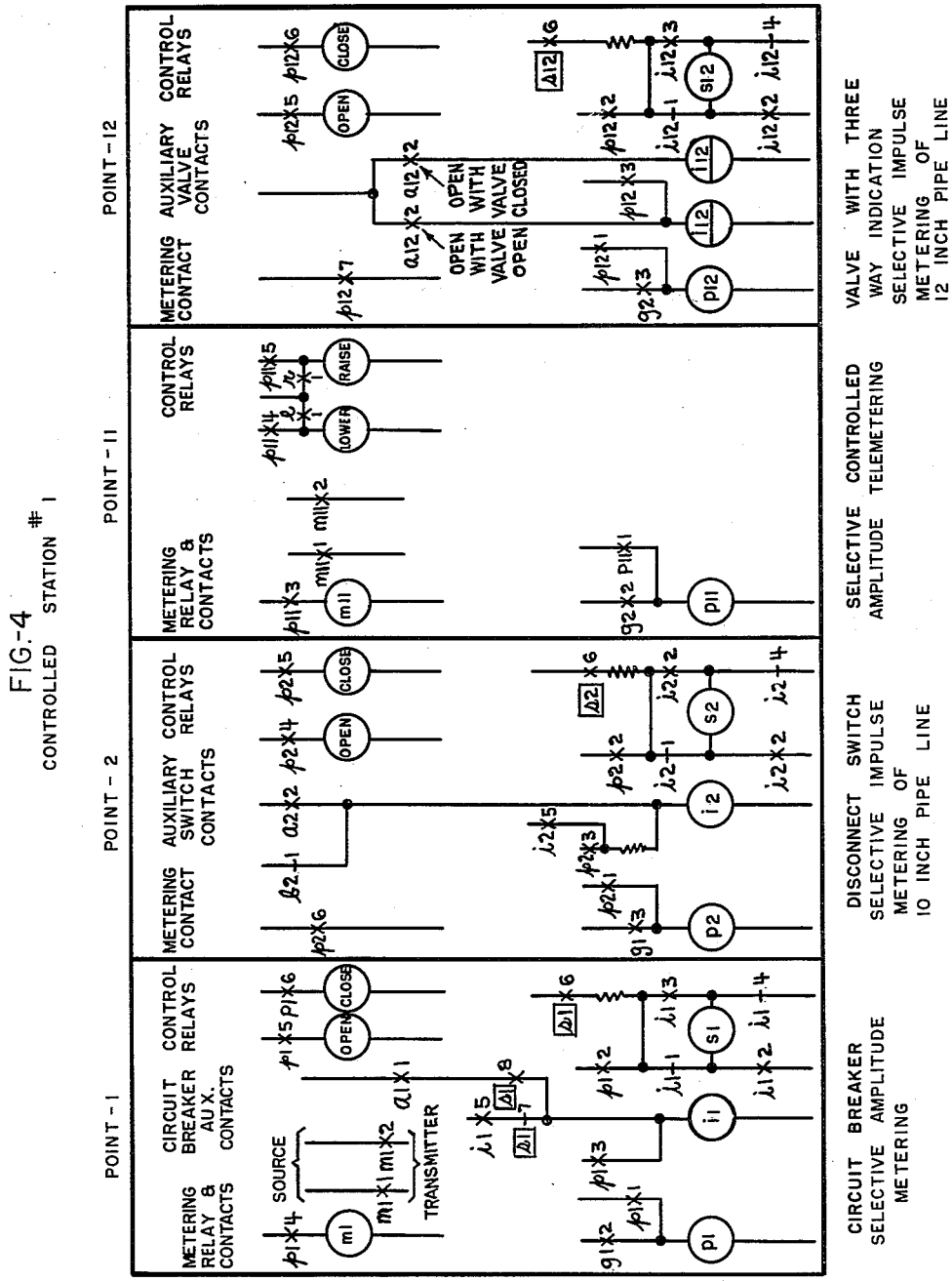

Nov. 5, 1963   L. R. BREESE   3,110,013
SUPERVISORY CONTROL AND COMMUNICATIONS SYSTEM
Filed July 11, 1960   31 Sheets-Sheet 6

FIG.-5A

 FAST RELAY

FIG.-5B

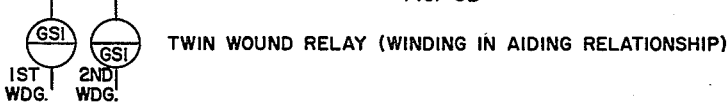 TWIN WOUND RELAY (WINDING IN AIDING RELATIONSHIP)

1ST WDG.   2ND WDG.

FIG.-5C

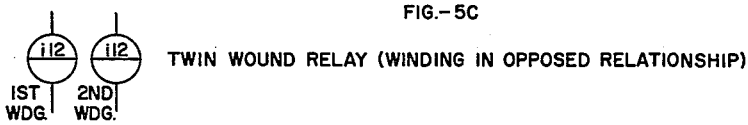 TWIN WOUND RELAY (WINDING IN OPPOSED RELATIONSHIP)

1ST WDG.   2ND WDG.

FIG.-5D

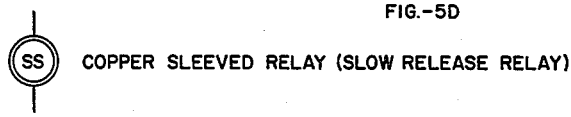 COPPER SLEEVED RELAY (SLOW RELEASE RELAY)

FIG.-5E

 COPPER SLUGGED RELAY (EXTRA SLOW RELEASE RELAY)

FIG.-5F

OS—1   BREAK CONTACTS #1 OF NORMALLY DEENERGIZED RELAY OS.

FIG.-5G

OS✕2   MAKE CONTACTS #2 OF NORMALLY DEENERGIZED RELAY OS.

FIG.-5H

[AR]—1   BREAK CONTACTS #1 OF NORMALLY ENERGIZED RELAY AR.

FIG.-5I

[AR]✕2   MAKE CONTACTS #2 OF NORMALLY ENERGIZED RELAY AR.

FIG.-5J

 TRANSFER CONTACTS.

FIG.-5K

LSA✕3  LSA*   THE SYMBOL "✕" INDICATES MAKE-BEFORE-BREAK CONTACTS.
               FOR EXAMPLE, CONTACTS LSA-3 MAKE BEFORE CONTACTS LSA-2 BREAK
    2          UPON RELAY OPERATION; AND, CONTACTS LSA-2 MAKE BEFORE CONTACTS
               LSA-3 BREAK ON RELAY RELEASE.

FIG.-5L ct✕1   SMALL LETTERS REFER TO CONTROLLED SUBSTATION.

INVENTOR.
LEMUEL R BREESE
BY

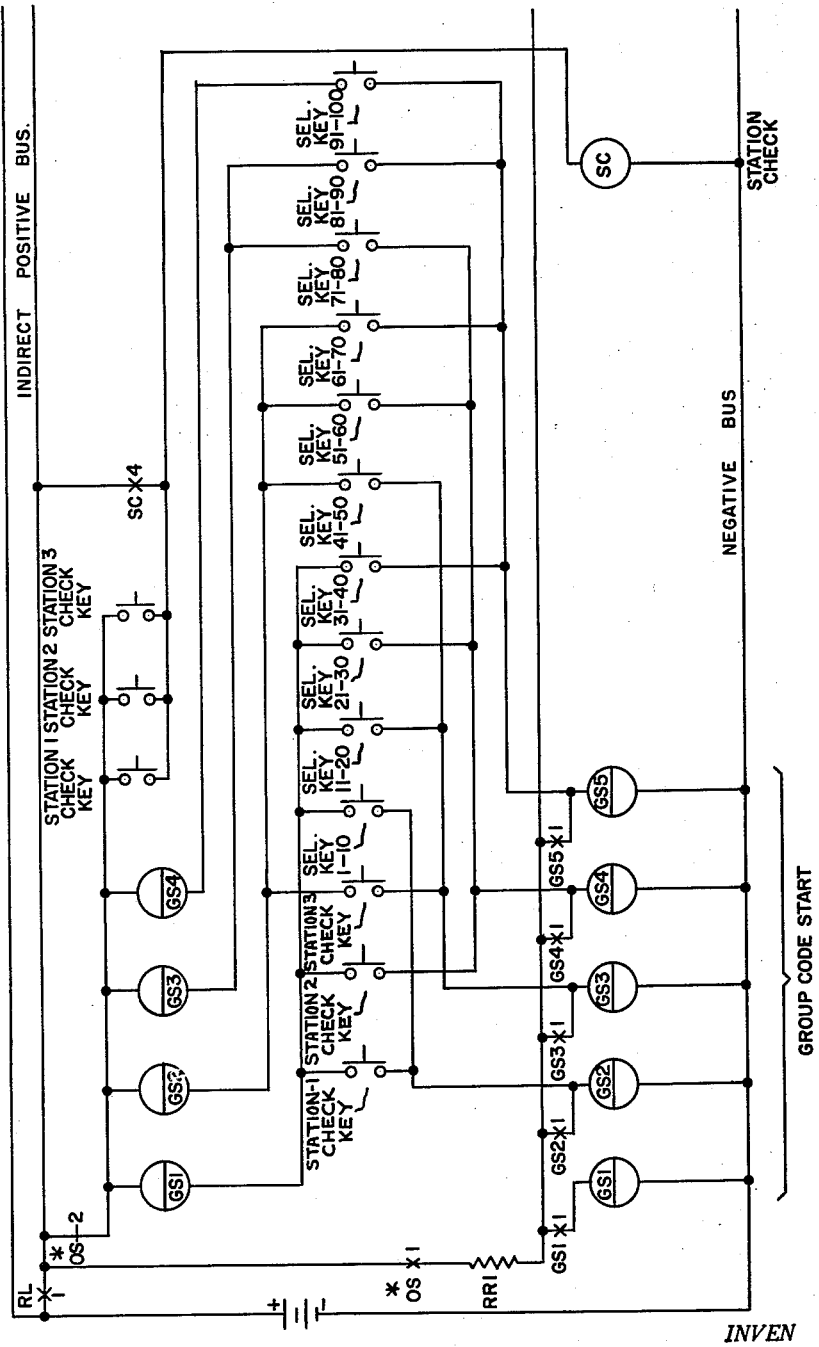

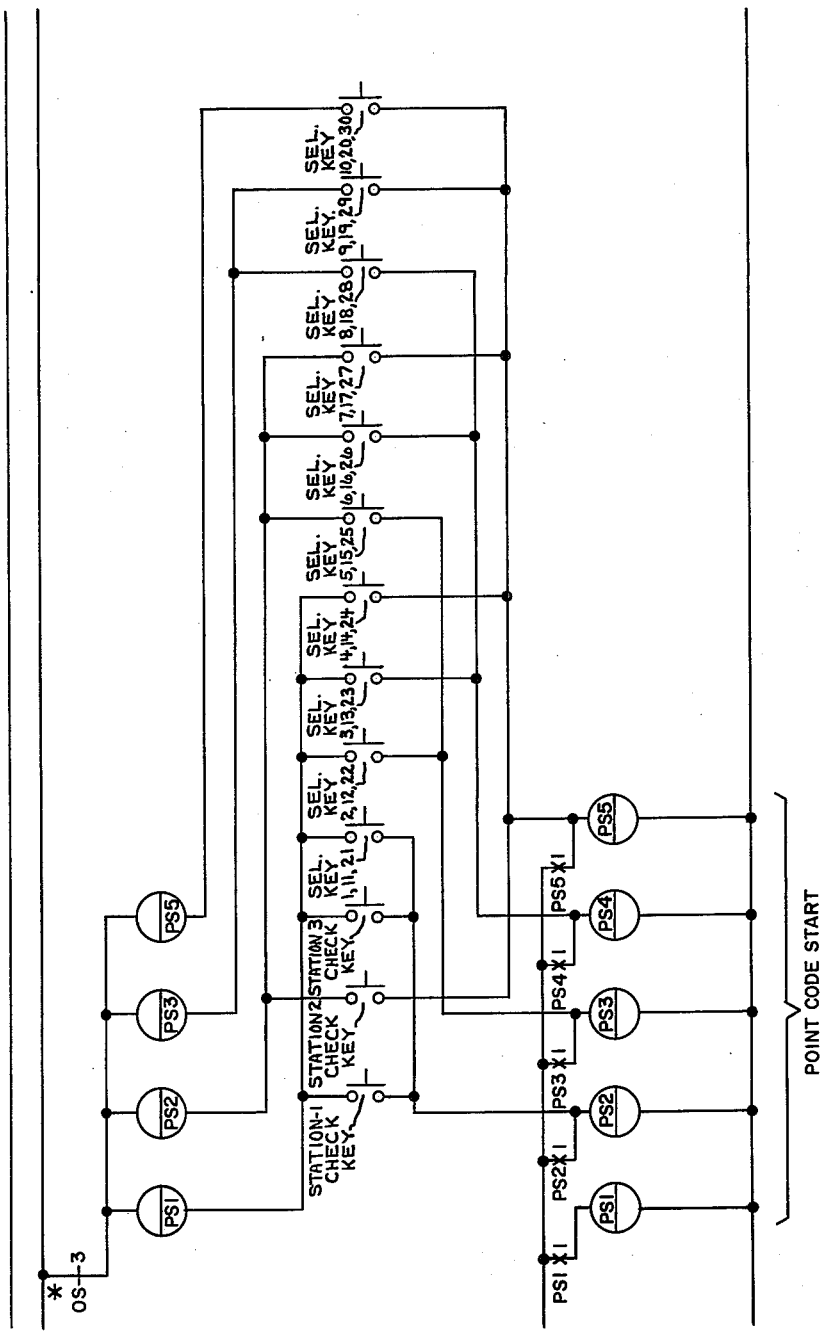

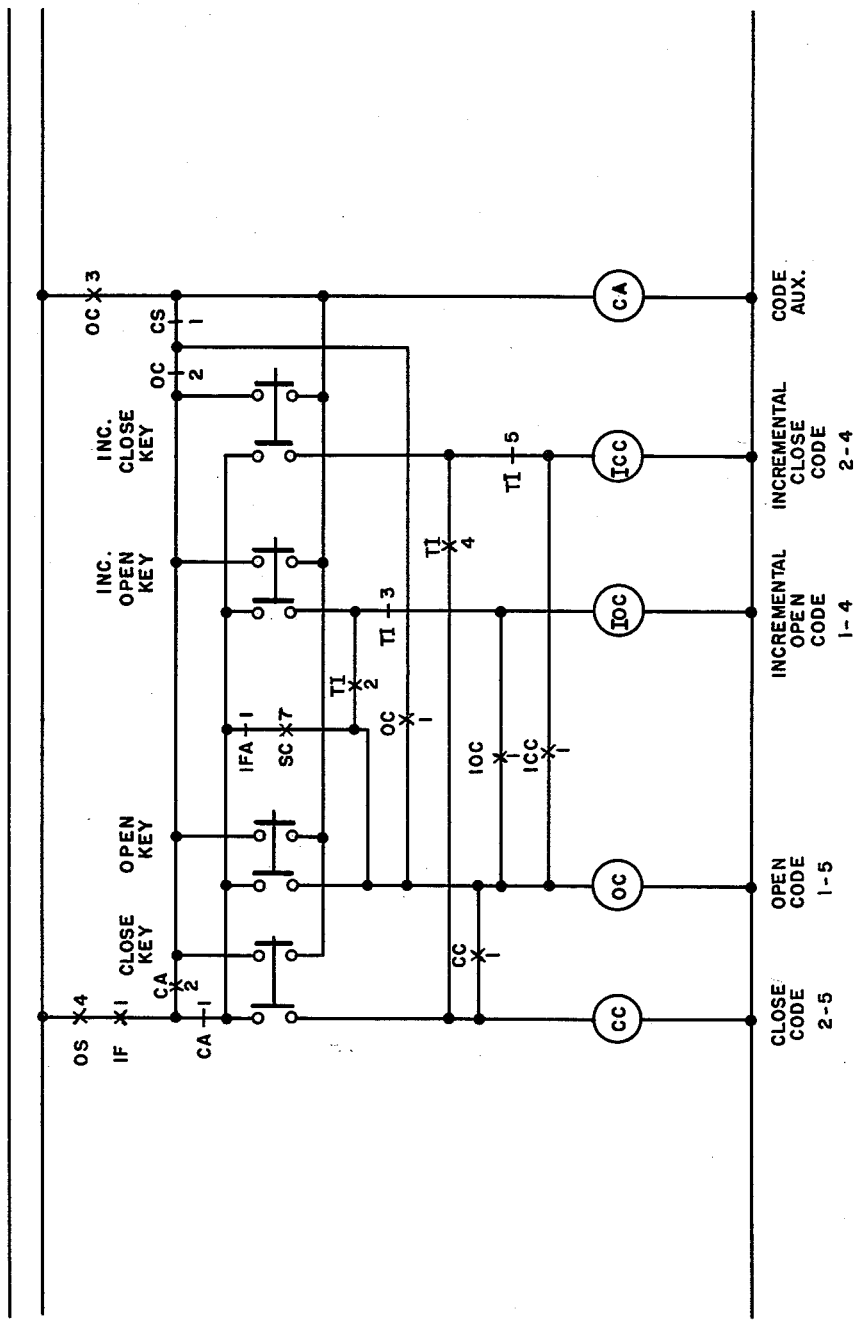

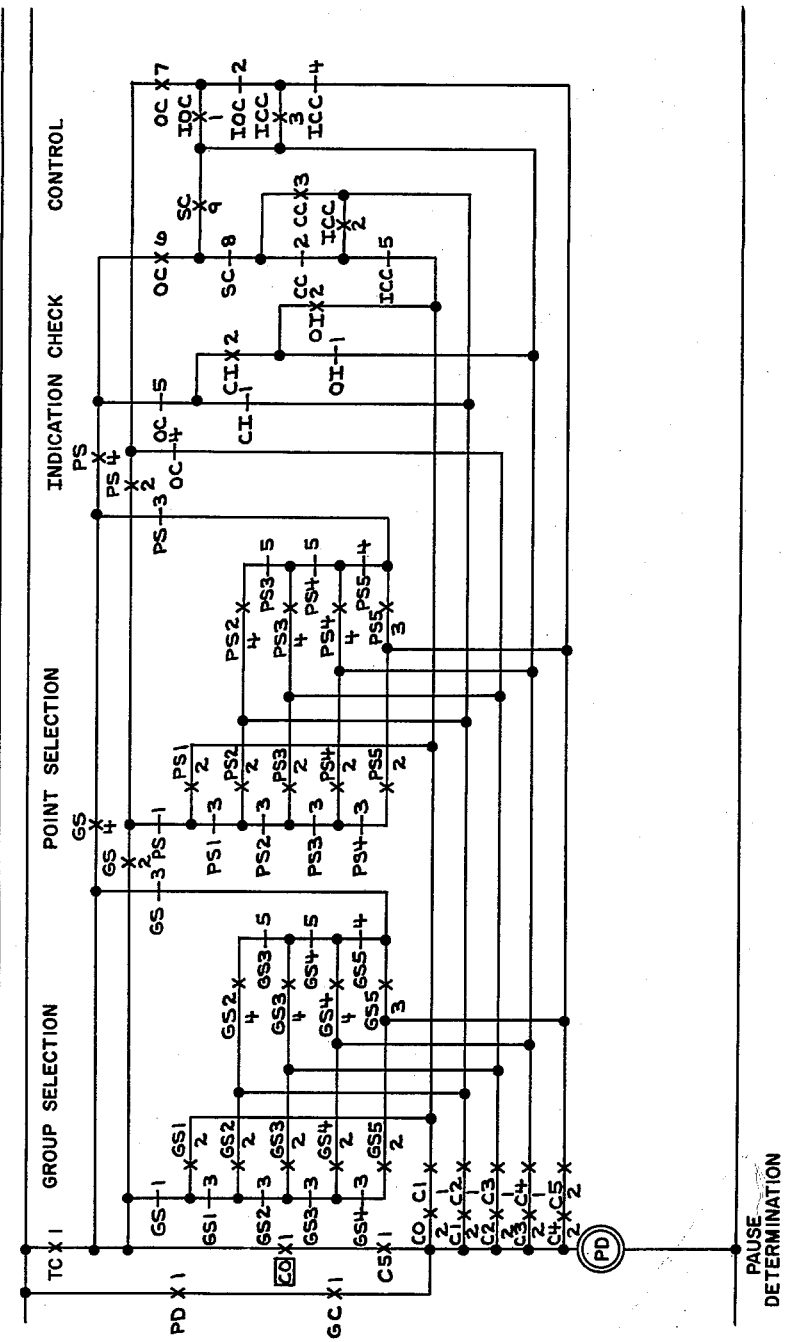

INDICATION FLASHING

COUNTING

Nov. 5, 1963  L. R. BREESE  3,110,013
SUPERVISORY CONTROL AND COMMUNICATIONS SYSTEM
Filed July 11, 1960  31 Sheets-Sheet 19

INVENTOR.
LEMUEL R. BREESE

Nov. 5, 1963   L. R. BREESE   3,110,013
SUPERVISORY CONTROL AND COMMUNICATIONS SYSTEM
Filed July 11, 1960   31 Sheets-Sheet 29

LINE

INVENTOR.
LEMUEL R. BREESE
BY

Nov. 5, 1963 L. R. BREESE 3,110,013
SUPERVISORY CONTROL AND COMMUNICATIONS SYSTEM
Filed July 11, 1960 31 Sheets-Sheet 31
FIG.-32
BASIC CODES
| GROUP OR POINT | CONTROL | IND. | IND. CHECK | |
|---|---|---|---|---|
| 1 | | MID. POS. | | 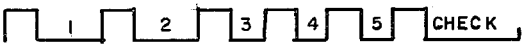 |
| 2 | | | MID. POS. |  |
| 3 | INC. OPEN | | |  |
| 4 | OPEN | OPENED | | 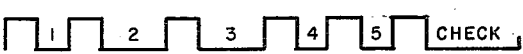 |
| 5 | | | OPENED | 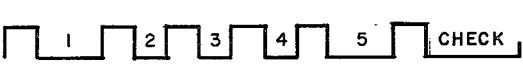 |
| 6 | INC. CLOSE | | |  |
| 7 | CLOSE | CLOSED | |  |
| 8 | | | CLOSED |  |
| 9 | | | |  |
| 10 | STATION CHECK | | | 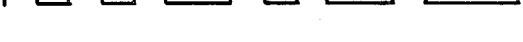 |
*INVENTOR.*
LEMUEL R. BREESE
BY

United States Patent Office 3,110,013
Patented Nov. 5, 1963

3,110,013
SUPERVISORY CONTROL AND
COMMUNICATIONS SYSTEM
Lemuel R. Breese, Galion, Ohio, assignor to North Electric Company, Galion, Ohio, a corporation of Ohio
Filed July 11, 1960, Ser. No. 42,087
28 Claims. (Cl. 340—163)

The present invention relates to a novel supervisory control and communications system, and more specifically to a novel supervisory control system which operates reliably in environments in which severe transient disturbances are experienced.

With the recent trend towards increased automation in the industrial fields, there has been an increasing need and demand for supervisory control equipment which will provide supervision, metering and control functions in the operation of complex distribution systems. In the distribution of electrical power, for example, the power output of an electrical generator station must necessarily be distributed over a transmission network to the ultimate subscribers which may be spread out over an area of several thousand square miles in size. In one of the more common arrangements for effecting power distribution to such subscribers, the power output at the generator station is coupled over one or more primary feeder networks to each of a number of distribtuion substations which are located at different remote points from the main station at points which are best suited to service local subscribers. Substation equipment is in turn operative to convert the high voltage power which is coupled thereto by the primary networks to a reduced value which is suitable for distribution over a secondary network to the local subscribers served by the substation.

It was initially a practice to construct such substations in a manner as to be manually controlled by attendants or operators located at the substation. However, experience has shown that such installations in addition to being expensive by reason of the twenty-four hour attendant maintenance which is required are also subject to an increased number of malfunctions by reason of human error, fatigue and fallible memories. Additionally, since the equipment requires constant maintenance, the substation building and facilities were necessarily of larger size and increased expense, both from the standpoint of original construction and continued maintenance. As a result of such factors, there is a continued trend toward the use of supervisory control equipment which permits one attendant at a central office to control the equipment at each of the remote substations in the distribution of the power to the ultimate user.

It is manifest that in the control of a transmission system of such type in which large values of power occur in different branches of the supervisory system, it is mandatory that the control system which accomplishes such control and supervision must be of an especially high order of reliability, and it is an object of the present invention to provide a novel supervisory system which operates with a high degree of reliability and efficiency, while yet utilizing a minimum of equipment.

The supervisory control systems in addition to having utility in the electrical distribution field, are also adapted for use in the distribution networks for gases, chemicals, water, light, heat, power, petroleum products, and the like. In certain of these installations the extent of automation has become so complete that a single man controls the distribution of the product from the point of production through the distribution system to the ultimate user. In one system, for example, the supervisory control system is operative under the control of a single attendant to provide supervision, control sequencing, telemetering, and computing operations for establishing the generating of natural gas in the field through the production facilities to the field pipe lines and the compressor stations, and over a transmission network to the distribution stations and the ultimate user of the gas. By way of brief example, the attendant in one type of gas distribution system is provided with means for effecting automatic actuation of the wellhead valves and chokes at the wells in the field to produce set allowables on schedule from each well; data logging of production lease-rate computations; fully automatic handling, visual indication and data logging of remote system load and wellhead and intermediate pressures; automatic processing of well stream, product separating and handling; automatic remote control of field measuring and regulating stations; automatic start-stop sequences of remotely located engines and compressors; supervision and vernier control of three-way remotely located valves; automatically controlled discharge pressure at a remote compressor station, and the control of all other variables including engine r.p.m., gas flow, temperature, compression ratios, the number of compressors in operation, and the regulation of the engine operation time; analog and/or digital telemetering of all flow data with automatic computation and logging; remote control of major stations which effect the distribution, measurement and regulation of the supplies to the user; and communications as well as automatic channel fault location and off-normal alarm. These and many other control functions are effected in a single supervisory control system, it being the sole function of the attendant in achieving such control to "press a button" at the control station.

It is apparent from even a brief consideration of such arrangement that the demands of the field are constantly increasing, and the complexity of supervisory control systems progresses in a similar manner. It is an object of the present invention to provide a novel type supervisory system which is especially adapted for use in such type installation and which in such use provides maximum security in operation and an efficient fail-safe and reliable type control.

It is a particular object of the present invention to provide a supervisory control system which includes protection against malfunction from all conditions, including failure of control power supplies of any station, failure of the line wire, carrier channel or microwave link between the stations in the system, or interference of any kind such as which results from a changing voltage caused by induction of lightning adjacent the power lines, switching surges and other similar electrical phenomena.

It is a further object of the invention to provide protection means in a supervisory control station which is operative to detect the occurrence of such faults and to provide automatic reset in the event thereof.

It is another object of the invention to provide a novel supervisory system including at least a first and a second station connected over a communication channel having a plurality of functional units divided into groups and points in a group, each group of points being assigned a different group selection code signal, and each point in a group being assigned a different point selection code signal, each code signal having a fixed number of impulses comprised of marking and spacing elements, and including a number of spaces less than the total spaces in the code which are elongated, the position of the elongated spaces being varied to provide different code signals, and means at the second station operative to select a point thereat only responsive to receipt of the group selection code signal and point selection code signal which have the predetermined number of elongated spaces at the positions assigned to the code for the point, and which have the fixed (and only the fixed) number of impulses in the code, whereby an extremely efficient system is provided for protecting against the introduction of transients into the system.

It is another object of the invention to provide an arrangement which includes means selectively controllable by the attendant at the Control Station to effect the transmission of a novel pattern of signals in the accomplishment of operation of the functional units at the Controlled Station and the reporting operations to thereby eliminate the need for a return check code for each code transmitted, while yet retaining the self-checking features required in a supervisory system having the necessary reliability in operation.

Yet, another object of the invention is to provide a supervisory system in which lockout means at certain of the stations terminate generation of the code by its associated signal generator means whenever an elongated space is generated in a code by the signal generator means during the period that a marking element is generated by the signal means at another station, whereby only one station of the system will be enabled at any given time, and the one of the stations which is transmitting the code having the elongated spaces at the highest order of the code sequence will be given priority.

It is a further object of the invention to provide a novel repeat lockout means at the substations which are operative in the reporting of the change of the condition of the functional units thereat to repeat the generation of the code twice and only twice in the event that the control station fails to return an indication check code in response to one of such transmissions.

It is a further object of the invention to provide a novel system which permits the division of points of a group in the system between different ones of the controlled stations, such arrangement being effected by providing a group selection relay at each station which is operative only as a group selection code is received which identifies a group or a part of a group located thereat, and lockout means which are operated in the event that a station does not include a point in such group, and a point selection relay which is operative only when the station includes the point identified by the code signal, and station lockout means which operate when the point is not located at the station.

These and other objects, features and advantages of the present invention will become apparent with consideration of the following detailed description of a specific embodiment thereof when taken in conjunction with the accompanying drawings wherein:

FIGURE 2b is a more detailed schematic presentation of one of the escutcheon plates for a point on the control panel of FIGURE 2a;

FIGURE 4 is a schematic representation of the components associated with points 1, 2, 11 and 12 at one of the substations;

Figures 6, 7:
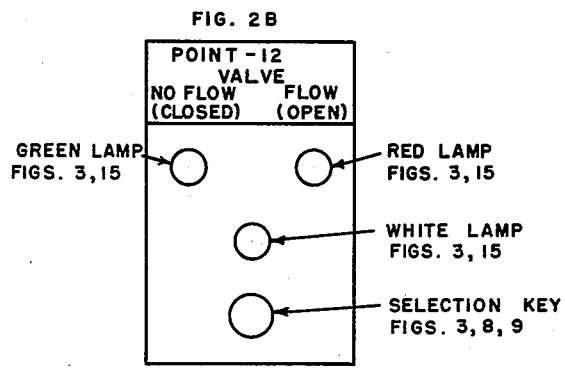
Figure 30:
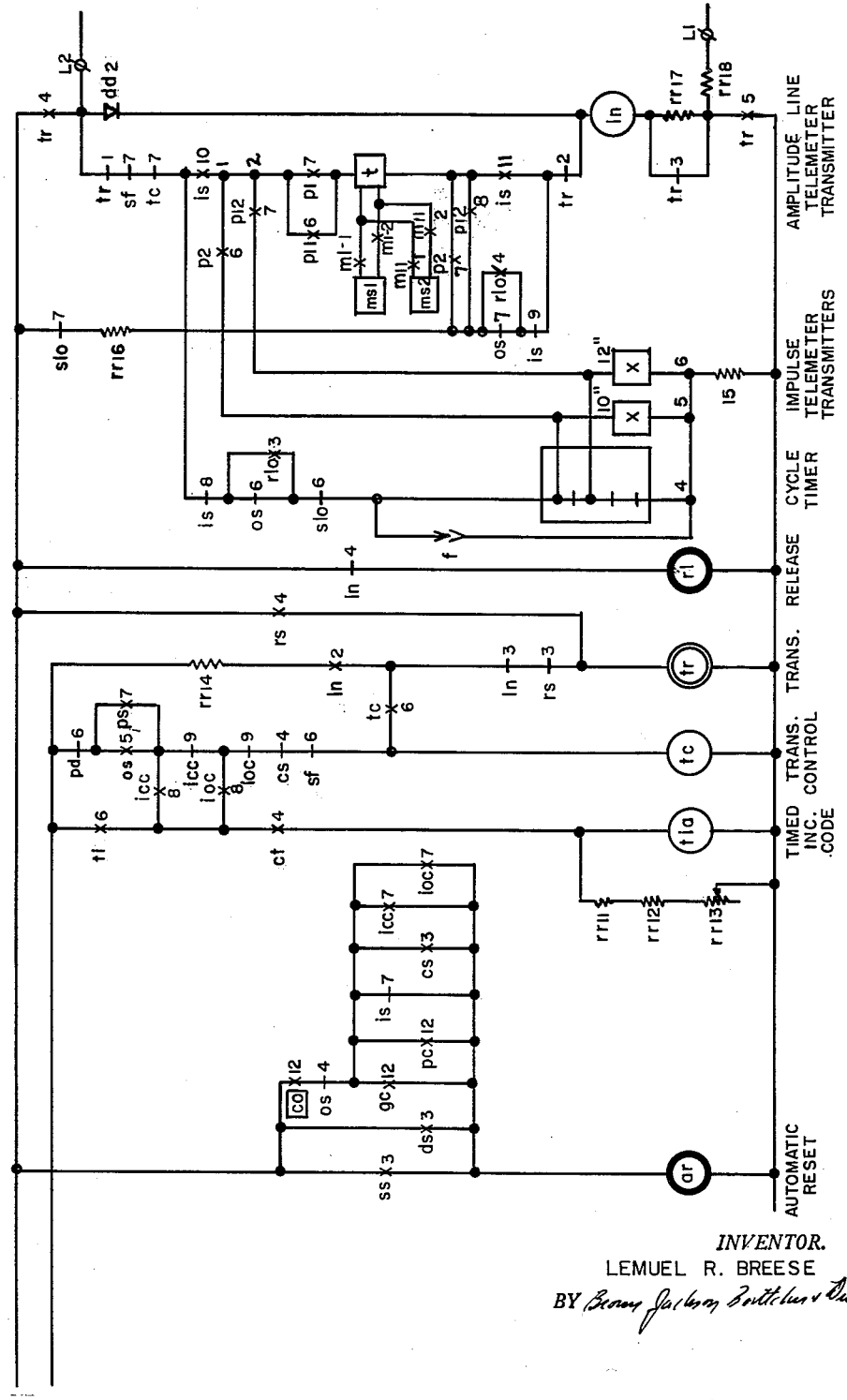
Figure 31:
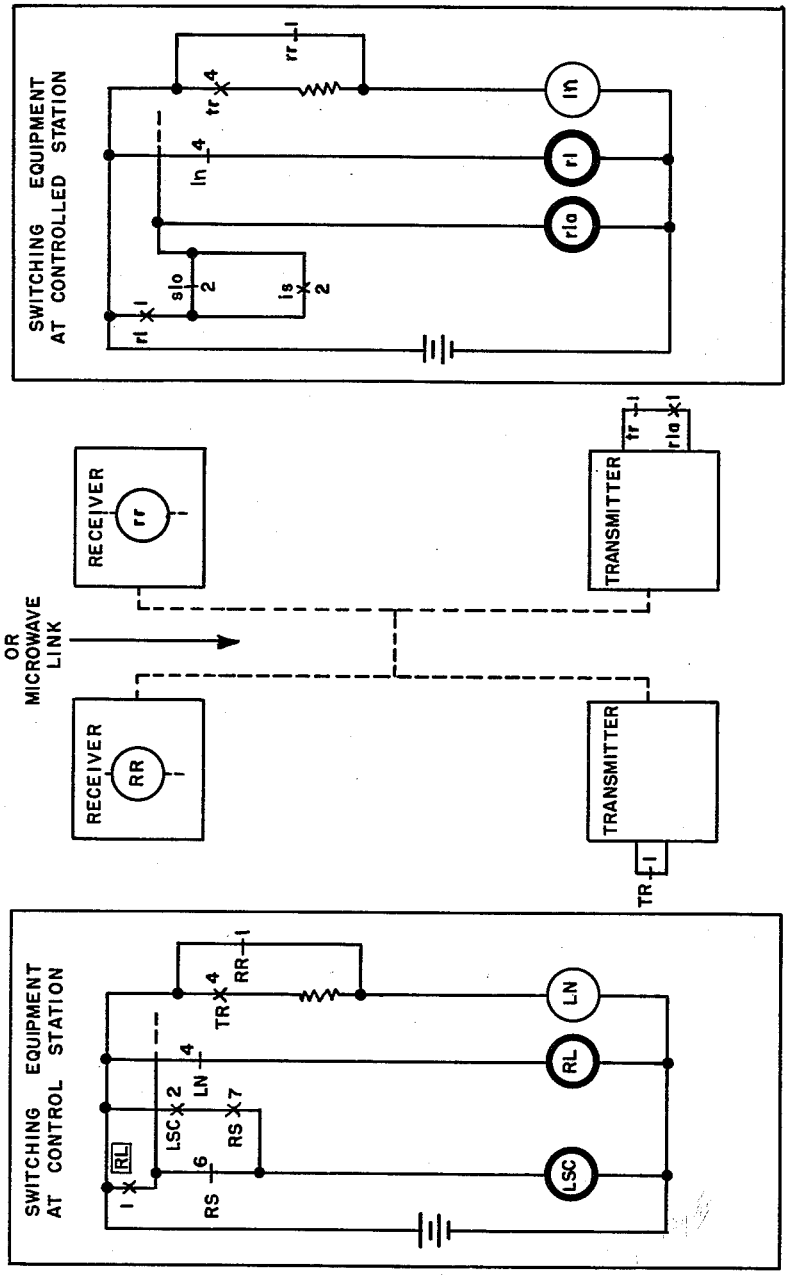

FIGURES 5a–5l set forth the symbolic legends used in FIGURES 6–31;

FIGURE 6 is a schematic block illustration of the manner of assembly of FIGURES 8–19, and set forth the components of the control station of the supervisory system of the invention;

FIGURE 7 is a schematic block illustration of the manner of assembly of FIGURES 20–30, and sets forth the components of the controlled station of the supervisory system of the invention;

FIGURES 8–19 set forth in detail the circuit arrangement and interconnection of the components of the Control Station of the supervisory system;

FIGURES 20–30 set forth in detail the components and interconnection thereof at one of the Controlled Stations or substations of the system;

FIGURE 31 shows the manner in which the stations of FIGURES 8–30 may be adapted for use with carrier, radio, and microwave links; and FIGURE 32 sets forth the pattern of codes generated by the system.

INDEX

Introduction
General Description of System Power Supply
    A. Control Station Relay—Designations and Functions
    B. Controlled Station Relay—Designation and Functions
General Description of System Operating Circuits
    A. Normal At Rest Condition
    B. Line Supervision and Continuous Metering
    C. Transmission of Signals
    D. Pulse Counting Circuit
    E. Code Transmission
    F. Code Registration
    G. Reset
General Description of Station Board Including Keys, Lamps and Meters
Closing a Circuit Breaker on Point 1
Operation of Point Selection Key (FIG. 3)
Group Selection Code—Operations at Control Station
Group Selection Code—Operations at Controlled Station
Point Selection Code—Operations at Control Station
Point Selection Code—Operations at Controlled Station
Open Indication Code—Operation at Controlled Station
Open Indication Code—Operation at Control Station
Operation of Close Key (FIGURE 10)
Close Code—Operation at Control Station
Close Code—Operation at Controlled Station
Closed Indication Code—Operation at Controlled Station
Closed Indication Code—Operation at Control Station
Closed Indication Check Code—Operation at Control Station
Closed Indication Check Code—Operation at Controlled Station
Reset—Operation at Control Station
Reset—Operation at Controlled Station
Reporting a Circuit Breaker Opening on Point 1
Group Selection Code—Operation at Controlled Station
Group Selection Code—Operation at Control Station
Point Selection Code—Operation at Controlled Station
Point Selection Code—Operation at Control Station
Open Indication Code (1–5)—Operation at Controlled Station
Open Indication Code (1–5)—Operation at Control Station
Open Indication Check Code and Reset—Operation at Control Station
Open Indication Check Code and Reset—Operation at Controlled Station
Opening a Disconnect Switch on Point 2.
Reporting a Disconnect Switch Closure on Point 2.
Selective Controlled Amplitude Metering on Point 11
Controlling a Valve on Point 12

*General Description*

Figure 1:
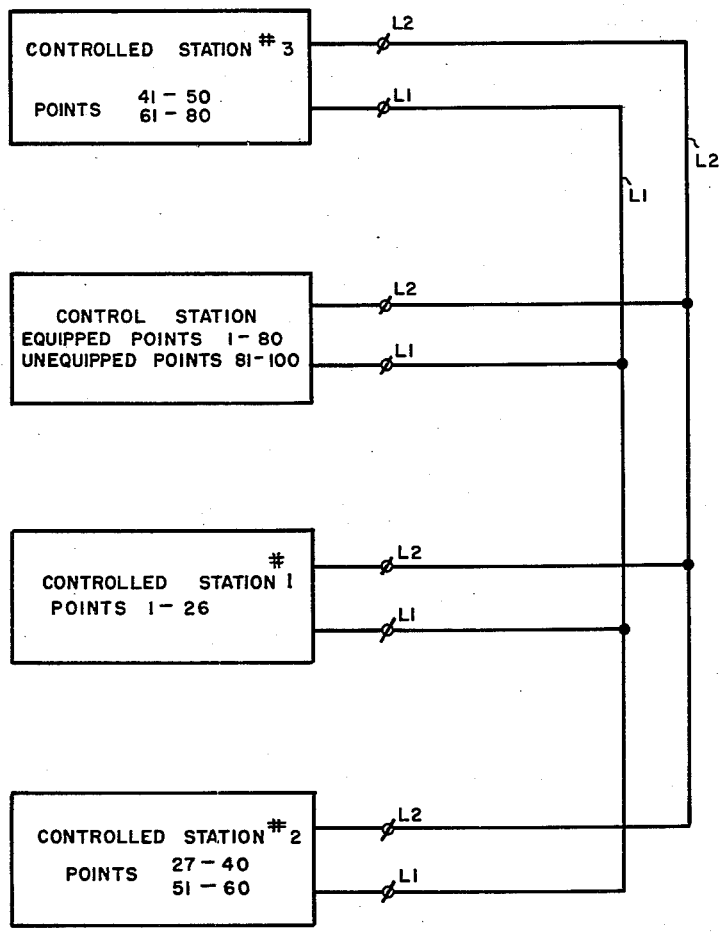
FIGURE 1 is a block diagram of one embodiment of the novel supervisory control system including one control station and a plurality of controlled substations.

The novel supervisory control system basically comprises a master control station and one or more remote or substations which are interconnected by a signal transmission link which may be a line wire channel, a private-line, a power line carrier, a telephone line and carrier, a microwave carrier, a radio space carrier or any other of a number of well known signal transmitting links which may be coupled between the master station and the remote station. In the event that the system includes more than one remote station, the remote stations of the system will be connected in parallel with each other. The manner of connection of the Control Station and Controlled Station is generally shown in FIGURE 1, the Control Station being interconnected with three remote stations over channel means comprising conductors L1 and L2.

The Control Station includes a plurality of groups of control points, each of which groups of points is assigned to control the equipment at corresponding points at one of the remote stations. Thus, in the illustration of FIGURE 1, the Control Station includes points 1–80 which are divided into three groups, the first group including points 1–26 being operative to control the equipment at remote station 1, the second group of points 27–40 and 51–60 being assigned to control the equipment at the remote station 2, and the third group of points 41–50 and 61–80 being connected to control the equipment at the third remote station. A plurality of points 81–100 at the Control Station are maintained in reserve for use in equipping further remote stations as expansion of the system occurs.

Each point as used in the following description designates a set of equipment which is supplied at the master station for the control and/or indication and/or telemetering of equipment which is located at an associated point at a remote station to which the point is assigned. Through the use of common control equipment at each station, the point equipment for one point only in the entire system is connected to each end of the channel within a given time and such pattern is referred to hereinafter as point selection. The interconnection of the equipment for a point at the master station with the equipment for a point at the remote station is accomplished by the transmission of codes of pulses between the master station and the remote stations.

In the novel arrangement of the present disclosure, the pulse codes consist of six marking pulses with five spaces available between the marking pulses, the variation in the different codes comprising the elongation of two out of five of the spaces, different pairs of elongated spaces providing different code signals. Thus, the code pattern basically comprises a two out of five code plus a sixth pulse, and the position of the two elongated spaces in each group is varied to convey the desired intelligence. Each code is checked at the receiving station to insure that there are six (and only six) pulses in a code group, and that there are two (and only two) pauses in the code group. In the event of any variation from such code principles, the equipment is automatically operative to provide suitable protection against improper operation.

In the system of the present disclosure, the pulse codes are transmitted between the stations in a predetermined pattern according to the function to be provided. Thus, in the accomplishment of a control operation by the attendant at the Control Station, the master station transmits a group selection code followed by a point selection code; the remote station returns the indication code; the master station transmits the control code; the remote station returns the indication code; and the control station sends the indication check code followed by the reset signal. In the event of a change of condition of equipment at a point at the remote station, the remote station equipment initiates a pattern of code transmissions to report such change wherein the remote station initially transmits a group selection code, followed by a point selection code, followed by an indication code, and the master station returns the indication check code followed by a reset signal. The transmission of an indication check code by the master station to the remote station provides a check to the remote station which verifies that the report was received at the master station. The reliable self-checking code thus eliminates the need for a return check code for each code transmitted, and thereby reduces the amount of checking equipment which is required, and materially increases the speed of operation of the system.

*General Description of System Power Supply*

The control station and controlled station components are energized by a source of direct current. In the control station the negative and positive poles of the battery (FIG. 8) are connected to the negative and positive buses which extend through FIGURES 8–19, and provide the source of potential for each of the control station components. The direct positive bus is connected through make contacts #1 of normally energized relay RL (FIG. 8) to furnish positive potential to the indirect positive bus which runs through the upper portion of FIGURES 8–19 immediately below the direct positive bus. The coils of the relays of the control station are illustrated by circles (see FIGS. 5A–5E) connected between these positive and negative buses. Control station relays are designated by upper case letters; controlled station relays by lower case letters.

The source of direct current for controlled station #1 is illustrated as a battery (FIGURE 20), the negative and positive poles being connected to the negative and positive bus which extends through FIGURES 20–30. The direct positive bus is also connected through make contacts #1 of normally energized relay rl (FIGURE 27), and thence through break contacts slo–2 and make contacts is–2 in parallel to an indirect positive bus which runs through the upper portion of FIGURES 20–30 immediately below the direct positive bus. With the equipment at rest, contacts is–2 are open and the energizing circuit passes through closed contacts slo–2. The coils of the relays of the controlled station #1 similarly are illustrated by circles connected between positive and negative buses. The circuits of the instant disclosure are of the detached contact type essentially as disclosed in the U.S. Patent 2,923,722, Bell Telephone Laboratories.

As a preliminary aid to the understanding of the system components and a reference guide during perusal of the description of the detailed operation, an initial listing is made of the control and controlled station relays with their abbreviated designations and a brief description of the function thereof in the system.

CONTROL STATION RELAYS

| Relay Designation | Function |
| --- | --- |
| LN—Line Relay | Operates on all supervisory control pulses on the line wire channel, regardless of whether the station is transmitting or receiving. |
| RL—Release Relay | Normally energized, very slow release relay which is de-energized only on a reset pulse. The contacts of this relay connect the indirect positive bus to the direct positive source. |
| SS, SF—Selection Control Relays (Function on incoming codes). | (SS—Selection Start) (SF—Selection Finish). Operate in conjunction with the line relay (LN) when receiving incoming codes. The slow release characteristic of Relay SS permits it to remain energized during a "short" space in the code. However, a "long" space will result in the release of relay SS and the corresponding code register relay will be operated by a break contact of relay SS. |
| TR—Transmitting Relay | Operates through a break contact of relay LN to connect positive and negative buses to line wires operating the line relays at all locations. This alternating operate and release of relays TR and LN forms the pulse generator of the system. |
| TC—Transmitting Control Relay | Operates to energize relay TR for impulse generation. |
| PD—Pause Determination Relay | Operates to insert long spaces in the code by momentarily releasing relay TC. |
| IF, IFA—Auxiliary Point Selection Relays. | (IF—Indication Finished) (IFA—Indication Finished Auxiliary). Operate in series after the indication on a point has been checked and verified. Contacts of relay IF signify that the point is prepared for a control function by lighting the white selection lamp. |
| AR—Automatic Reset Relay | Normally energized slow-release relay which will sense any abnormal pause in the codes and reset the system. |
| AB—Alarm Bell Relay | Operates under alarm conditions to energize the alarm bell. |
| GS, GF—Group Selection Marking Relays. | (GS—Group Selection Start) (GF—Group Selection Finish). Operate in series from Group Selection Relay G1 indicating that the selection code for a particular group has been sent. Relay GS extends its holding positive to relay G1 to maintain the selected group. |

CONTROL STATION RELAYS—Continued

| Relay Designation | Function |
|---|---|
| PS, PF—Point Selection Marking Relays. | (PS—Point Selection Start) (PF—Point Selection Finish). Operate in series from the "P" relay of a point, indicating that the point is prepared for selection pending the receipt of an indication code from the remote station. |
| GC—Group Code Relay | Operates at the end of an outgoing or incoming group code to select the appropriate Group Selection Relay (G1, etc). |
| PC—Point Code Relay | Operates at the end of an outgoing or incoming point code to select the appropriate Point Selection Relay (P1, P2, etc.) |
| INC—Incoming Code Relay | Operates at the end of an incoming indication code to check and correct the indicating lamps on a point. |
| OS—Outgoing Start Relay | Operates when a point selection key selects the group relays indicating that this station is originating the operation and that the equipment is in an Off-Normal Condition. |
| IS—Incoming Start Relay | Operates on the first incoming pulse indicating that the remote station is originating and that the equipment is in an Off-Normal Condition. |
| CS—Code Stop Relay | Operates on the 6th pulse of an outgoing code opening the circuit to the sending control relay. This relay releases after a group code permitting point code transmission; however, after the point code transmission it remains operated awaiting the indication code from the remote station. |
| IA—Indication Agreement Relay | Operates after an indication code has been received and the indicating lamps have been lighted in an agreement condition. |
| CC—Close Code Relay | Operates from the "Close" key and in conjunction with relay OC, prepares circuitry to relay PD (pause control) to send a code of 2-5. |
| OC—Open Code Relay | Operates from the "Open" key and prepares relay PD to send a code of 1-5. |
| CA—Code Auxiliary Relay | Operates from a make contact of relay OC and serves as an auxiliary in conditioning control circuits and control keys. |
| CI, OI—Indication Control Relays | (CI—Closed Indication) (OI—Open Indication). Operate from series make contacts of the point selection and indication relays. For a "closed" indication relay CI is operated; for an "open" indication relay OI is operated; for "mid-position" indication both relays are operated. |
| C0-C5—Counting Relays | (C0—Chain Relay 0) (C5—Chain Relay 5). Operate in succession on each pulse sent or received. The second operation of relay C0 in a code indicates that the 6th pulse has been sent or received. |
| R1-R5—Code Register Relays | (R1—Register Relay 1) (R5—Register Relay 5). Operate in conjunction with counting relays C0-C5 and pause relays SS and PD to mark the location of the long spaces in the code. This register operates on all codes sent and received except control and indication check codes. |
| RS—Reset Relay | Operates under all conditions requiring reset and effects reset by locking relay TR to direct positive bus which operates all line relays (LN) for a time sufficient to release relay RL at all locations. The release of relay RL at each station disconnects the indirect positive bus from its supply. |
| RSA—Reset Relay Auxiliary | Operates at the end of a "Close" or "Open" control sequence and at the end of an alarm indication sequence to effect reset. Relay RSA does not effect reset after "Incremental" control codes so that the point may be maintained for further control operations. |
| ID—Indication Disagreement | Operates to change indication lamps when they are not in agreement with incoming indication code. With the remote station originating the change, this relay also energizes the Alarm circuit. |
| IFA—Indication Finished Auxiliary Relay. | (See relay IF for function). |
| LSA—Line Supervision Auxiliary A | Operates in conjunction with relay CHI to connect 115 VAC to the telemetering receiver. |
| SC—Station Check Relay | Operates from "Check" key to send 4-5 code to point 1 for master check. |
| LS—Line Supervision Relay | Operates on each telemetering pulse received and keys the telemetering receiver. The prolonged release of this relay under normal conditions indicates channel failure by lighting the channel lamp and energizing the alarm bell. |
| LSB, LSC—Line Alarm Relays | (LSB—Line Supervision Auxiliary B) (CH3—Line Supervision Auxiliary C). Normally energized slow releasing relays which will signal channel failure in the event of prolonged absence of channel supervision or telemetering current. |
| LSD—Line Supervision Auxiliary D | The alarm bell in the event of channel failure. |
| GS1-GS5—Group Code Start Relays | (GS1—Group Code Start Relay 1) (GS5—Group Code Start Relay 5). |
| PS1-PS5—Point Code Start Relays | PS1—Point Code Start Relay 1) (PS5—Point Code Start Relay 5). These relays operate through the "Point Selection" keys preparing the pause control for group and point selection codes. For example, relays GS1 and GS2 prepare the code for group 1 and relays PS1 and PS2 prepare the code for point 1. |
| FL1, FL2, and FL3—Flashing Lamp Alarm. | (FL1—Flashing Relay 1) (FL2—Flashing Relay 2) (FL3—Flashing Relay 3). Operates from "D" point relay on an incoming code to flash the red or green lamp indicating a device has changed position without supervisory control. |
| ICC—Incremental Close Code Relay | Operates from "Incremental Close" key initiating the 1-4 code. |
| IOC—Incremental Open Code Relay | Operates from "Incremental Open" key initiating the 2-4 code. |
| G1, G2, etc.—Group Selection Relays | (G1—Group 1 Selection) (G2—Group 2 Selection). Operates to prepare all the point relays in the particular group for the point selection code. |
| P1, P2, etc.—Point Selection Relays | (P1—Point 1 Selection) (P2—Point 2 Selection). Operates indicating that a particular point is ready for control operations. |
| I1, I2, etc.—Indication Relays | (I1—Indication Point 1) (I2—Indication Point 2). Condition the red and green indicating lamps to agree with the associated remote device. |
| F1, F2, etc.—Flashing Alarm Relays | (F1—Flashing Point 1) (F2—Flashing Point 2). Operate to signify that a remote device has changed position without supervisory control. |

CONTROLLED STATION RELAYS

| Relay Designation | Function |
|---|---|
| ln—Line Relay | Operates on each supervisory control pulse sent or received. |
| rl—Release Relay | Normally energized relay which releases at "Reset" to momentarily de-energize indirect positive bus. |
| ss, sf—Selection Control Relays | (ss—Selection Start) (sf—Selection Finish). Operate on incoming codes and release during the long pauses in the code marking the intelligence on the code register. |
| tr—Transmitting Relay | Operates to send each outgoing pulse. Relay tr operates Relay ln which in turn releases relay tr causing a continuous pulse sending combination. |
| tc—Transmitting Control Relay | Operates to initiate pulsing by energizing relay tr. |
| pd—Pause Determination Relay | Operates to insert long spaces in outgoing code by temporarily releasing relay tc. |
| slo—Station Lock-Out Relay | On a multi-station system this relay operates upon receipt of code calling for a point not equipped on this particular station. The lock function is released upon receipt of a reset code. |
| ar—Automatic Reset Relay | Normally operated relay which releases to effect reset if an abnormal pause appears in any of the codes. |
| ds, dsa—Code Start Delay Relays | (ds—Delay Start) (dsa—Delay Start Auxiliary). Operate during a "Reset" to delay the start of another operation from the remote station long enough to allow the master station to start an operation and take preference if desired. |
| gs, gf—Group Selection Marking Relays. | (gs—Group Selection Start) (gf—Group Selection Ginish). Operate after group selection and lock up the desired group relays. |
| ps, pf—Point Selection Marking Relays. | (ps—Point Selection Start) (pf—Point Selection Finish). Operate after point selection and lock up the desired point relay. |
| gc—Group Code Relay | Operates to transfer the selected group code to the proper group relays. |
| pc—Point Code Relay | Operates to transfer the selected point code to the proper point relay. |
| inc—Incoming Code Relay | Operates to transfer the control code to the selected device. |
| os—Outgoing Start Relay | Operates to start an outgoing code by pulling the sending control relay (tc). |
| is—Incoming Start Relay | Operates preparing the station for the receipt of incoming codes. |
| cs—Code Stop Relay | Operates on the 6th pulse of an outgoing code to de-energize the sending control relay. |
| ct, cta—Indication Code Start Relays | (ct—Code Start, after control) (cta—Code Start Auxiliary). Operate to initiate the indication code after a control function has been achieved. |
| plo—Lock-Out Relay | Operates to lock-out the remote station preference feature if the master station desires to take preference after a reset. |
| rc—Reverse Coding | Operates to reverse coding arrangements for devices that utilize "B" auxiliary switch contacts instead of "A." |
| ci, oi—Indication Control Relays | (ci—Closed Indication) (oi—Open Indication). Conditioned upon point selection to prepare the indication code for the selected point. |
| co-c5—Counting Relays | (co—Chain Relay 0) (c5—Chain Relay 5). Operate in succession on each pulse sent or received. The second operation of relay co indicates that the 6th pulse has been sent or received. |
| r1-r5—Code Register Relays | (r1—Register Relay 1) (r5—Register Relay 5). Operate in conjunction with relays co-c5 and the pause relays ss and pd to mark the long spaces in the code. |

CONTROLLED STATION RELAYS—Continued

| Relay Designation | Function |
|---|---|
| rs—Reset Relay | Operates to effect reset by energized relay tr. Relay tr energizes the line relays at all locations for a time sufficient to permit reset at each station. |
| rlo—Repeat Lock-Out Relay | Operates to prevent a station from attempting to transmit an alarm indication more than twice if no check code is received from the master station. |
| ti—Timed Increment | Operates with the point relay of a regulated device to initiate a timed increment for the control code. |
| tia—Timed Increment Relay | Operates for a period of time set by the R-C timer to maintain the interposing relay on a selected device after it has received a particular incremental control code. |
| sc—Station Check Relay | Operates upon receipt of a 4–5 code and releases all of the "H" relays at this station. Each point then reports in turn to check the indicating lamps at the master station. |
| ikc—Indication Check Code Relay | Operates upon receipt of a correct "Indication Check" code and extends its operating positive to restore the "H" relay associated with the selected point. |
| dsa—Delay Start Auxiliary | (see relay ds for function) |
| icc, ioc—Incremental Control Relays | (icc—Incremental Close Code) (ioc—Incremental Open Code). Operate (icc for "Close," ioc for "Open") upon the receipt of an incremental code. The operation of one of these relays operates relays ct, cta, tia and the correct interposing relay associated with the selected point. |
| g1, g1a, g2, g2a—Group Selection Relays | (g1—Group 1 Selection) (g1a—Group 1 Selection Auxiliary) (g2—Group 2 Selection) (g2a—Group 2 Selection Auxiliary). Operate to select a group of 10 points preparing them for the incoming point code. |
| og1, og2—Outgoing Group Selection Relay | (og1—Outgoing Group #1 Start) (og2—Outgoing Group #2 Start). Operates from a break contact of an "H" relay, initiating the outgoing code, and selecting the group containing the point that is reporting an automatic indication or alarm. |
| p1, p2—Point Selection Relays | (p1—Point 1 Selection) (p2—Point 2 Selection). Operate indicating that a particular point is selected for further operation. |
| i1, i2—Indication Relays | (i1—Indication Point 1) (i2—Indication Point 2). Supervise the controlled device at each point and prepare the indication code corresponding to the condition of that device. |
| s1, s2—Point Code Start Relays | (s1—Point 1 Code Start) (s2—Point 2 Code Start). Normally energized point supervision relays which release to initiate an outgoing alarm code whenever the supervised device changes condition. |

General Description of System

For purposes of facilitating an understanding of the system, there is initially set forth hereat a brief resume of the various groups of operating components and the time and manner of operation of such groups.

Briefly, the system may be considered as including a line supervisory arrangement which is also operative to provide continuous telemetering of the condition of the equipment at the different remote stations; an arrangement for transmitting signals including pulse counting means for providing groups of a predetermined number in each transmission; and pulse coding means for providing spaces of increased duration at certain intervals in each group of transmitted impulses, different positions of the longer spaces providing different sets of information, and receiving equipment at the stations for receiving the impulse groups and effecting selective operation in accordance therewith, including code register means and selection control means.

The system, of course, includes other functional components and arrangements which will become evident in the more detailed consideration of the system which appears hereinafter. A brief description of the general groups of equipment, however, is initially set forth hereat to provide an overall picture of the system pattern and operation.

Normal at Rest Condition of System

Figure 18:
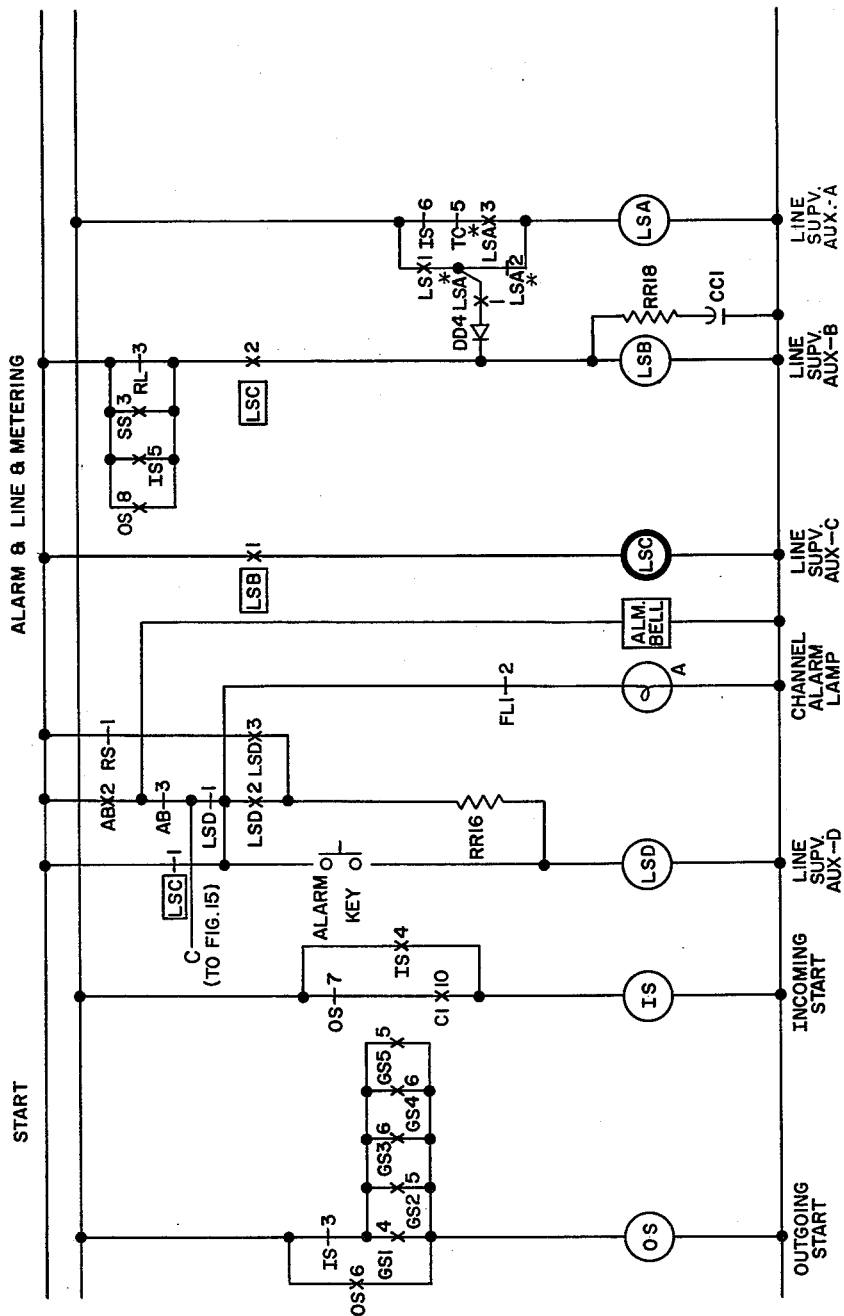

With the equipment at rest the following control station relays will be found operated: RL (FIG. 19), AR (FIG. 19), C0 (FIG. 16), LSA (FIG. 18), LSB (FIG. 18), and LSC (FIG. 18). The circuits over which these relays are operated are as follows:

—, RL, LN–4, +
—, AR, AR–1, IS–7, C0–11, RL–1, +
—, C0, resistor RR15, C1–3, C2–5, C3–4, C4–5, C5–6 in parallel with C0–6, RL–1, +
—, LSA, LSA–3, TC–5, IS–6, RL–1, +
—, LSB, diode DD4 in the conducting direction, LSA–1, LS–1, RL–1, +
—, LSC, LSB–1, +

LS is continually pulsed over the channel as described hereinafter. Also with the equipment at rest the following controlled station relays will be found operated: rl (FIG. 30), ar (FIG. 30), co (FIG. 27), s1 (FIG. 25), s2 (FIG. 25), s12 (FIG. 25), etc.

—, rl, ln–4, +
—, ar, pc–12 and is–7 in parallel, os–4, co–12, +
—, co, resistor rr9, c1–4, c2–4, c3–4, c4–6, c5–6 in parallel with co–6, rl–1, +
—, i1–2, s1 i1–3, or i1–4, s1, i1–1, resistor rr3, s1–6, sc–3, +
—, 12–2, s2, i2–3, or i2–4, s2, i2–1, resistor rr4, s2–6, sc–3, +
—, i12–2, s12, i12–3, or i12–4, s12, i12–1, resistor rr5, s12–6, sc–3, +

Line Supervision and Continuous Telemetering

With the equipment at rest, impulse-type telemetering signals are continuously transmitted over the supervisory control line wires from the controlled station to the main station to provide telemetering indications of certain sets of equipment at the remote station. Each impulse as transmitted comprises a make and break portion which is five seconds long, the reading of the impulse telemeter receiver being determined by the ratio of make to break of the received impulses. Such signal set is also used to provide an audible and visible alarm in case of a failure on the line wire channel, the absence of the telemetering signals for a given time period effecting operation of line supervisory equipment and the energization of a line alarm.

More specifically, relay LS (FIG. 19) at the master station is operated on the make portion of each impulse of the telemetering equipment which is coupled to the line conductors L1, L2, the line circuit extending from the positive bus at controlled station #1 (FIG. 30) over contacts slo–7, resistor rr16, contacts os–7, is–9, tr–2, coil of line relay ln, resistor rr17, resistor rr18, line wire L1 to the control station (FIG. 19), resistor rr19, resistor rr18, coil of line relay LN at the control station, diode dd5, contacts TR–2, coil of relay LS, contacts GF–6, TC–8, SF–7, TR–1, line wire L2 to controlled station #1 (FIG. 30), contacts tr–1, sb–7, tc–7, is–8, os–6, slo–6, the 10″ valve or 12″ valve transmitter (according to the position of the cycle timer), and resistor rr15 to negative bus. Although this current passes through the coils of the line relay at each station, the current is limited to a value which will not operate these relays but will readily operate relay LS. The cycle timer transfers the metering circuit between these two transmitters every fifteen minutes.

Each time the contact of the telemetering transmitter closes at the remote station, line supervision relay LS operates at the master station and at its contacts LS–2 operates the impulse telemetering receiver (FIG. 19), and at its contacts LS–1 completes an energizing circuit for a first auxiliary line supervision relay LSA (FIG. 18). Relay LSA operates and at its contacts LSA–3, locks over a circuit including contacts TC–5, and IS–6 to indirect positive potential, at its contacts LS–4 connects 115 volts alternating current to the impulse telemetering receiver (FIG. 19), and at its contacts LSA–1 completes an operating circuit to a second auxiliary line supervision relay LSB (FIG. 18) and also completes a charging circuit for condenser CC1 (FIG. 18).

The function of condenser cc1 is to hold relay LSB energized during the break periods of the pulses, thereby preventing a line alarm from being activated for the periods of the telemetering impulse that relay LS is restored.

Relay LSB holds relay LSC (FIG. 18) energized over the circuit which extends from —, through the winding of LSC, normally closed contacts LSB–1 to +.

If the line wires become either open or short-circuited relay LS ceases to follow the impulses of the telemetering transmitter, and after a short delay, condenser CC1 becomes discharged and allows relay LSB to release in turn releasing relay LSC. As relay LSC releases, break contacts LSC–1 (FIG. 18) close, completing a circuit from —, through alarm lamp A (FIG. 18), contacts LSC–1 to + which lights the alarm lamp. Additionally, the alarm bell (FIG. 18), is energized over a circuit from —, through the alarm bell, contacts AB–3, LSD–1, and LSC–1 to +. A visual and audible signal is thus provided for the control station attendant.

The audible alarm may be silenced by operating the alarm key which operates line alarm cut-off relay LSD (FIG. 18) over a circuit which extends from —, over the winding of relay LSD, contacts of the alarm key and contacts LSC–1 to +. Relay LSD operates and at contacts LSD–2 locks over a circuit including the resistor RR16, contacts LSD–2, and contacts LSC–1 to +, and also locks over contacts LSD–3 and RS–1 to +, both locking circuits being independent of the alarm key. Relay LSD at contacts LSD–1 interrupts the energized circuit for the alarm bell, the alarm lamp being maintained energized until relay LSC operates.

After the line is restored to normal, relay LS follows the impulses of the telemetering transmitter, and contacts LS–1 operate relay LSB which in turn operates relay LSC, to extinguish the channel alarm lamp. With relays LSC and LSD both operated, a circuit is completed to operate reset relay RS (FIG. 19) over the path which extends from — through the winding of relay RS, contacts LSD–4, LSC–3 to +. Relay RS operates and at contacts RS1 releases relay LSD to restore the line alarm relays to normal, and in a manner which will be described later, controls both the master station and the remote station to reset. If any alarm conditions have been stored at the remote station during the line interruption, they will automatically report to the master station at successive time intervals.

*Transmission of Signals*

The novel system of the disclosure basically achieves the communication of desired control and supervisory directions between the main station and substations by means of coded signals or commands. In the present disclosure, each code consists of six impulses, the "Mark" portion of each impulse being short, and the first five "Spaces" of each signal containing three short and two long spaces with the two long spaces arranged in different places to transmit the intelligence or command to be performed. The sixth "Space" is always long to denote that six, and only six, impulses have been transmitted. At the end of each code, a check circuit verifies that six, and only six, impulses have been transmitted, and that two, and only two, of the first five spaces were long. Thus all codes contain exactly the same basic elements. If the code is mutilated during transmission, at least one of the totals will be incorrect, and the equipment, detecting that an error has been made, will reject the code.

The following chart will show the codes used for group selection, point selection, control codes, indication codes, and indication check codes. The numbers in the code indicate the spaces which are long.

*Code Arrangements*

| Code | Group Number | Point Number | Control Functions | Indication | Indication Check |
|---|---|---|---|---|---|
| 1–2 | 1 | 1 | | Mid-position. | |
| 1–3 | 2 | 2 | Incremental | | Mid-position. |
| 1–4 | 3 | 3 | Open | | |
| 1–5 | 4 | 4 | ---do--- | Opened | |
| 2–3 | 5 | 5 | Incremental | | Opened. |
| 2–4 | 6 | 6 | Close | | |
| 2–5 | 7 | 7 | ---do--- | Closed | |
| 3–4 | 8 | 8 | | | Closed. |
| 3–5 | 9 | 9 | | | |
| 4–5 | 10 | 10 | Station check. | | |

The following codes are transmitted during a manual control operation from the master station.

Code:        Transmitted from
 Group selection_____ Control station.
 Point selection_____ Control station.
 Indication code_____ Controlled station.
 Control code_____ Control station.
 Indication code_____ Controlled station.
 Indication check and
  reset signal_____ Control station.

The following codes are transmitted during the reporting of an alarm condition from the remote station.

Code:        Transmitted from
 Group selection_____ Remote station.
 Point selection_____ Remote station.
 Indication_____ Remote station.
 Indication check_____ Master station.
 Reset_____ Master station.

With reference now to the drawings, it will be apparent that an impulse receiving relay, line relay LN (FIG. 19) line relay ln (FIG. 30) is connected across the line wires L1 and L2 at each station, and any supervisory control signal transmitted over the line wires L1 and L2 operates relay LN or ln at all stations, simultaneously.

The signalling means for transmitting the supervisory control signals over the channel includes transmitter relay TR (FIG. 19) and relay tr (FIG. 30) at the various stations. As relay TR operates, negative battery is connected to line conductor L1 over a circuit which extends from the negative bus, contacts TR–5 and resistor RR19 to line conductor L1, and negative battery is connected over contacts TR–5 and resistor RR18 to the winding of line relay LN. It will be noted that when relay TR operates, it is effective at its contacts TR–3 to remove a short circuit which is connected across compensating resistor RR18, and the resistance of resistor RR18 is connected in series with line relay LN at the transmitting station. The resistance of RR18 is approximately equal to the loop resistance of the line wires to the remote station, and the use of this resistor at the transmitting station provides approximately equal current through relay LN at both the sending and receiving stations.

Transmitter relay TR at its contacts TR–4 connects positive battery directly to line L2, and over diode DD6 in the forward direction to coil of line relay LN. Relays LN and ln at the various stations operate in parallel across the line.

Each time a station is called upon to transmit impulses a master transmitter control relay TC (FIG. 19) or tc (FIG. 30) is energized to control the operation of transmitter relay TR, master transmitter control relay TC being operative to release to insert two long spaces in the code and being operative to terminate the code at the end of six impulses. The different operating circuits for relay TC or tc will be described later, it being sufficient for the present description to note the operating circuit for relay TC (FIG. 19) at the control station which extends from —, over the winding of relay TC, contacts SF6, CS–4, OS–10, PD–6, and RL–1 to indirect +. In that similar circuits control the transmitter relay TR at the control and controlled stations the description is initially limited to that of the control station.

Master transmitter control relay TC operates, and at its contacts TC–7 extends operating positive over contacts TC–7, LN–3, and RS–4 and the winding of transmitter relay TR to the negative potential. Transmitter relay TR operates line relay LN in the manner previously described, line relay LN in operating opening contacts LN–3 to release relay TR. After a slight time delay, relay TR releases, and in turn, releases relay LN. As relay LN releases to close contacts LN–3 the energizing circuit to relay TR is again completed. Transmitter relay TR reoperates, and in turn, reoperates line relay LN, which releases transmitter relay TR. Relays LN and TR form a self-driven pulse-sending combination which continues to transmit pulses over the line wires as long as transmitter control relay TC is energized. As shown in more detail hereinafter, code starting and stopping relays and pause determination relay PD (FIG. 11) control the operation and release of relay TC. Pause determination relay PD in its operation releases relay TC to insert the long spaces in the code transmission. Similar arrangements obtain at the controlled stations as noted above.

Pulse Counting Circuit

Each time line relay LN or *ln* operates at any station whether sending or receiving impulses, a counting chain of relays operates to record the number of impulses in the code. Such transmission should have a total of six impulses. At the sending station, the counting chain is used to insert the long spaces at the proper places in the code, and to terminate the code at the end of six pulses. At the receiving station, the counting chain is used in conjunction with slow release relay SS or *ss*, to operate the proper code register relays R1–R5 or *r1–r5*.

More specifically, when line relay LN at the control station operates, it is operative at contacts LN1 to close a circuit (see FIG. 16) for chain relay C1 which extends from positive battery, contacts LN–1, RL–2 of normally energized relay RL, break contacts INC–6, contacts C0–4 of normally energized relay C0, break contacts C5–4, first winding of relay C1, to negative battery, and also over resistor RR14, contacts C0–3, and the first winding of relay C0 to negative battery to provide a holding circuit for relay C0. Relay C1 operates, and at contacts C1–5 establishes a holding circuit for itself which extends over its second winding, contacts C1–5, C2–5, C3–4, C4–5, C5–6 to indirect positive potential; and at its contacts C1–5 interrupts the normal holding circuit for relay C0. Similar arrangements are found at the controlled stations.

A selection control relay SS (FIG. 16) at the control station is also operative as impulses are received over the line conductors and the line relay LN operates to close contacts LN1, the circuit extending from + over contacts LN1, RC2, INC6, contacts TC–2 and contacts PD–3, and the winding of relay SS to negative battery. When receiving at the remote station relay *ss* (FIG. 27) operates over a similar circuit including break contacts TC–2, break contacts *pd*–3, and the winding of relay *ss* to negative battery. Selection control relays SS and *ss* are slow releasing relays which remain operated during the short spaces between make impulses, but release during the receipt of a long space between make impulses.

As the space portions of the impulses are received, relay LN releases and opens the holding circuit for relay C0 which extends over resistance RR14. When relay LN operates again, with the receipt of the next make impulse, contacts LN1 close to complete the energizing circuit for relay C2 which extends over make contacts C1–6 of relay C1, break contacts C0–5, and the winding of relay C2 to negative battery. Relay C2 operates and at break contacts C2–5 opens the previous holding circuit for relay C1, which relay is temporarily held over by the circuit which extends over make contacts C1–4 until the pulse is terminated. When relay LN releases again and contacts LN1 open, relay C1 restores.

The next operation of relay LN and closing of contacts LN1 operates relay C3 over the circuit including make contacts C2–6 of relay C2, break contacts C1–7 and the winding of relay C3. As relay C3 operates and opens contacts C34 the previous holding circuit for relay C2 is interrupted and relay C2 is temporarily held by the circuit which extends over make contacts C2–3 of relay C2. As relay LN releases to open contacts LN1, relay C2 restores. As long as relay LN continues to operate and release in response to the receipt of the incoming impulses, the counting chain continues to progress one step at a time. With the receipt of the sixth impulse the counting chain steps from relay C5 back to relay C0 in preparation for a subsequent series of operations. Similar arrangements obtain at the Controlled Stations.

Code Transmission

The coded information, or command, is transmitted by inserting two long spaces in the series of the first five spaces of each code. These long spaces are inserted at the proper places in the code by the operation and release of pause determination relay PD (FIG. 11) at the control station or *pd* (FIG. 20) at the controlled station which operates under the control of the impulse counting chain, and the code set-up circuits at the transmitting station.

Briefly, in the transmission of each set or group of impulses at the control station, the pause determination relay PD at its contacts PD–6 (FIG. 19), (contacts *pd*–6 [FIG. 30] at the controlled station) open the circuit to the winding of the transmitter control relay TC (*tc*) to temporarily halt the transmission of impulses until pause determination relay PD (*pd*), which is a slow release relay at the various stations, releases to time the length of the long spaces.

The control of the pause determination relay operation in the accomplishment of the timing is provided by several different circuits. At the control station, relays GS1–GS5 (FIG. 11) control the circuit of relay PD to establish the long spaces in the group selection code, and relays PS1–PS5 control the circuit of relay PD to establish the point code. Relays CC, 1OC, and 1CC control the circuit of relay PD to establish the control codes, and the relays CI and OI control the circuit of relay PD to establish the indication check codes.

At the remote station, relays *og1*, *og2* (FIG. 20), to *og10* control the circuit of pause determination relay *pd*, to establish the group code; relays *s1*, *s2*, etc., of the points involved control the circuit of relay *pd* to establish the point selection code; and relays *rc*, *ci*, and *oi* control the circuit of relay *pd* to establish the indication codes. As any of these identified relays operate, contacts on such relays which are connected over contacts of counting relays *co* to *ct* to the coil of relay *pd* control relay *pd* to operate, and insert long spaces at the designated place in the code.

Code Registration

In the transmission of each code group, a slow release relay SS (FIG. 16) or *ss* (FIG. 27) at the receiving one of the stations, operates on the first impulse of a code and remains operated during the short spaces between impulses. When relay SS (FIG. 16) operates at the control station, for example, it is effective at contacts SF–1 to close a circuit to selection control relay SF (FIG. 16) which extends from negative potential over the winding of relay SF and contacts SF–1, SS–1, C0–7 to indirect positive potential. Relay SF operates, and at contacts SF–2 establishes a holding circuit for itself which extends over contacts SF–2 and GS–6 to indirect positive.

Figure 12:
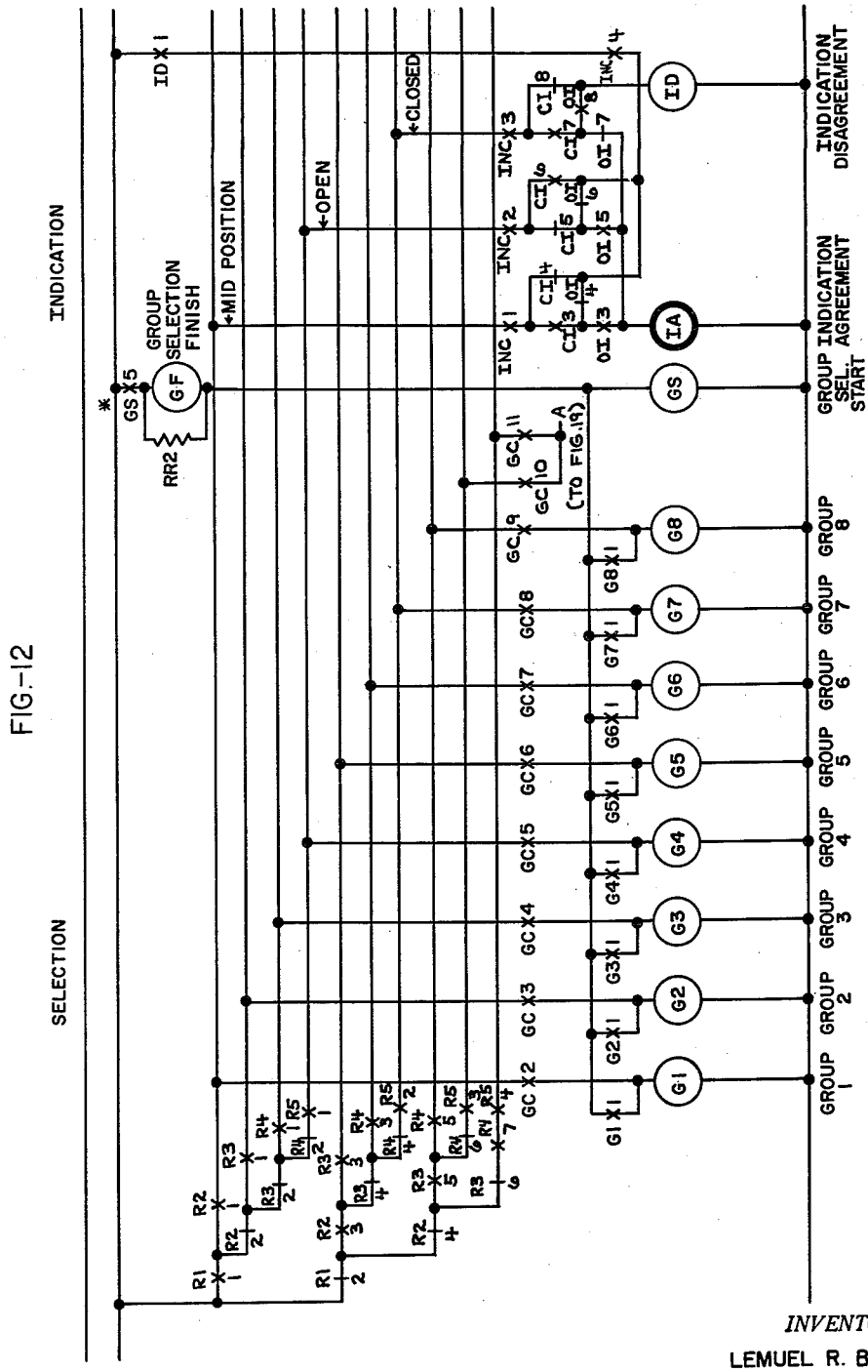
Figure 22:
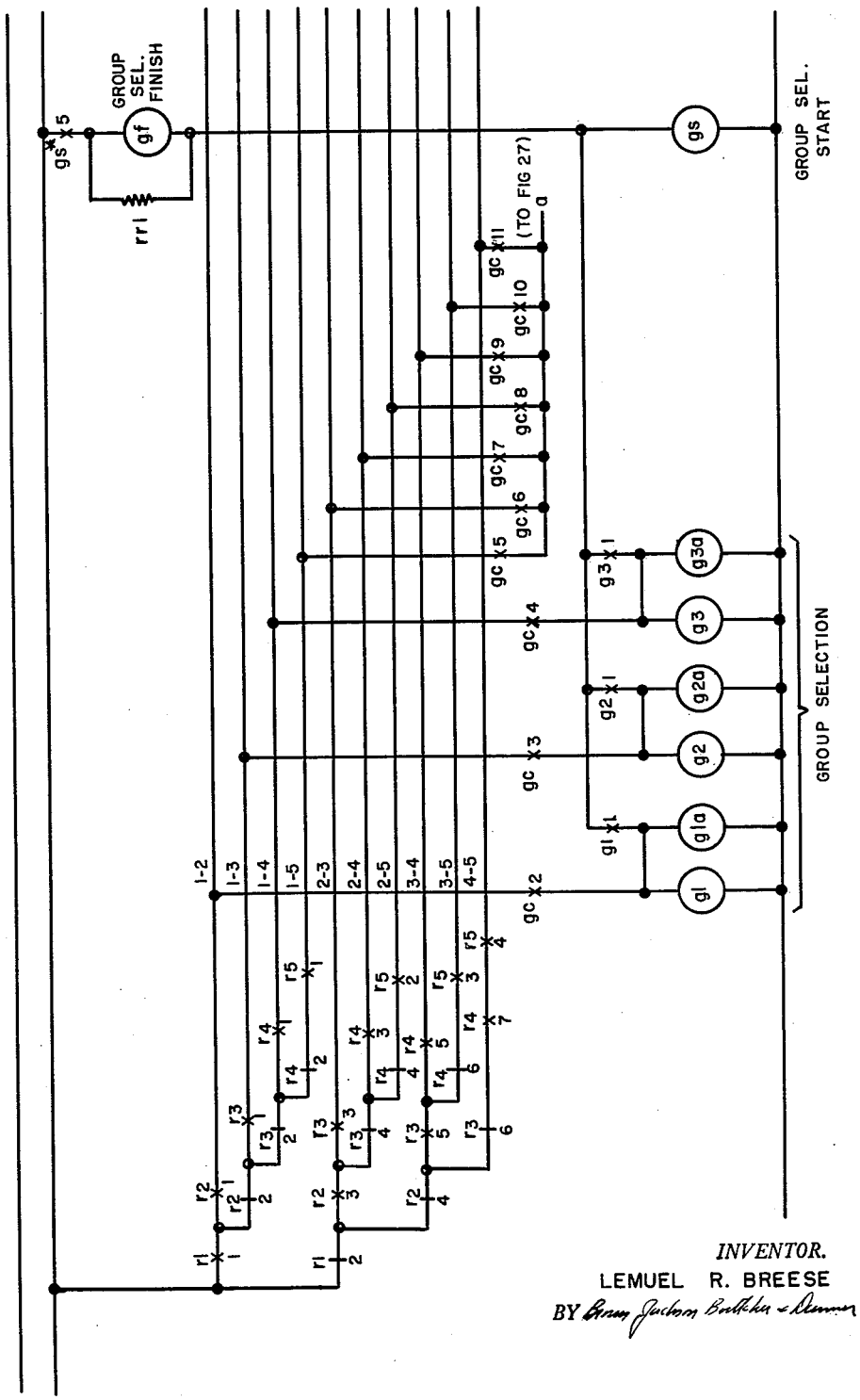
Figure 28:
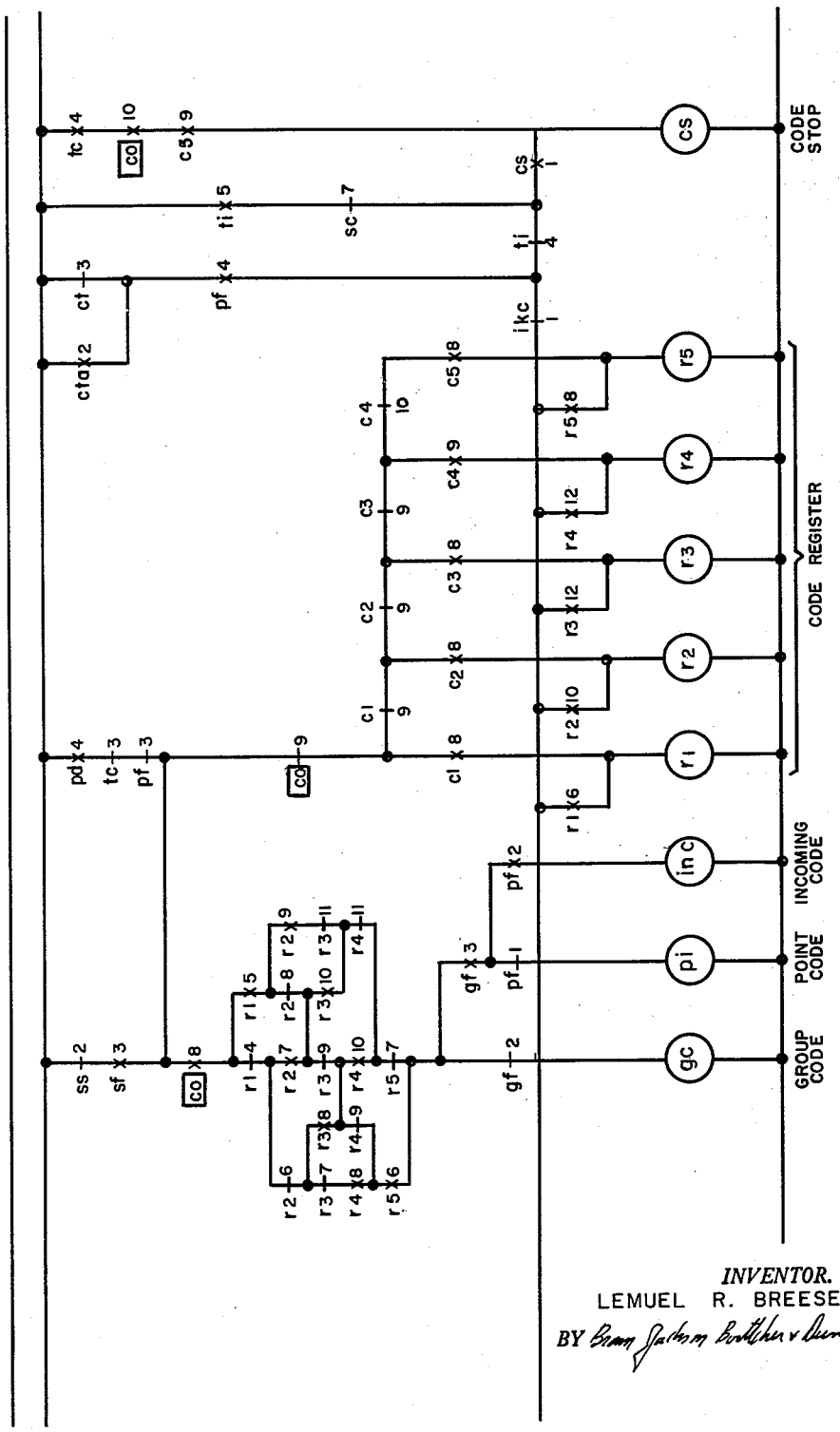

When a long space appears in the incoming code group, relay SS at the receiving one of the stations releases, and establishes an operating circuit for one of the code register relays R1–R5 (FIG. 17), the one of the register relays operated depending upon which of the counting relays C1 to C5 (FIG. 16) is energized at such time. The operating circuit (FIG. 17) for the code registration relays extends from indirect positive potential over break contacts SS–2, make contacts SF–3, contacts C0–9, and make contacts of the associated counting relay C1–C5 winding of code register relay R1 to R5 to negative potential. The operated one of the code register relay establishes a holding circuit for itself over its associated make contact and break contacts GS–6 (FIG. 16) to direct positive potential. The code register relays R1–R5 establish the desired selection circuits as shown in FIGURES 12 and 22. When impulsing is resumed, relay SS or ss re-operates, releasing again on the next long space. At the transmitting station the code register relays are operated by make contacts PD–4 (FIG. 17) or make contacts pd–4 (FIG. 28).

At the end of the sixth impulse of each group of impulses transmitted, relay PD (FIG. 11) or pd (FIG. 20) operates at the transmitting station, and relay SS (FIG. 16) or ss (FIG. 27) releases at the receiving station. At the control station, for example, the selection control relay GC, PC, or INC associated with the previously transmitted code, is operated over a circuit (FIG. 17) to complete the desired selection or function. Similar arrangements obtain at the controlled stations (FIG. 28).

It will be noted that the desired selection circuit will be completed only if counting relay C0 or co are operated to indicate that exactly six impulses were registered. Also, relays R1–R5 and r1–r5 are arranged in such a way as to complete the desired selection circuit only if exactly two code register relays are operated. If the code deviates in any way from such pattern, the selection circuit to the selection control relays will not be completed and the equipment will reset.

*Reset*

As stated hereinbefore, make contacts RL–1 (FIG. 8) at the control station and make contacts rl–1 (FIG. 27) (through contacts slo–2 and/or is–2) at the controlled stations connect the direct positive battery bus to the indirect positive bus. Relays which lock temporarily during an operation but must release at the end of the operation, are locked to the indirect positive bus which is controlled in such manner.

Relay RL (FIG. 19) or rl (FIG. 30) is a slow release relay operated from direct positive battery through contacts LN–4 or ln–4. Relay RL or rl is normally energized, and, due to its slow-release characteristic remains energized during the normal impulse operate time of line relay LN or ln.

Figure 19:
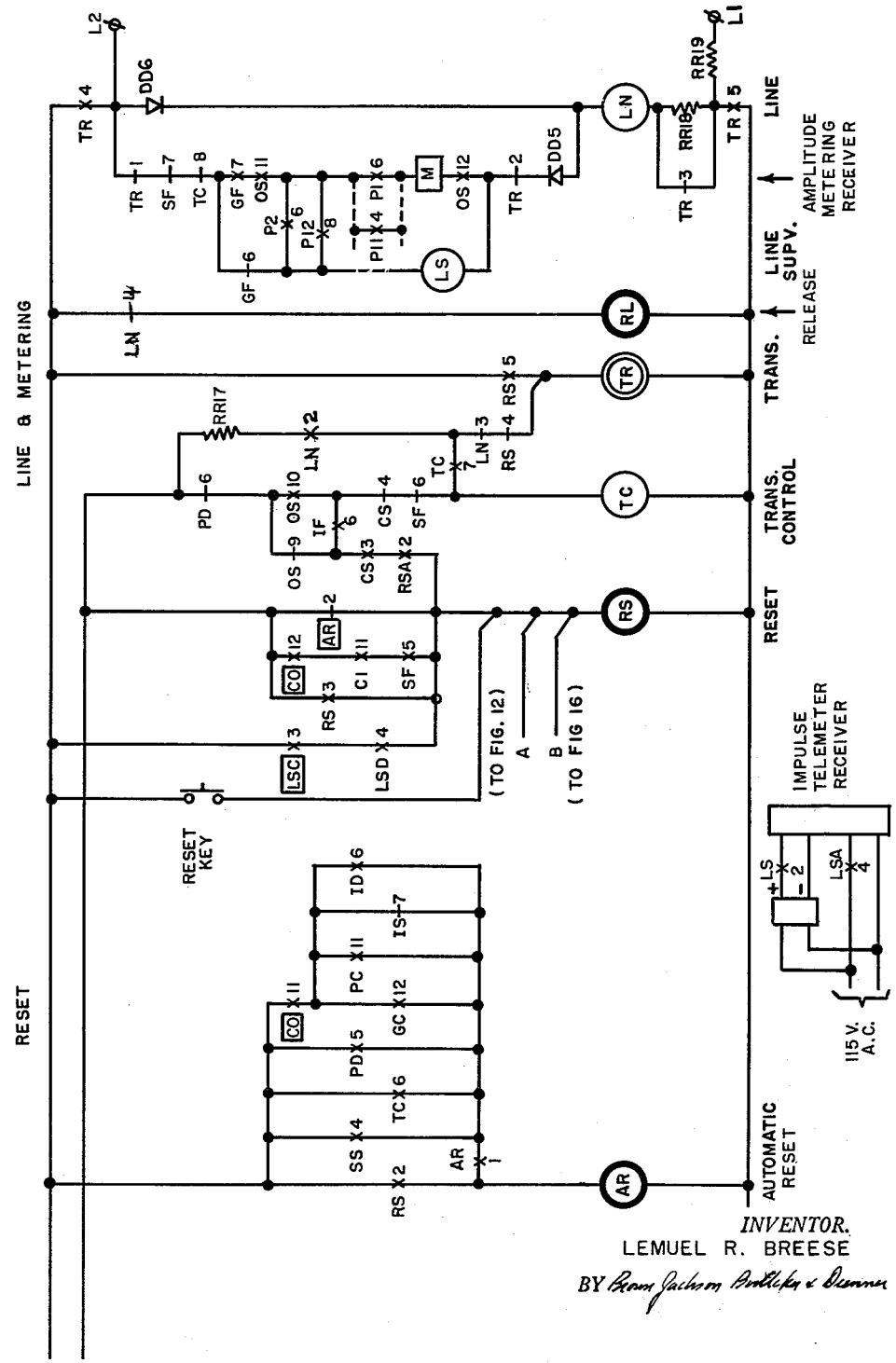
Figure 29:
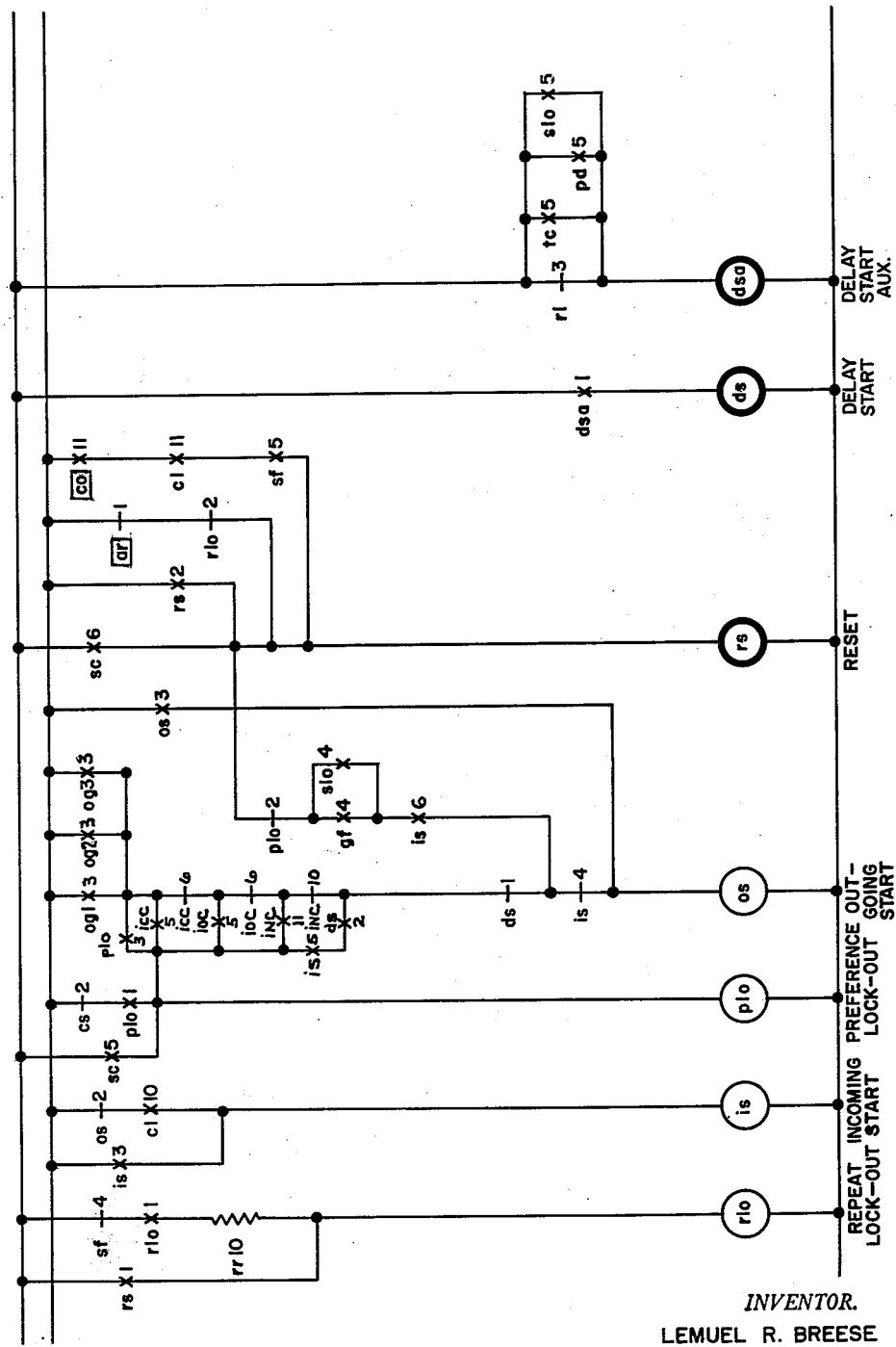

When it is desired to reset the equipment, relay RS (FIG. 19) or rs (FIG. 29) is operated; either from make contacts of the manual Reset Key (FIG. 19) or from one of the several automatic reset circuits (FIGS. 19 or 29). Relay RS or rs locks through contacts RS–3 or rs–2 to the indirect positive bus.

Contacts RS–5 (FIG. 19) connect the winding of relay TR to the direct positive bus at the Control Station. Similarly, contacts rs–4 (FIG. 30) connect the winding of relay tr to the direct positive bus at the Controlled Stations. Relay TR or tr energizes the line wires and operates relay LN or ln at all stations. Relay LN or ln remains operated at all stations until relay RL or rl releases and disconnects the indirect positive bus from the direct positive bus, to deenergize all relays locked to the indirect positive bus including relay RS (see contacts RL–1 [FIG. 8] and rl–1 [FIG. 27]). After a slight time delay, relay RS (FIG. 19) or rs (FIG. 29) releases, and in turn releases relays TR and tr at the contacts RS–5 or rs–4. Relay TR or tr de-energizes the line wires, allowing relay LN or ln to release at all stations. The release of relay LN or ln allows relay RL or rl to re-operate at each station, re-energizing the indirect positive bus for the next operation.

*Keys, Lamps, and Meters*

Figure 2A:
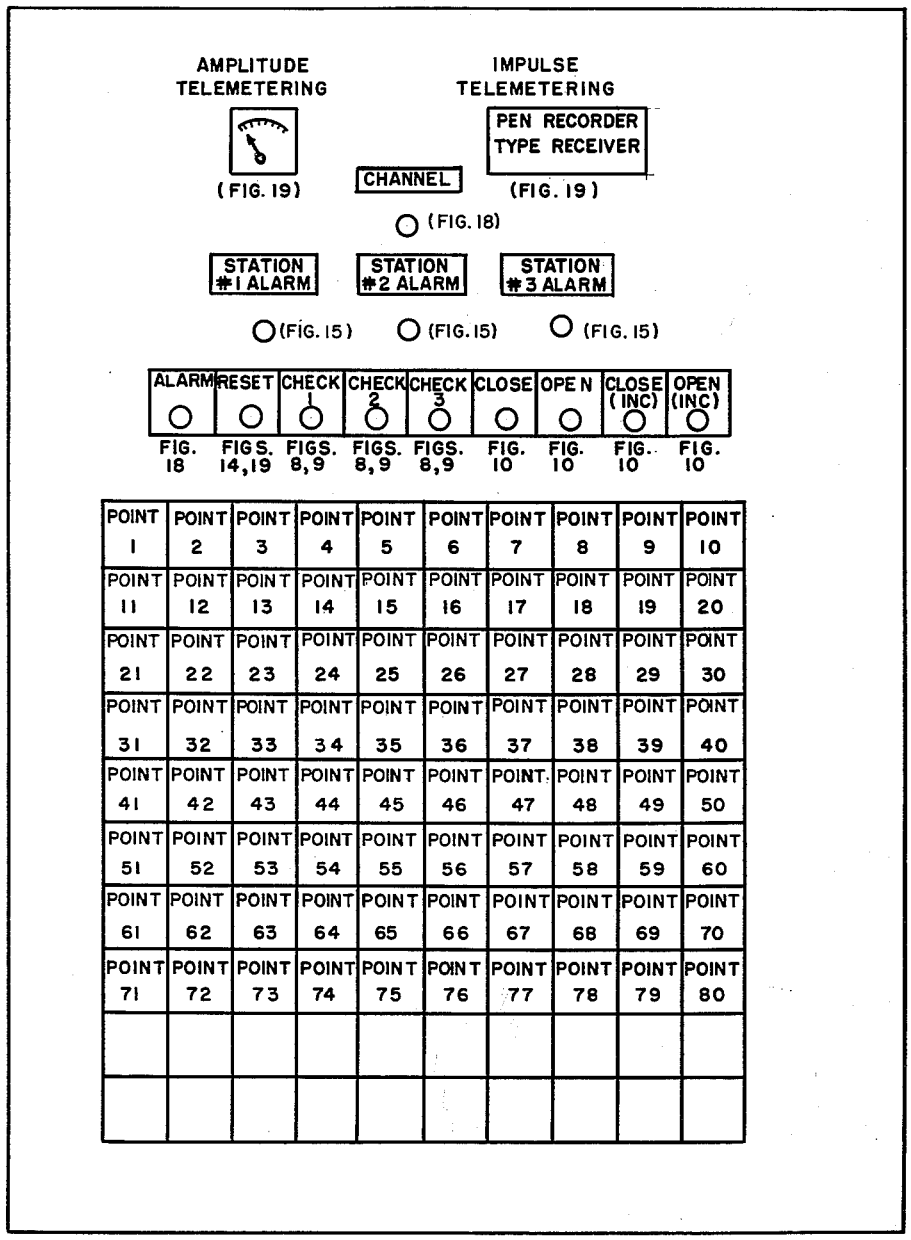
FIGURE 2a is a schematic presentation of the control panel at the Control Station of FIGURE 1.
Figure 14:
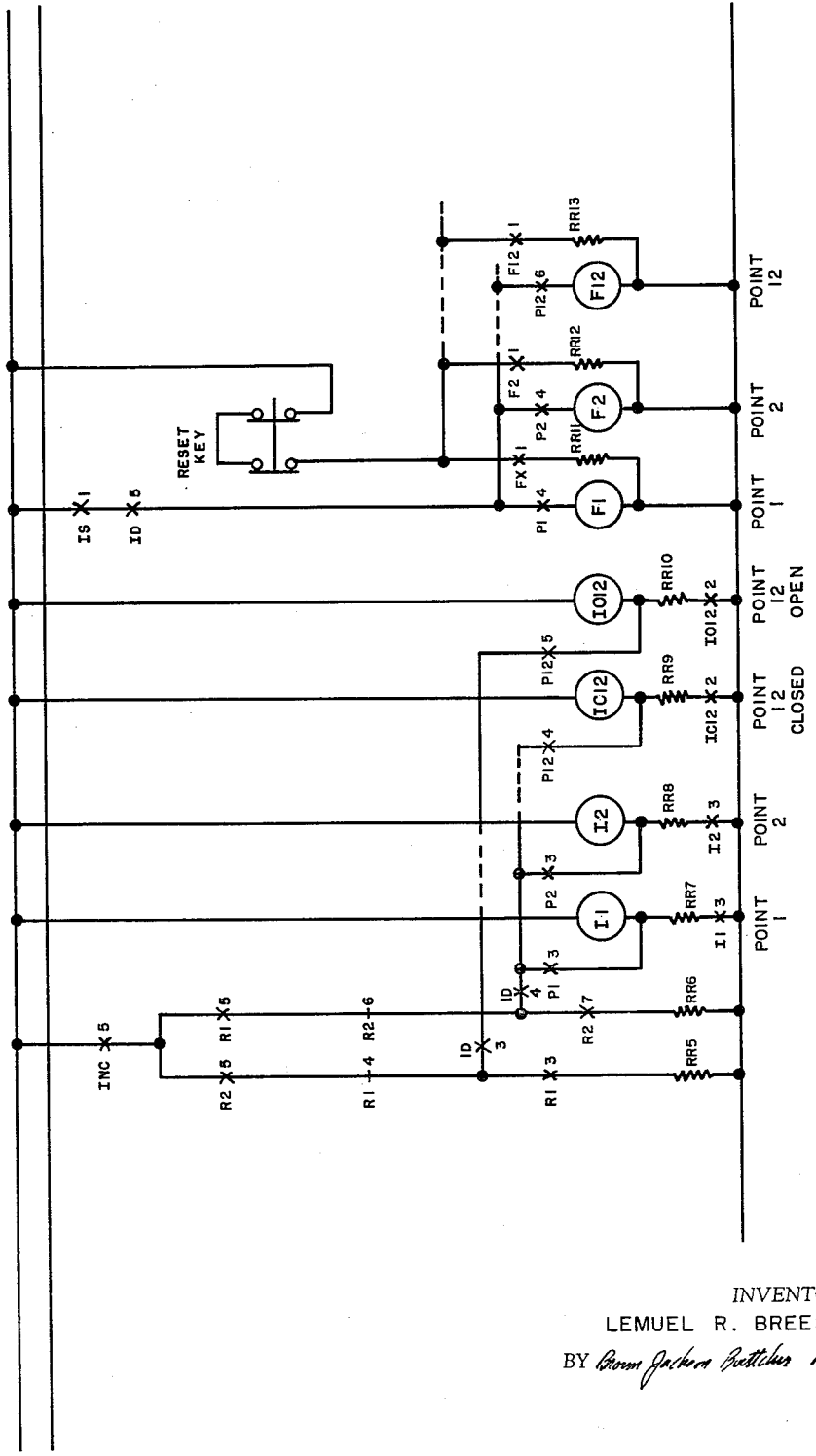
Figure 15:
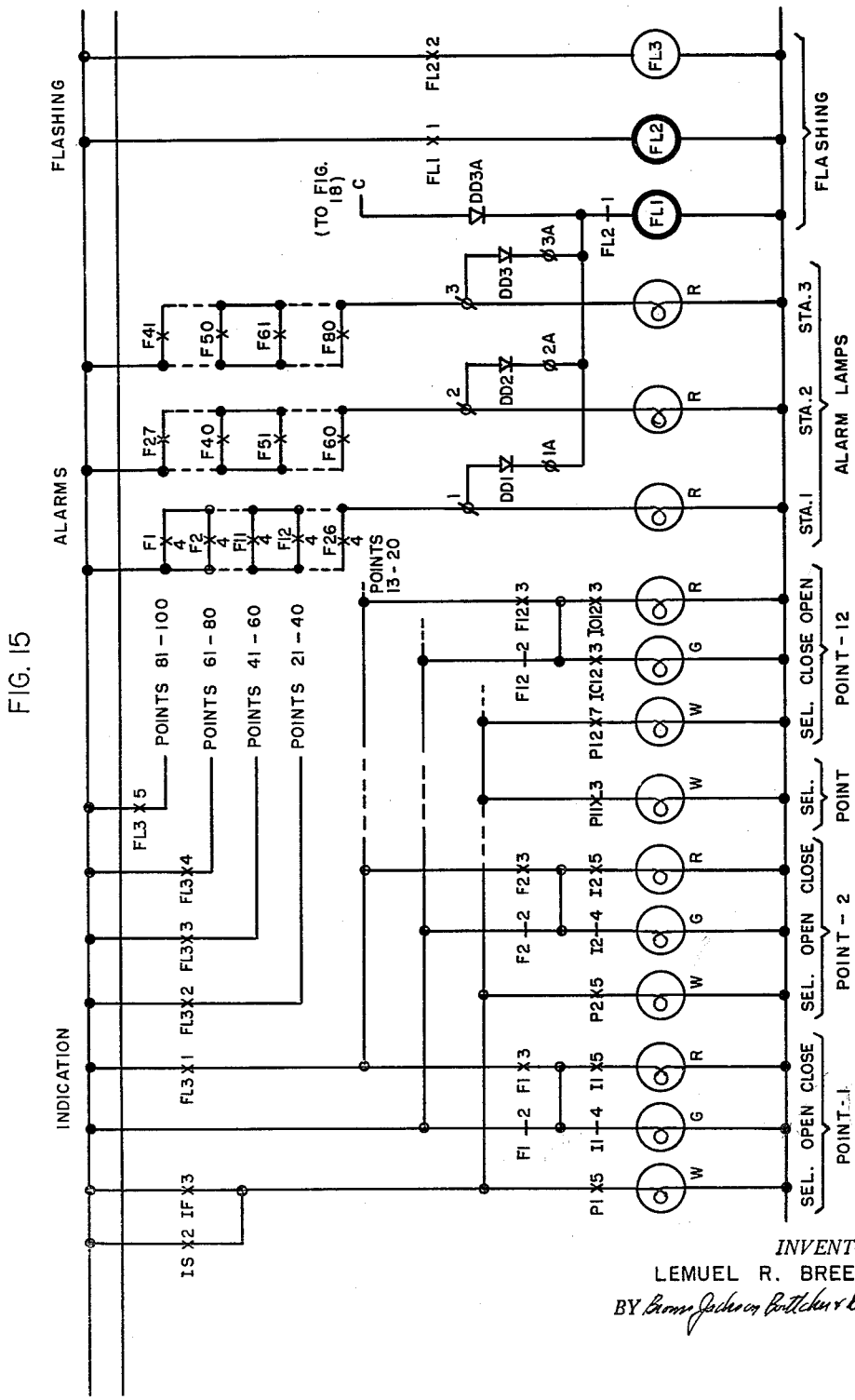

With reference to FIGURE 2A the schematic showing of the board includes a set of station alarm lamps (connected in the system as shown in FIG. 15); a channel alarm lamp (connected in the system as shown in FIG. 18); an alarm key (connected in the system as shown in FIGURE 18); a reset key (connected in the system as shown in FIGURES 14 and 19), this reset key having been shown in two divisions for schematic clarity and convenience; check keys, designated briefly "Check 1," "Check 2," and "Check 3," and designated in more detail as "Station 1 Check Key," "Station 2 Check Key," and "Station 3 Check Key," portions of these keys being shown detached for schematic clarity, and being connected in the system as shown in FIGURES 8 and 19; a close key (connected in the system as shown in FIGURE 10); an open key (connected in the system as shown in FIGURE 10); an incremental close key (connected in the system as shown in FIGURE 10), and an incremental open key (connected in the system as shown in FIGURE 10). The function of the keys is apparent from the identification terminology for such keys, and is more fully described hereinafter.

An impulse telemetering receiver shown at the top right of FIGURE 2A and also at the bottom of FIGURE 19, is of the pen recorder type. During normal line supervision the impulse telemetering receiver is actuated alternately by impulse telemetering transmitters for the ten inch pipe and the twelve inch pipe, as determined by the cycle timer (FIG. 30). If it is desired to selectively telemeter the ten inch pipe, point selection key on point 2 is operated to cut off continuous impulse telemetering to establish the telemetering of the ten inch pipe. Similarly, if it is desired to meter the twelve inch pipe, the selection key on point 12 is operated to cut-off the continuous impulse telemetering and set-up the metering of the twelve inch pipe.

An amplitude telemeter shown at the top left of FIGURE 2, is represented by a box labeled "M" (FIGURE 19). Engagement of metering over point 1 is accomplished by operating the point 1 selection key. That is, with reference to FIGURE 4, opening of point 1 selection key operates metering relay m1 which closes its contacts m1–1 and m1–2 to connect the metering source 1 to the common transmitter (FIG. 30). Thereupon metering is registered on the meter indicated as M in the square box on FIG. 19.

Similarly if it is desired to observe the metering on point 11, the point 11 selection key is operated which results in the operation of the metering relay m11 in FIGURE 4 which closes its contacts m11–1 and m11–2 to control the metering source indicated on FIGURE 30 as ms–2 to be connected to the common transmitter indicated as t inside the small box thereat. The metered information is now displayed on the meter indicated as a square M (FIGS. 2 and 19).

The operation of the equipment responsive to operation of the keys at different points in the board will become more apparent with the consideration of the following detailed description of the system functioning in accomplishing different operations.

*Closing a Circuit Breaker on Point 1—Operation of Point Selection Key (FIG. 3)*

The operation of the system will be best explained by initially describing the sequence of energization of the different switching sets responsive to the operation of a key at a point at the control to achieve a functional control operation, and thereafter the sequence of operation of the different switching sets in accomplishing an automatic reporting of the opening of a circuit breaker at one of the points at one of the controlled stations.

As noted above, with the operation of a key, such as selection key 1 at point 1 (see FIG. 3), to effect the closing of a circuit breaker (or other functional apparatus for point 1 at a controlled station) the pattern of operation includes (a) the transmission of a group selection code by the control station; (b) the transmission of a point selection code by the control station; and (c) the transmission of an indication code ("open" in the present example) by the controlled station. As the attendant then operates the "close" key the control sends a "close" code to effect closing of the circuit breaker, and after such operation the controlled station transmits a closed indication code to the control station, and the control station sends a closed indication check code to the controlled station and thereafter a reset signal.

As described hereinbefore, with the system at rest prior to the operation of selection key 1 for point 1 by the attendant to accomplish such operation relays RL, AR, CO, LS, LSA, LSB, at the control station are in the operated condition and green lamp on point 1 is energized. At controlled station No. 1 (FIGS. 20–30), relays *rl*, *ar*, *co* and *s1* are in the operated condition.

Figure 3:
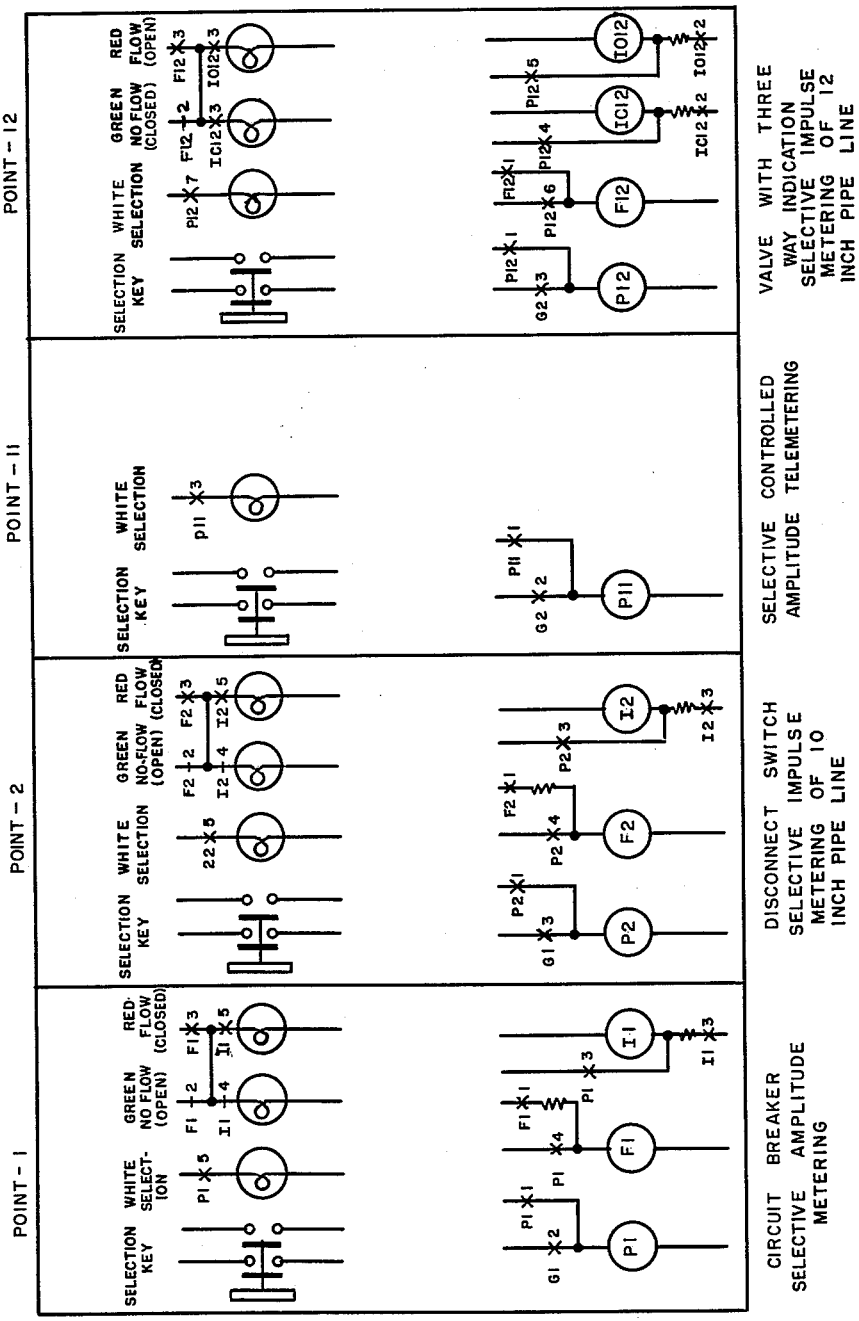
FIGURE 3 is a schematic representation of the component members associated with points, 1, 2, 11, 12 at the Control Station.

As the Selection Key for point 1 is now operated (FIG. 3) a first contact set of selection key 1 indicated as selection key 1–10 (FIG. 8) will close an operating circuit to group selection start relays GS1 and GS2, which extends from direct positive over contacts OS–2, GS1 second winding, selection key 1–10, relay GS2 first winding to the negative bus. At the same time, a further contact set on selection key 1, labeled selection key 1, 11 and 21 (FIG. 9), will be closed to interconnect the second winding of relay PS1 and the first winding of relay PS2, which operate over the circuit which extends from direct positive over contacts OS–3, the second winding of relay PS*i*, contacts 9, 11, 21 of the selection key 1, and the first winding of relay PS2 to the negative bus. The manner of connection of the two contact sets of the selection key 1 for point 1 for momentary operation by a single push button is shown in FIGURE 3. Although it would be possible in the showing of FIGURES 2A and 3 to have a set of ten group selection keys, and another set of ten unit selection keys as shown in FIGURES 8 and 9, for simplicity of disclosure, a single contact is shown in the drawing rather than a plurality of contacts connected in parallel. Thus, the selection key for point 2 as shown in FIGURE 3A is included in and represented by the contact set "Selection Key 1–10" in FIGURE 8; and in FIGURE 9 by the contact sets designated "Selection Key 2, 12, and 22." Similarly the selection key contact sets shown in FIGURE 3 for point 11 are represented in FIGURE 8 by "Selection Key 11 to 20; and in FIGURE 9 by "Selection Key 1, 11, and 21." The selection key for point 12 shown in FIGURE 3 is represented in FIGURE 8 as the "Selection Key 11–20" and in FIGURE 9 as "Selection Key 2, 12, 22." Similarly, the contact set designated Selection Key 1–10 (FIG. 8) represents that contact set of each of the selection keys from 1 to 10; the contact set indicated as selection key 11–20 (FIG. 8) represents that contact set of each selection key 11 through 20; the contact set designated Selection Key 21–30 represents that contact set of each of the selection keys of points 21 to 30; etc.

Referring to FIGURE 9 the portion designated Selection Key 1, 11 and 21 represents that contact set of each of the selection keys for points 1, 11 and 21; in other words, the keys of the group which have the units digit 1 assigned thereto. The selection key designated Selection Key 2, 12 22 represents the contact set of each of the selection keys for points 2, 12 and 22; and similarly, the selection key designated Selection Key 3, 13 and 23 represents that portion of the selection keys for points 3, 13 and 23, etc.

In the system of the present disclosure, the points are divided into groups, each group being represented by a code and each point being represented by a code. Thus, point 1 is the first point in the first group, and group 1 is represented by a code 1–2 and point 1 is represented by code 1–2. Group selection start relays GS1 and GS2 (FIG. 8) are operated to effect group selection and point selection relays PS1 and PS2 (FIG. 9) are operated in series to effect point 1 selection. With group selection relays GS1 and GS2 operated during a code transmission, long pauses are inserted at spaces one and two of the group selection code, and with point selection relays PS1 and PS2 operated, long pauses will be inserted in spaces one and two of the point selection code.

The code for group 2 is 1–3. Thus, if it were desired to select group 2, relays GS1 and GS3 are operated in series to provide long spaces for pulses 1 and 3. In the selection of group 3, relays GS1 and GS4 are operated to provide long pauses for the spaces of impulses 1 and 4; relays GS1 and GS5 are operated to select group 4; relays GS2 and GS3 are operated to select group 5; relays GS2 and GS4 are operated to select group 6; relays GS2 and GS5 are operated to select group 7; relays GS3 and GS4 are operated to select group 8; and relays GS3 and GS5 are operated to select group 9.

The point selection relays are operative in similar combinations to effect the transmission of different point selection codes. That is, relays PS1 and PS2 (FIG. 9) are operated to select point 1; relays PS1 and PS3 are operated to select point 2; relays PS1 and PS4 are operated to select point 3, etc. The pattern of operation of the group selection relays GS and point selection relays PS to provide different code transmission is believed to be apparent from such description.

*Group Selection Code—Operation at Control Station*

The sequence of operation of a selected pair of group start relays to effect such manner of code transmission is now set forth in detail. Thus with operation of selection key 1 at point 1 to operate relays GS1 and GS2 an energizing circuit is completed for outgoing start relay OS in the start circuit (FIG. 18) which extends from the negative bus through the winding of relay OS, over the contacts GS1–4 and GS2–4 in parallel and through contacts IS–3 to the indirect positive bus.

Relay OS operates and locks at its contacts OS–6 to the indirect positive bus, and at its contacts OS–2 (FIG. 8) and OS–3 (FIG. 9) prevents additional code preparation relays from being operated should another selection key be depressed during the operation which has been initiated. Relay OS (FIG. 18) operates and at its contacts OS–10 closes a circuit to operate transmitting control relay TC (FIG. 19) over a path which extends from the negative bus, over winding of relay TC, contacts SF6, CS4, OS–10 and PD–6 to the negative bus.

Transmitting control relay TC operates and at its contacts TC–7 extends its positive operating potential over contacts TC–7, contacts LN–3, RS–4 and the winding of relay TR to the negative bus to energize the transmitting relay TR and to complete a self-interrupting circuit for relays TR and LN which operate alternately and sequentially to transmit impulses over the line conductors; at its contacts TC–8 disconnects meter M and line supervision relay LS from the line circuit, and at its contacts TC–5 opens the circuit for auxiliary line supervision relay LSA to release the same; and at its contacts TR–1 and TR–2 further opens the circuit to relay LS and meter M; at its contacts TR–4 and TR–5, closes a circuit to operate the line relay LN as previously described, and to extend positive and negative potential over the line channel to the distant end to operate the line relay *ln* thereat; and at its contacts TR–3, removes the shunt from resistor RR18, inserting resistor RR18 in the local operating circuit of relay LN. Resistor RR18 is provided to adjust the resistance of the local and distant operating circuits of LN and ln to more nearly equal values. The impulses which are thus transmited over the line are also transmitted to the counting circuit (FIG. 16) for the control station which is operative to limit the number of impulses in each group to a predetermined number, which in the present example is six. More specifically, relay LN operates and at its contacts LN1 completes a circuit for the first counting relay C1 (FIG. 16) over a circuit which extends from direct positive over contact LN–1, RL–2, INC–6, C0–4, C5–4, the first winding of C1 to the negative bus. Relay C1 operates and at contacts C1–5 locks over its second winding over a path which extends from the negative bus to the second winding of relays C1, contacts C1–5, C2–5, C3–4, C4–5, C5–6, and C0–6 in parallel to the indirect positive bus. Relay LN at its contacts LN–3 opens the circuit of relay TR which begins to release slowly.

It will be recalled that the code for point 1 is 1–2, and relays GS1 and GS2 are therefore in the operated condition. As a result, as counting chain relay C1 operates it is effective at its contacts c1–1 to complete a circuit for pause determination relay PD (FIG. 11) which extends from the negative bus over the winding of relay PD, contacts C0–2, C1–1, GS1–2, GS–1 and TC–1 and the indirect positive bus to control energization of the pause determination relay PD and the generation of a long space for the first pulse.

Relay PD operates and at its contacts PD6 (FIG. 19) opens the original operating circuit for relay TC which is held operated until the line relay LN releases over the circuit which extends over contacts TC–7, LN–2, and resistor RR17 to the indirect positive bus. When relay TR releases according to its slow release characteristics, it opens the circuit of relay LN, releasing LN which in turn releases relay TC. With contacts PD6 and TC–7 open, no reoperating circuit is completed for relay TR which remains released.

Figure 16:
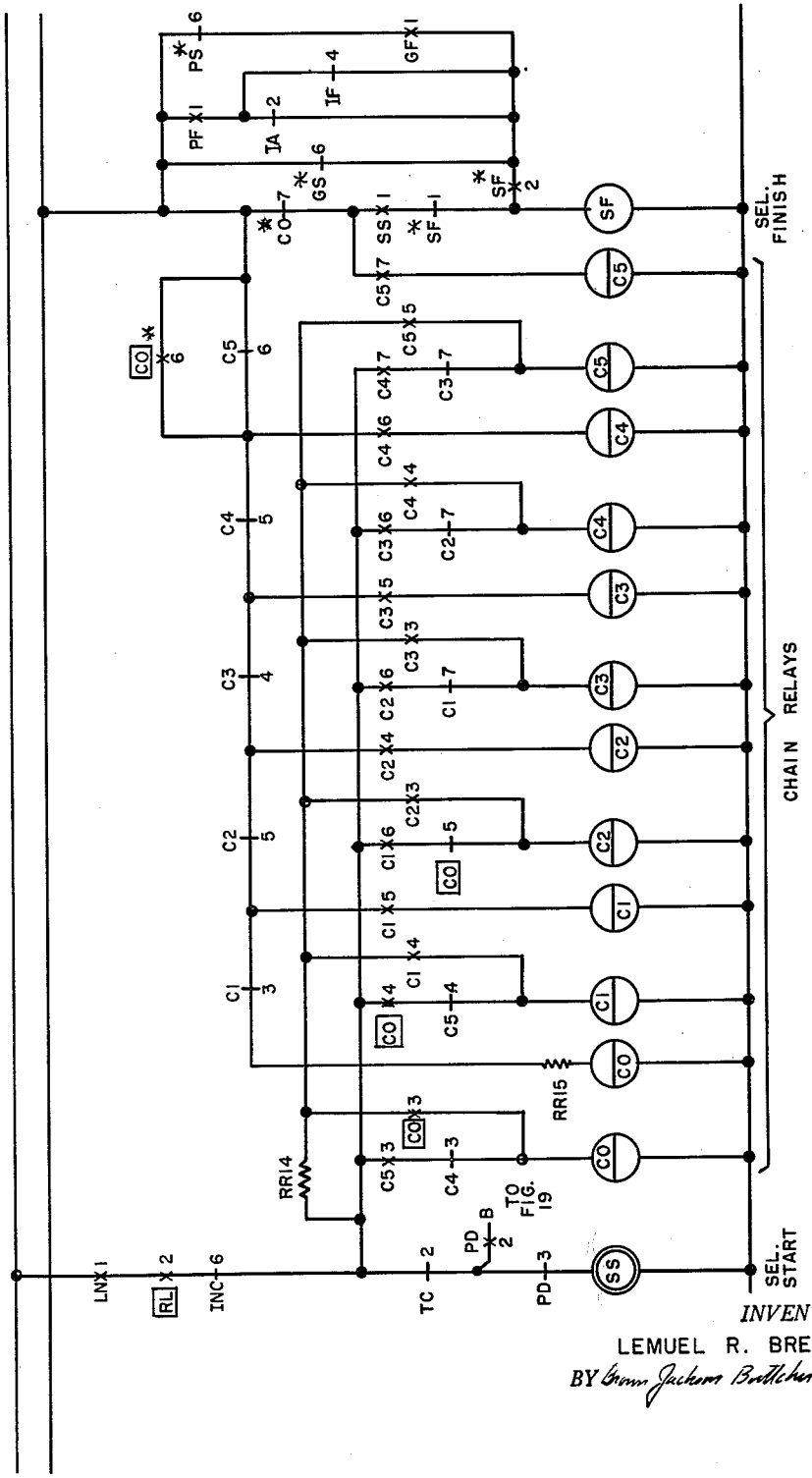

Referring to FIGURE 16, when line relay LN releases, it opens its contacts LN–1 to release relay C0 which was holding over the path which extends from the negative bus over the first winding of contacts C0–3, resistor RR14, contacts INC–6, RL–2, and LN–1. With relay C1 operated and relay C0 released, a circuit is completed to operate register relay R1 (FIG. 17) from the negative bus to the winding of relay R1 through contacts C1–8, C0–9, PF–2, TC–3, and PD–4 to the indirect positive bus. Relay R1 operates and at its contacts R1–8 locks over the circuit which extends from the negative bus over the winding of relay R1, through contacts R1–8 and over the contacts GS–6 (FIG. 16) to the indirect positive bus. The release of relay TC at its contacts TC–1 (FIG. 11) opens the circuit of pause determination relay PD which releases after an interval as determined by its slow to release characteristics. It should be observed that the slow release period of relay PD is the main factor in establishing the long pause of the first pulse.

When relay PD releases, the energizing circuit is completed to reoperate relay TC, which reoperates relay TR, which reoperates relay LN in the manner of the previous cycle to initiate transmission of the second pulse.

During the make period of the second pulse, line relay LN operates and relay C1 holds over the circuit which extends from the negative bus through the left winding of C1, over contacts C1–4, resistor RR14, and contacts INC–6, RL–2 and LN–1 to the direct positive bus. Relay C2 now operates over the circuit which extends from the negative bus through the left winding of relay C2 and contacts C0–5, C1–6, INC–6, RL–2, and LN–1 to the positive bus, and at its contacts C2–4 locks over the circuits which extend from the negative bus over the right winding of C2, contacts C2–4 and break contacts C3–4, break contacts C4–5, and break contacts C5–6 to the indirect positive bus. Line relay LN in its operation opens the circuit of relay TR in the manner previously described, which releases slowly.

In that the group selection code for point 1 is 1–2, the second space of the impulse group must also be of an increased duration, which duration is now effected by reason of the operated condition of relays GS1–GS2. That is, the operation of relay C2 to indicate the generation of the second pulse operates relay PD (FIGURE 11) over the circuit from the negative bus to the winding of relay PD, over contacts C1–2, C2–1, GS2–2, GS1–3, GS–1, TC–1, to the indirect positive bus to prepare for the second long pause. Pause determination relay PD again opens a contact in the operating circuit of relay TC, and after the expiration of its slow release period, relay TR releases in turn releasing relay LN which releases relay TC (which was holding to LN) and counting chain relay C1.

The release of relay C1 operates the second register-relay R2 (FIG. 17) to indicate the transmission of the second pulse over the circuit extending from the negative bus to the winding of relay R2, through contacts C2–8, C1–9, C0–9, PF–2, TC–3 and PD–4 to the indirect positive bus. The release of relay TC opens the contacts TC–1 (FIG. 11) which causes relay PD to go through its slow releasing period. After relay PD has released, relay TC is operated, in turn reoperating relay TR which, in turn, reoperates relay LN in the manner of the previous description to begin the make period of the third pulse following the second long pause. The further cycling of the relays in such manner is obvious and is therefore only generally described.

Relay LN in its operation completes an energizing circuit for counting chain relay C3 and opens the circuit of relay TR. After relay TR releases according to its slow releasing characteristics, the circuit of relay LN is opened starting the short space period of the third pulse. The release of relay LN effects restoration of relay C2 and operation of relay TR which in turn operates relay LN to begin the make period of the fourth pulse. Relay LN operates and completes an energizing circuit for counting chain relay C4 and releases relay TR, the release of relay TR restoring relay LN to begin the break period of the fourth pulse.

The release of relay LN effects restoration of relay C3 and operation of relay TR which in turn reoperates relay LN to the fifth pulse. Relay LN operates to complete a circuit for counting chain relay C5 and to open the circuit of relay TR which releases according to its slow release characteristics, in turn releasing relay LN to initiate the break period of the fifth pulse.

The release of relay LN effects restoration of relay C4 and operation of relay TR, which in turn reoperates relay LN to initiate the beginning of the sixth pulse. The operation of relay LN operates relay CL and releases relay TR which begins to release slowly. With relay C0 reoperated, a circuit is completed to reoperate relay PD (FIG. 11) over the path which extends from the negative bus through the winding of relay PD to contacts C5–1, C0–1, TC–1, to the indirect positive bus.

Since the system is connected to transmit six impulses in each code group, which six impulses are now registered on the counting relays, a stop signal is generated for the self-pumping relays TR and LN. More specifically, with counting relays C0 and C5 both operated as a result of the sixth pulse, a circuit is now completed to operate the code stop relay CS (FIG. 17) which circuit extends from the negative bus over the winding of relay CS, contacts C0–10, C5–9, TC–4, to the indirect positive bus. Both pause determination relay PD at its contacts PD–6 (FIG. 19) and the code stop relay CS at its contacts CS–4 (FIG. 19) hold open the circuit of transmitting control relay TC. As relay TR presently releases according to its slow release characteristics, the operating circuit for relay LN is opened to end the make period of the sixth pulse.

It should be observed that relay TC remains operated through the contacts TC7 and LN–2 until relay LN releases. The release of relay LN following the sixth make period also opens the holding circuit for counting chain relay C5.

The system now registers the fact that the group code has been received, registered and marked, relay TC in its release completing a circuit to operate the group code relay GC (FIGURE 17) over the path which extends from the negative bus through the winding of relay GC over contacts GF–2, R5–6, R4–11, R3–11, make contacts R2–11, make contacts R1–7, contacts CO–3, PF2, TC–3, PD–4 to the indirect positive bus. Relay GC operates and at contacts GC–1 establishes a temporary holding circuit for relay PD from the negative bus over the winding of relay PD through contacts GC–1 and PD–1 to the indirect positive bus, and at its contacts GC–2 completes a circuit to operate the group 1 selection relay G1 (FIG. 12) from the indirect positive bus over contacts R1–1, R2–1, GC–2, and the winding of G1 to the negative bus.

Group selection relay G1 operates and at its contacts G1–1, extends its operating positive to the coil of group selection start relay GS, which operates, and at its contacts GS–5 extends its operating circuit through the coil of the group selection finish relay GF to indirect positive bus. Relay GF does not operate at this time since it has positive potential connected to both sides of its winding. Relay GS operates and at its contacts GS–6 (FIG. 16) releases register relays R1 and R2 (FIG. 17), and at its contacts GS–2 releases code stop relay CS. Register relays R1 and R2 restore to operate the circuit of relay GC (FIG. 17), which releases, and interrupts certain of the paths for relays G1 and GS. When such paths are opened, relay GS operates in series with relays G1 and GS to hold these relays operated, and at its contacts GF–5 (FIG. 17) prepares a new holding circuit for the code stop relay CS which will be effective during the point selection code which follows.

Relay GC in its release is effective at its contacts GC–1 (FIG. 11) to open the holding circuit for pause determination relay PD which releases according to its slow release characteristic, its slow release being an important factor in determining the interval between the group selection code and the point code.

*Group Selection Code—Operations at Controlled Station*

Referring now to the operations which are transpiring at the Controlled Station as the result of the receipt of the group selection code, it should be recalled that relay *ln* at the Controlled Station is operated and released with the relay LN at the Control Station to register the code of the desired groups of points on the equipment thereat. As relay LN operates on the make period of the first pulse of the group selection code the operating circuit relay *ln* at the Controlled Station (FIG. 30) may be traced as follows; direct positive bus (FIG. 19) contacts TR–4, line L2 (FIG. 19) through the connections in FIGURE 1 to L2 (FIG. 30), rectifier *dd2* in the forward direction, winding of relay *ln*, contacts *tr*–3, resistor *rr*18, line L1 (FIG. 30) through the connections shown in FIGURE 1 to the terminal L1 (FIG. 19), resistor RR19, contacts TR–5 to the negative bus (FIG. 19).

As relay *ln* operates it is effective at contacts *ln*–1 to complete a circuit to operate counting chain relay *c1* (FIG. 27) from the direct positive bus over contacts *ln*–1, *rl*–2, *inc*–9, *slo*–3, *co*–4, *c5*–4, and the winding of relay *c1* to the negative bus; and at its contacts *ln*–1 also operates selection start relay *ss* (FIG. 27) over the circuit which extends from the direct positive bus over contacts *ln*–1, *r1*–2, *inc*–9, *tc*–2, *pd*–3, and the winding of relay *ss* to the negative bus.

Counting chain relay *c*–1 operates and at its contacts *c1*–10 completes an operating circuit for the incoming start relay (FIG. 29) which extends from the negative bus over the winding of relay *is*, contacts *c1*–10, and *os*–2 to the indirect positive bus.

At the end of the mark portion of the first pulse, relay *ln* releases, and at its contacts *ln*–1 (FIG. 27) releases counting relay *co* which was holding through its contacts *co*–3, and at its contacts *ln*–1 also opens the circuit of selection start relay *ss* which does not release immediately but goes through its slow release period. With relay *co* released, and relay *ss* operated a circuit is completed to operate selection finish relay *sf* over the path which extends from the negative bus to the winding of relay *sf* (FIG. 27), contacts *sf*–1, *ss*–1, *co*–7, to the indirect positive bus. After an interval as determined by its slow release characteristics, relay *ss* releases, and at its contacts *ss*–2 operates the first code register relay *r1* (FIG. 28) over the path which extends from the negative bus to the winding of relay *r1* over contacts *c1*–8, *co*–9, *sf*–3, and *ss*–2 to the indirect positive bus.

It should be noted that the long pause received during the space period of the first pulse permitted the release of relay *ss* and the operation of register relay *r1*, to thereby register the first space code digit one.

Figure 27:
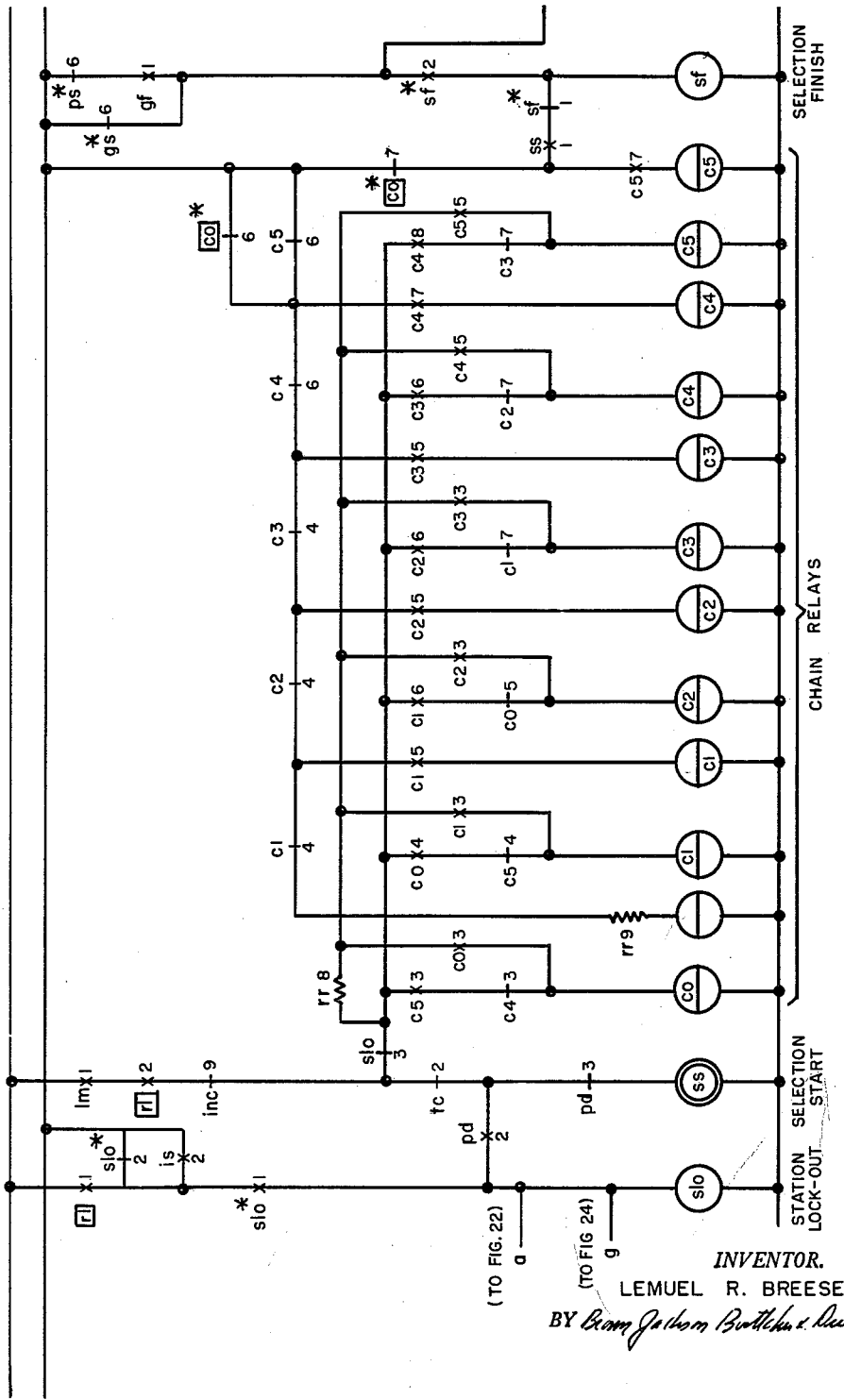

When the channel is again energized from the main station, line relay *ln* again operates in turn operating relay *ss* (FIG. 27) and the second counting chain relay C–2 (FIG. 27). Relay *c*–2 operates over the circuit which extends from negative bus over the left winding of relay *c2*, contacts *co*–5, *c1*–6, *slo*–3, *inc*–9, *r1*–2, *ln*–1 to the positive bus.

When the space portion of the second pulse appears, relay *ln* restores to release relay *c1* which has been holding through its contacts *c1*–3 via resistor *rr*–8. The release of relay *ln* also opens the circuit of relay *ss* which, because of the long pause which is received during the second space period will restore, in turn operating register relay *r2* (FIG. 28) over a path which extends from the negative bus over the winding of relay *r2* through contacts *c2*–8, break contacts *c1*–9, *co*–9, *sf*–3, break contacts *ss*–2, to the indirect positive bus. On the mark portion of the third pulse, relay *ln* again operates in turn operating relay *sc*–3 and *ss*.

When the space portion of the third pulse appears, relay *ln* releases in turn releasing relay *c2*. In that the space period is not of a prolonged duration relay *ss* will not release, and no registration is made on the register relays.

When the make portion of the fourth pulse appears relay *ln* reoperates in turn reoperating counting chain relay *c4*. When the space period of the fourth pulse appears, relay *ln* releases in turn releasing counting chain relay *c3*. In that the space period is not of a prolonged duration relay *ss* will not release, and no registration is made on the register relays.

When the fifth pulse appears on the channel, relay *ln* reoperates, in turn operating relay *c5*. When the space portion of the fifth pulse appears, relay *ln* releases, in turn releasing relay *c4*. In that the space period is not of a prolonged duration relay *ss* will not release, and no registration is made on the register relays.

When the space portion of the sixth pulse appears, relay *ln* releases, in turn releasing relay *c5* and opening the circuit of relay *ss*.

As noted, when the space portion of the pulses was short (space pulses 3, 4, 5) relay *ss* did not release. However, at the end of the mark portion of the sixth pulse, a long intercode space portion is transmitted by the Control Station and relay *ss* releases.

After relay *ss* releases according to its slow release characteristics, a circuit is completed to operate group code relay *gc* (FIG. 28) over a path which extends from the negative bus to the winding of relay *gc*, over contacts *gf*–2, *r5*–7, *r4*–11, *r3*–11, make contacts *r2*–9, make contacts r1–5, contacts co–2, sf–3, and ss–2 to the indirect positive bus. It should be observed that the energizing circuit for group code relay gc is completed with selection start relay ss released and selection finish relay sf operated.

Relay gc operates and at its contacts gc–2 energizes relays g1 and g1a (which are respectively group 1 selection relay and group 1 selection auxiliary relay) in parallel over the path which extends from the negative bus to the windings of relays g1 and g1a over make contacts gc–2, r2–1 and r1–1 of the register relays to the indirect positive bus. Relays g1 and g1a operate and extend their operating positive over contacts g1–1 to relay gs (FIG. 22) which is the group selection start relay. Relay gs operates and extends its operating circuit through the winding of relay gf (FIG. 22) and the make contact gs–5 to the indirect positive bus. Relay gf, which is the group selection finish relay, does not operate at this time since it has the same positive potential on both sides of its coil.

It should be observed that register relays r1 and r2 in operating lock through their respective contacts r1–6 and r2–10 (FIG. 28) over a circuit which extends through contacts gs–6 (FIG. 27) to the indirect positive bias. Now with relay gs operated, contacts gs–6 open to release relays r1 and r2, and also to release relay sf.

As register relays r1 and r2 restore and at contacts r1–5 and r2–9 release relay gc, and at contacts r1–1 and r2–1 release the original operating positive potential for relays g1 and g1a (which was shunting relay gf), relay gf operates in series with relays g1, g1a and gs, and in its operation marks the fact that the group selection has been completed, and at its contacts gf–1 (FIG. 27) prepares a holding circuit for the code register relays (FIG. 28) and the code stop relay of cs which is effective as the next code is received.

*Point Selection Code—Operations at Control Station*

In brief review at this time, the group selection code has been generated, transmitted and registered on the equipment at both Control and Controlled Stations, the code in the present example comprising a long space at the first and second space intervals of the six impulse code (code 1–2) to the selection of a point in the first group. As indicated above, a long pause is inserted after the transmission of the group selection code by the control station and thereafter a point selection code is transmitted to select the desired point. In that point 1 is being selected in the present example, and point 1 is represented by code 1–2 in the point selection code transmission, the operation of the selection key at point 1 resulted in the operation of point selection relays PS1 and PS2 (FIG. 9) in combination to mark such code, and to control the insertion of long pauses in the first and second spaces of the six impulse code transmission for point selection.

More specifically, at the Control Station the release of relay GC opens the holding circuit of relay PD (FIG. 11) and after an interval as determined by its slow to release characteristics, relay PD seleases, in turn reestablishing the circuit for transmitting control relay TC (FIG. 6) which in turn operates relay TR (FIG. 6). Relay TR operates and completes the energizing circuit for line relays LN and ln. Relays TR and LN reestablish the self-interrupting and pumping circuit to effect the generation of impulses for transmission over the line condoctor.

With point selection relays PS1 and PS2 (FIG. 9) operated for the purpose of inserting long pauses in the spaces associated with the first and second pulses of the point selection code, pause determination relay PD will be operated and released on the first pulse, and also will be operated and released on the second pulse for the purpose of providing the long pauses. The sequence of operation of the point selection relays and pause determination relay is essentially the same as that already described for the group selection code inasmuch as the group selection code in the present example is 1–2 and the point selection code is also 1–2. However, the operating circuits for relay TD are different as now shown.

Referring to FIGURE 11, the operating circuit of pause determination relay PD during the mark period of the first pulse of the point selection code may be traced from the negative bus to the winding of relay PD, through contacts C0–2, C1–1, PS1–2, PS–1, GS–2, and TC–1 to the indirect positive bus. The operating circuit for relay PD during the mark period of the second pulse is as follows: negative bus, through the winding of pause determination relay PD, through contacts C1–2, C2–1, PS2–2, PS1–3, PS–1, GS–2, and TC–1 to the indirect positive bus. At the end of the sixth pulse as relay LN at the Control Station releases, relay TC and relay C5 release as before. As relay TC releases, the circuit of relay PD is opened at contacts TC–1 (FIG. 11) and relay PD begins its slow release.

Figure 13:
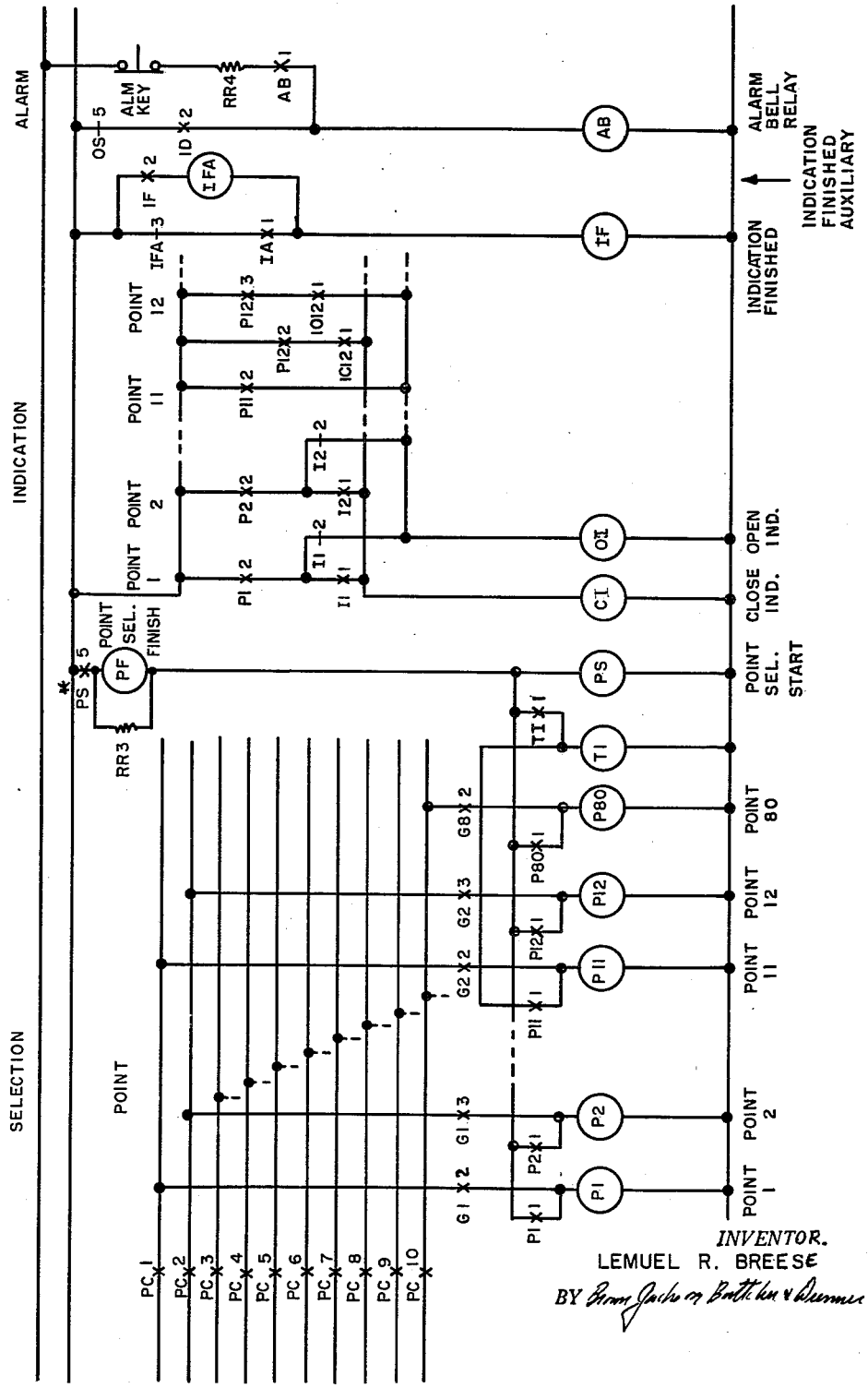

Relay GS (FIG. 17) operates at the end of the group code, and is transferred from the circuit of GC to the circuit of PC, and point code relay PC operates over the circuit closed by relay PD as follows: negative bus to the winding of relay PC, over contacts PF–3, GF–3, R5–6, R4–11, R3–11, R2–11, R2–7, C9–8, PF–2, TC–3, and PD–4 to the indirect positive bus. Relay PC operates and at its contacts PC–1 closes a circuit for point 1 selection relay P1 (FIG. 13) which extends from the negative bus over the winding of relay P1, contacts G1–2, PC–1, R2–1 and R1–1 to the indirect positive bus. Relay P1 operates and at its contacts P1–1, extends its operating positive potential to the point selection start relay PS (FIG. 13). Relay PS operates and at its contacts P1–6 (FIG. 19), prepares a circuit for amplitude meter M (FIG. 19) in the metering circuit in preparation for amplitude metering of metering source ms1 (FIG. 30); at its contacts P1–2 (FIG. 13) extends positive potential on the indirect positive bus through contacts P1–2 to either close indication relay CI or open indication relay OI (FIG. 13), the circuit extended being determined by the position of contacts I1–1 or I1–2.

In the present example, it was assumed that the circuit breaker was last in the open condition, and contacts I1–2 will therefore be closed to complete an operating circuit for the open indication relay OI. It is noted that relay I1 (FIG. 14) will either be operated or released, depending upon the last signal indication of the circuit breaker condition.

The operation of relay PS at its contacts PS–6 (FIG. 16), also opens the holding circuit of register relays R1 and R2 to release the same. The release of register relays R1 and R2 in turn removes the original operating circuit of relays PS, TN and P1, allowing relay PF which has shunted to now operate in series with relays P1 and PS. Register relays R1 and R2 in restoring also open the circuit of relay PC, releasing the same, which relay in turn opens the energizing circuit for relay PD which releases a short time thereafter, as determined by its slow to release characteristics. In that the code stop relay CS is restored and contacts CS–4 (FIG. 19) are open, the release of relay PD does not reoperate transmission control relay TC (FIG. 19) as at the end of the group selection code. Code stop relay CS is held locked over a path which extends from the negative bus over the winding of relay CS, contacts CS–2, GF–5, OC–8, and IA–3 and IFA–2 in parallel to the indirect positive bus.

*Point Selection Code—Operations at Controlled Station*

With relay TC now restored, the Control Station awaits the receipt of a signal from the Controlled Station. That is, the Control Station has transmitted the group selection code (1–2) and the point selection code (1–2) to effect selection of point 1 at the Controlled Station and must now await the receipt of an indication code which indicates to the Control Station the nature of the selection codes received.

The Controlled Station equipment as indicated above responds to the point selection code which was transmitted by the Control Station by effecting operation of the point selection relay P1.

More specifically, when relay ln releases at the Controlled Station at the end of the sixth pulse, the opening of contacts ln–1 releases relay c–5 and opens the circuit of slow release selection start relay ss, which releases after an interval as determined by its slow to release characteristics. With relay ss released, a circuit is completed to operate point code relay pc from the negative bus over the winding of relay pc, through contacts pf–1, gf–3, r5–7, r4–11, r3–11, r2–9, r1–5, co–8, sf–3, ss–2, to the indirect positive bus. The selection of relay pc occurs during the interval when relay sf is still operated and relay ss is released.

In that register relays r1, r2 (FIG. 28) were operated responsive to receipt of the point selection code (1–2), as relay pc now operates, a circuit is completed to operate point selection relay p–1 (FIG. 24) for point 1, the circuit extending from the negative bus over the winding of relay p–1, contacts g1–2, pc–2, over the connected conductor to contacts r2–1 (FIG. 22) and r1–1 to the indirect positive bus. Relay p–1 operates, and at its contacts p1–1 extends its operating positive potential over wire option d to the coil of the point selection start relay ps, operating the same. At its contacts p1–5 (FIG. 26), relay p1 operates the metering relay m1 from the indirect positive bus through contacts is–1, p1–4, the winding of relay m1 to the negative bus. At its contacts m1–1 and m1–2, relay m1 connects the metering source ms1 (FIG. 30) to the transmitter t (FIG. 30) in preparation for amplitude metering on point 1. Relay ps operates and at its contacts ps–5, places relay pf in series with relay ps but relay pf is shunted until the original operating circuit of relay ps is removed, and at its contacts ps–6 (FIG. 27) releases register relays 4—1, 4—2 (FIG. 28) and selection finish relay sf (FIG. 27). Relay sf releases and its contacts sf–3 (FIG. 28), in turn release relay pc. The release of register relays r–1 and r–2 opens the original circuit of point relay p1 (FIG. 24) to remove the shunt from relay pf which operates in series with relays p1 and ps. Relay ps at its contacts ps–3 completes a locking circuit for relay p1, ps and pf.

At this time, the controlled station equipment is conditioned to initiate the transmission of the indication code. That is, relay sf releases, and at its contacts sf–5 (FIG. 30), completes a circuit to operate the transmitting control relay tc over a path which extends from the negative bus through the winding of relay tc, over contacts sf–6, cs–4, ioc–9, icc–9, os–5 (or ps–7), and pd–6 to the indirect positive bus. Relay tc operates, and at its contacts tc–5 completes a circuit to operate the delay start auxiliary relay dsa (FIG. 29) which extends from the negative bus over the winding of relay dsa over contacts tc–5 to direct positive bus, and at its contacts tc–6 extends its operating potential over contacts ln–3 and rs–3 to relay cr. Relay dsa operates and at its contacts dsa–1 completes an energizing circuit for delay start relay ds.

Relay tr operates and at contacts tr–1 and tr–2 opens the metering circuit, this circuit having been also opened by contacts tc–7, and at its contacts tr–4 closes a circuit to operate relay ln at the Controlled Station over the path which extends from the positive bus, over contacts tr–4, diode dd–2 in the forward direction, winding of relay ln, resistor rr–17, and contacts tr–5 to the negative bus; and at its contacts tr–3 opens the short across resistor rr–17. Relay tr also operates relay LN at the Control Station over the circuit which extends from the direct positive bus over contacts tr–4, conductor L–2, diode DD–6 (FIG. 19) in the forward direction, the winding of relay LN, contacts TR–3, resistor RR–19, conductor L–1, resistor rr–18 (FIG. 3) and contacts tr–5 to the negative bus.

Accordingly, the line relays at the Controlled and Control Station operate and the first marking element of the first impulse of the open indication code is generated.

*Open Indication Code—Operation at Controlled Station*

Assuming that the circuit breaker on point 1 at the Controlled Station is in the open position, the Controlled Station transmits the open indication code comprising a series of six pulses having elongated spaces associated with the first and the fifth pulse. In the description of such operation, the sequence is first described at the Controlled Station and thereafter the sequence at the Control Station is set forth.

More specifically, with the operation of relay ln at the Controlled Station, a circuit is completed for the first counting relay c–1 (FIG. 27) over a path which extends from the direct positive bus over contacts ln–1, r1–2, inc–9, slo–3, co–4, c5–4, and the left winding c–1 tot he negative bus. As the operation of the counting chain is similar to that already described, the details of its operation will not be repeated. Line relay ln at its contacts ln–2, holds transmitting control relay tc (FIG. 30) operated over the path which extends from the negative bus over the winding of relay tc, contacts tc–6, ln–2, resistor rr–14 to the indirect positive bus, and at its contacts ln–3, opens the circuit of transmitting relay tr which begins to release slowly.

As the long pause or spaces in the six impulse open indication code occur at the first and the fifth impulses, circuits for operating relay pd will be found during the mark periods of the first and fifth pulses. It is noted that in the present system open indication relay oi is only used in conjunction with a valve operation on point 12, and should be considered in the non-operated condition for a breaker operation. Closed indication relay ci is operated if a circuit breaker is in the closed position and is restored if the circuit breaker is in the open position. Accordingly, with the breaker found open and relay ci released during the mark period of the first pulse, relay pd (FIG. 20) is operated over the path which extends from the indirect positive bus (FIG. 20) over contacts tc–1, gs–2, and then over contacts ps–4 (FIG. 21), ci–2, rc–4; contacts ci–1 (FIG. 20) c0–2, and the winding of pause determination relay pd to the negative bus.

With relay pd operated during the mark period of the first pulse, the equipment will produce a long pause during the generation of the following space period. That is, when relay tr releases, the circuit of relay ln is opened, which in turn opens the circuit of relays tc and co to release the same. When relay tc releases, the circuit of slow-to-release relay pd is opened, and relay pd releases after an interval, the slow release interval of relay pd being the main factor in producing the long pause in the space of the first impulse.

Relay pd releases, and at its contacts pd–6 completes a circuit to operate transmitting control relay tc (FIG. 30), which in turn operates transmitting relay tr. Relay tr operates to complete an energizing circuit for relays ln and LN at the Controlled and Control Stations respectively for the mark period of the second pulse. The operation of relay ln at the Controlled Station effects the operation of the second counting chain relay c2 and releases the transmitting relay tr which releases after an interval, in turn releasing relay ln and LN to end the mark period and begin the space period of the second pulse. With relay ln released, the short space following the second mark period is initiated. The release of relay ln reoperates relay tr and releases counting chain relay tc–1.

The reoperation of the transmitting relay tr effects the reoperation of the line relay ln to begin the mark period of the third pulse. The operation of relay ln operates counting chain relay c–3, and releases relay tr which releases after an interval in turn releasing ln. The release of relay ln following the mark period of the third space releases the counting chain relay c–2 and reoperates the transmitting relay *tr* which in turn reoperates *ln*. The release period of *ln* defines the short space period of the third pulse.

The subsequent operation of relay *ln* effects the operation of counting chain relay *c–4*, and opens the circuit of relay *tr* which goes through its slow release period in turn releasing relay *ln* to generate the mark period of the fourth impulse. The release of relay *ln* for the space period of the fourth pulse in turn releases counting chain relay *c–3* and reoperates transmitting relay *tr*.

The operation of transmitting relay *tr* reoperates the line relays at the Control Station and the Controlled Station, and the operation of relay *ln* marks the beginning of the mark period of the fifth impulse, and effects the operation of counting chain relay *c–5* and opens the circuit of relay *tr* which goes through its slow release period. In that the code indication requires a long space at this time, relay *pd* (FIG. 20) is operated during the mark period of the fifth pulse over the path which extends from indirect positive bus over contacts *tc–1* (FIG. 20), *gs–4*, *ps–3*, *oi–2*, *c5–2*, *c4–2*, and the winding of relay *pd* to the negative bus. Relay *tr* releases slowly and in turn releases relays *ln*, LN to terminate the mark period of the fifth pulse and to begin the space period of the fifth pulse. The release of relay *ln* effects the release of relay *c4* of the counting chain and the release of transmitting control relay *tc*. Relay *tc* releases and at its contacts *tc–1* (FIG. 20) opens the circuit of relay *pd*, and relay *pd* begins its slow release period to insert a long pause in the space period of the fifth pulse. Relay *pd* in its release reoperates the transmitting control relay *tc*, which in turn operates the transmitting relay *tr*, which in turn operates the line relays *ln* and LN to terminate the long pause associated with the fifth pulse and to initiate the mark period of the sixth pulse. The operation of relay *ln* effects the operation of counting chain relay *c0* and opens the circuit of the transmitting relay *tr* which begins its slow release.

In that six impulses have been transmitted, the equipment is now operated to initiate termination of the transmission of the code impulse group. That is, relay *c0* operates, and at its contacts *co–10* completes a circuit for the code stop relay *cs* (FIG. 28) which extends from the negative bus over the winding of relay *cs*, contacts *c5–9*, *c0–10*, and *tc–4* to the indirect positive bus. Code stop relay *cs* operates to prevent further transmission of codes from the Controlled Station until the receipt of further information from the Control Station.

With counting chain relays *c0* and *c–5* both operated, a circuit is again completed to operate the pause determination relay *pd* over the path which extends from the indirect positive bus over contacts *tc–1*, *c0–1*, *c5–1*, and the winding of relay *pd* to the negative bus. As relay *tr* releases, it effects the release of the line relays at both ends to terminate the mark period of the sixth pulse. The release of relay *ln* releases counting chain relay *c–5* and also transmitting control relay *tc*, which at its contacts *tc–1* (FIG. 20) opens the circuit of relay *pd* which releases slowly. The release of relay *pd* effects the opening of contacts of *pd–5* (FIG. 29), in turn opening the circuit of delay start auxiliary relay *dsa* which goes through its slow release period. The release of relay *dsa* opens its contacts *dsa–1* (FIG. 29), in turn releasing delay start relay *ds* which goes through its slow release period. The function of relays *dsa* and *ds* is to delay the start of another operation from the remote station during a reset period long enough to allow the master or Control Station to start an operation, and to take preference is desired. As relay *pd* releases the transmitting control relay *tc* (FIG. 30) is prevented from reoperating by the open contacts of the code stop relay *cs–4*. Thus the Controlled Station ceases its transmitting operation and awaits a further operation at the Control Station.

*Open Indication Code—Operation at Control Station*

At the Control Station relay LN (FIG. 19) is operated and restored in a cyclic manner responsive to the receipt of the impulses of the open indication code to effect the marking of the incoming code, and the operation of the indication agreement relay IA or the indication disagreement relays ID, as the code indicates. In the present example, it was assumed that the circuit breaker at point 1 was open and that the equipment at point 1 was indicated as an open breaker.

More specifically, as line relay LN operates at the Control Station, it is effective at its contacts LN1 to close a circuit to operate counting chain relay CI (FIG. 16) from the direct positive bus over contacts LN–1, RL–2, INC–6, C0–4, C5–4, and the left winding of C–1 to the negative bus. With relays TC and pause determination relays PD non-operated, a circuit is completed to operate selection start relay SS over contacts TC–2 and PD–3 and ground.

At the end of receipt of the mark portion of the first pulse, relay LN releases in turn releasing counting chain relay C0 to open the circuit of selection start relay SS, and to operate selection finish relay SF over the path which extends from the indirect positive bus over contacts C0–7, SS–1, SF–1, and the winding of relay SF to the negative bus. The long pause transmitted from the Controlled Station allows start selection relay SS to release and when start selection relay SS releases at the end of its slow release period, a circuit is completed to operate register relay R1 (FIG. 17) over the path which extends from the indirect positive bus over contacts SS–2, SF–4, C0–9, C1–8, and the winding of R1 to the negative bus. Relay R1 operates and locks over the path which extends through its contacts R1–8, contacts IA–2 (FIG. 16) and IF–4 in parallel, and contacts PF–1 to the indirect positive bus.

When line relay LN reoperates at the beginning of the mark period of the second pulse, a circuit is completed to operate counting chain relay C–2 (FIGURE 16) and to reoperate relay SS in preparation for the next long pause. At the end of the short mark period of the second pulse, line relay LN releases, in turn releasing counting chain relay C–1. When line relay LN reoperates at the beginning of the mark period of the third pulse, a circuit is completed to operate the third counting chain relay C–3, and at the end of the mark period of the third pulse and the beginning of the short space, line relay LN releases, in turn releasing counting chain relay C–2. With receipt of the mark period of the fourth pulse following the short pause which precedes the space, line relay LN reoperates in turn operating counting chain relay C–4. At the end of the fourth and the beginning of the short space mark period of the fourth pulse, relay LN releases, in turn releasing counting chain relay C–3. At the beginning of the mark period of the fifth pulse, relay LN reoperates, in turn operating counting chain relay C–5.

At the end of the mark period for the fifth pulse and the beginning of the long space of the fifth pulse line relay LN releases, in turn relasing counting relay C–4 and opening the circuit of slow-release start selection relay SS which begins its slow release. As the long pause transmitted from the Controlled Station allows relay SS to go through its slow release period, the release of start selection relay SS operates the register relay R–5 (FIGURE 17) over the path which extends from positive potential on the indirect positive bus over contacts SS–2, SF–4, C0–9, C1–9, C2–9, C3–9, C4–9, C5–8, and the winding of relay R–5 to the negative bus. Relay R–5 operates and at its contacts R5–7 locks to the locking circuit before described for register relay R–1.

At the beginning of the mark period of the sixth pulse, line relay LN reoperates in turn operating start selection relay SS and counting chain relay C0 over the path which extends from direct positive bus over contacts LN–1, RL–2, INC–6 and the left winding of relay C0 to the negative bus. Relay C0 operates and locks over its right hand winding over the path which extends from ground on the indirect positive bus over contacts C0–6, C4–5, C3–4, C2–5, C1–3, resistor RR–15, and the right hand winding of relay C0 to the negative bus.

At the end of the sixth mark period, line relay LN again releases to begin the intercode space interval, and at contacts LN–1 releases counting chain relay C–5 and opens the circuit of start selection relay SS. As a long pause is transmitted by the Controlled Station, relay SS has time to release and in turn operate incoming code relay INC (FIG. 17) over the path which extends from the indirect positive bus over contacts SS–2, SF–4, C0–8, R2–7, R2–10, R3–9, R4–9, R5–5, GF–3, and PF–4 through the winding of incoming code relay INC to the indirect positive bus.

It should be observed that group selection finish relay GF, when it operates, shifts the circuit from group code relay GC in preparation for operation of pause determination relay PC; and that point selection finish relay PF when it operates shifts the circuit from group code relay GC in preparation for operation of pause determination relay PC; and that point selection finish relay PF when its operates shifts the circuit from point code relay PC in preparation for operation of incoming code relay INC. It should be observed that since the last noted position of the breaker at point 1 was the open position, close indication relay CI is in the released condition and open indication relay OI is in the operated condition. Thus, with contacts of relay R1 and R5 operated (FIG. 12), as the result of the receipt of the open indication code (1–5), (and having assumed the indication at point 1 to be an open indication), the operation of relay INC effects the operation of indication agreement relay IA to the negative bus.

The operation of the indication agreement relay IA and the indication disagreement relay ID varies with changes in the operating conditions of the circuit breaker. With reference to FIGURE 13, it will be recalled that before the Controlled Station sends the indication code to provide a means for comparison, relay CI which is the closed indication relay is operated, or the open indication relay OI is operated at the close of the point selection code according to the last indicated or remembered condition of the device. Referring to FIGURE 12, it will be seen that contacts of these two relays are interposed between the contacts of incoming code relay INC and the two relays IA and ID for comparison purposes and the results of the indication code returned from the Controlled Station are registered on the contacts of relays R1 to R5 (FIG. 12). If the remembered position and the position indicated by the code received coincide, indication agreement relay IA operates. However, if the stored or remembered condition does not coincide with the indication provided on the indication code, an operating circuit is completed for the indication disagreement relay ID.

As noted above, in the present example the open indication code 1–5 has been received, relays R1 and R5 of the register group are operated, and as the last stored or remembered position was the open position, contacts of relay OI are closed, and contacts of relay CI are open, and an operating circuit is completed for the indication agreement relay IA. Relay IA operates and at its contacts IA–1 operates indication finished relay IF (FIG. 13) over the path which extends from the negative bus over the winding of relay IF and contacts IA–1 and IFA–3 to the indirect positive bus. Relay IF operates and at its contacts IF–2 closes a circuit in series with relay IFA, but relay IFA being shunted over contacts IA–1 and IFA–3, does not close at this time.

Figure 17:
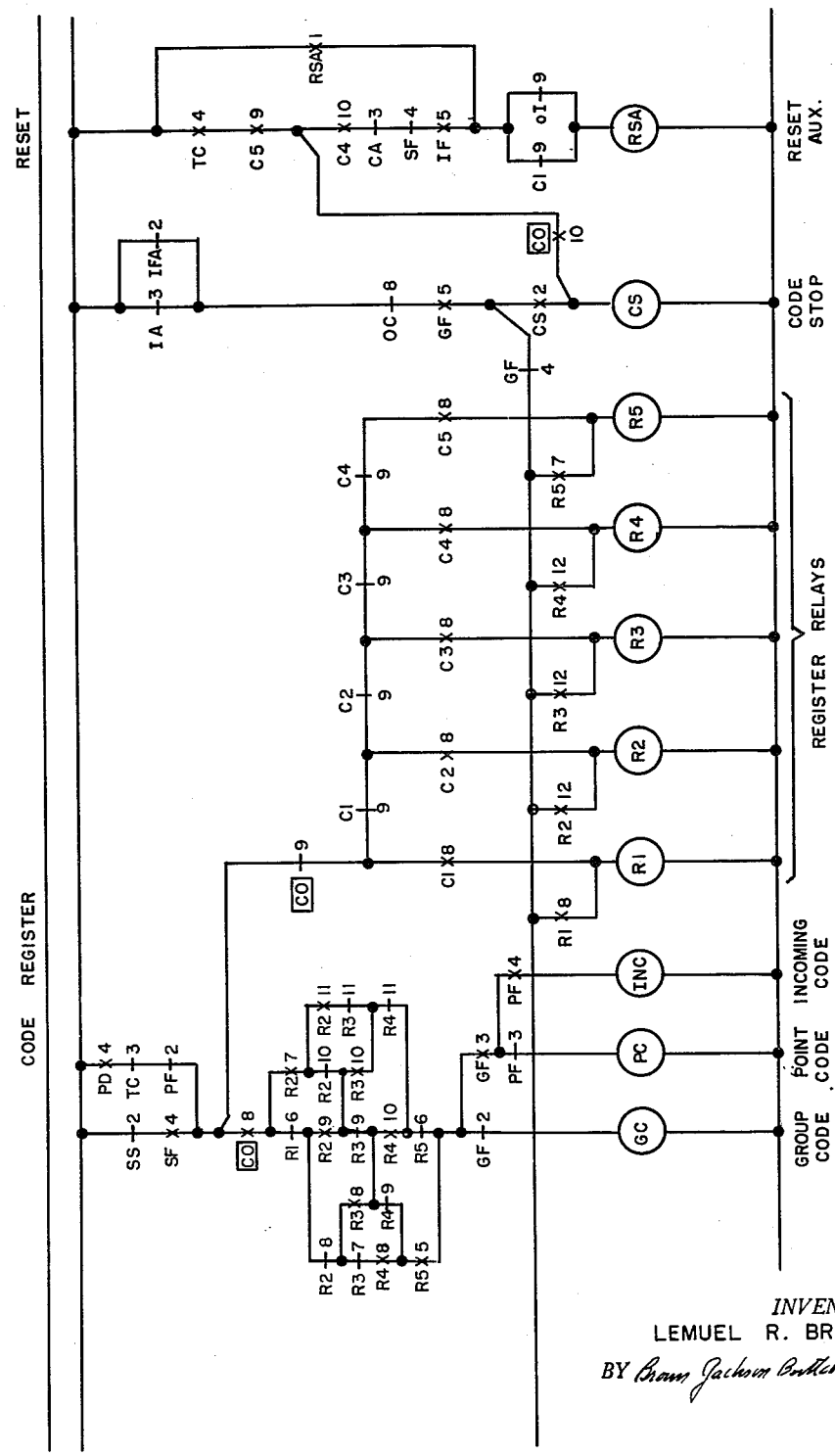

Until this time selection finish relay SF (FIG. 16) and the register relay R1 and R5 (FIG. 17) have been holding through contacts IF–4 inasmuch as the contacts IA–2 have opened. Accordingly, when relay IF operates, it is operative at its contacts IF–4 to release relays SF, R1 and R5, and as a result incoming code relay INC (FIG. 17). As indication finish relay operates to close contacts IF–3, the white selection lamp at point 1 operates over the operated contacts P1–5 to indicate on the escutcheon panel of point 1 that the point has been registered thereon.

With register relays R1 and R5 released, the circuit of relay indication agreement IA (FIG. 12) is opened and after its slow release period has expired, relay IA releases, removing the shunt around indication finished auxiliary relay IFA (FIG. 13), whereupon relay IFA operates in series with relay IF, and at its contacts IFA–3, holds open its shunt circuit. Referring to FIGURE 17, with relay IFA shunted until the first release of relay IA, contacts IFA–2 remain closed until the first release of relay IA, and code stop relay CS is held operated to prevent the Control Station from sending an indication check code immediately following the first indication received. After the control code has been sent, and the indication code received, the opening of contacts IA–3 with contacts IFA–2 releases code stop relay CS so that the Control Station can initiate the transmission of the indication check code.

For exemplary purposes, it is noted that if the closed indication code 2–5 had been received from the Controlled Station, register relays R2 and R5 would have operated, and the indication disagreement relay ID (FIG. 12) would have operated over the path which extends from the indirect positive bus, over contacts R1–2, R2–3, R3–4, R4–4, R5–2, INC–3, contacts CI8, through the winding of relay ID to the negative bus, and the indication disagreement relay ID would have locked over contacts INC–4 and ID–1 to the indirect positive bus. Relay ID then operates relay I1 (FIG. 14) over the path which extends from the direct positive bus over the winding of relay I1, contacts P1–3, ID–4, R2–7, and resistor RR–6 to the negative bus. The operation of relay I1 effects the opening of contacts I1–2 (FIG. 13) to release relay OI; the closure of contacts I1–1 to operate relay CI; the opening of contacts I1–4 to extinguish the green lamp on point 1 (FIG. 15) and the closing of contacts I1–5 to energize the red lamp on point 1.

The operation of relay CI effects the opening of contacts CI–8 (FIG. 12) to release relay ID (FIG. 12) and the closing of contacts C17 to operate the open indication relay OI, open contacts OI–8 preventing the energizing circuit from reaching relay ID. Relay IA operates relay IF, as before, which releases relays SF, R2, and R5 and lights the white selection lamp on point 1. Relays INC, and IA release to operate relay IFA, and the release of relay INC opens contacts INC–4 to effect the release of relay ID which is locked. The equipment is then in a position for the attendant to operate the Reset Key or a Control Key.

Postulating now that relay CI (FIG. 13) was operated to remember a closed indication, the indication agreement relay IA and indication disagreement relay ID will be operated in different manners. Under these circumstances a closed indication is received from the Controlled Station (a 2–5 code), and register relays R2 and R5 will be operated to close a circuit for the indication agreement relay IA which extends over the path from indirect positive over contacts R1–2, R2–3, R3–4, R4–4, R5–2, INC–3, CI–7, OI–7 and the winding of IA to the negative bus. If on the other hand, the open indication code 1–5 is received from the Controlled Station, relays R–1 and R–5 are operated and a circuit to indication disagreement relay ID is completed from the indirect positive bus over contacts R1–1, R2–2, R3–2, R4–2, R5–1, INC–2, CI–6 and the winding of relay ID to the negative bus.

In the reporting of the equipment at certain of the points, the Controlled Station sends a mid-position indication code 1–2 to indicate, for example, that a valve is neither completely opened nor completely closed, but in the mid-position. If the last position of the valve registered was mid-position, relays CI and OI both would be operated to remember a mid-position. With the receipt of the mid-position code 1–2, a circuit is completed to relay IA which extends over the path from ground on the indirect positive bus, over contacts R1–1, R2–1, INC–1, CI–3, OI–3 and the winding of IA to the negative bus. If relay CI had been found operated and OI released as the result of the last remembered position by one of a closed value positive potential is connected over contacts INC–1, contact CI–3 and OI–4 to the winding of indication disagreement relay ID to indicate the disagreement. Also, if relay CI had been non-operated, and relay OI had been found operated as the result of the last indication being an open value, the circuit would have been extended over contacts CI–4 to the winding of relay ID to indicate the disagreement condition to the attendant.

Further, if the open indication comprising code 1–5 is received with relays OI and CI both operated to indicate the mid-position of the value, a circuit is completed over contacts INC–2, CI–6, to the winding of relay ID to provide a disagreement indication; and if the closed indication comprising code 2–5 is received with the valve in the mid-position, a circuit is completed over contacts INC–3, CI–7, OI–8, to the winding of ID to indicate disagreement. Thus, an accurate report of the condition of the equipment at each point at the Controlled Station, and any variation from a previously reported condition are accurately provided at the main station for the attendant.

Metering on Point 1

After the relays at each of the stations complete the selection of the desired point (point 1 in the present example), a selective amplitude metering circuit will be established for point 1 over the path which extends from the positive side of the transmitter $t$ (FIG. 30) over contacts $is$–11, $tr$–2, the winding of line relay $ln$, contacts $tr$–3, resistor $rr$–18, conductor L–1 to the Control Station (FIG. 1), resistor RR–19, contacts TR–3, the winding of line relay LN, diode DD–5 in the forward direction, contacts TR–2, OS–12, the amplitude meter M, contacts P1–6, OS–11, GF–7, TC–8, SF–7, TR–1, conductor L–2, to the Controlled Station (FIG. 30), and contacts $tr$–1, $if$–7, $tc$–7, $is$–10, $pl$–7 to the negative side of the transmitter $t$. The transmitter $t$ is indicated as having its own source of potential, and, until the attendant operates the Control Key or Reset Key, the information provided by the metering source $ms$–1 (FIG. 30) will be registered on the meter M (FIGS. 17, 2A).

Operation of Close Key (FIG. 10)

It was assumed for exemplary purposes that the attendant is selecting point 1, which indicated an "open" breaker for the purpose of operating the breaker to the closed position. As the attendant now depresses the Close Key, a circuit is completed to operate close code relay CC (FIG. 10) over the path which extends from indirect positive over contacts OS–4, IF–1, CA–1; the contacts of the operated close key; the winding of relay CC to the negative bus. Relay CC operates and at its contacts CC–1 extends its operating positive to the coil of relay OC.

Open code relay operates and at its contacts OC–3, operates relay CA; at its contacts OC–8 (FIG. 17) releases code stop relay CS, which closes its contacts CS–1 (FIG. 10); at its contacts OC–1, locks itself and relay CC over contacts CS–1, and OC–3 to the indirect positive bus, thereby also holding relay CA operated. Relays CC, OC and CA are thus locked independent of the close control key which may be released.

Close Code—Operation at Control Station

With the code stop relay CS released, a circuit is completed to operate the transmitting control relay TC over the path which extends from the negative bus over the winding of relay TC, contacts SF–6, CS–4, OS–10, and PD–6 to the indirect positive bus. The Control Station presently in control of sending, and the following sequence of operations occurs as the station sends a close control code (2–5).

More specifically, transmission control relay TC operates relay TR as previously described to begin the mark portion of the first pulse. Transmission control relay TR operates relay LN and relay LN operates relay C1 to release relay TR which initiates the short space of the first pulse.

The release of TR also releases relay LN and the release of relay LN releases relay C0 and operates relay TR. The operation of relay TR initiates the mark period of the second pulse. Relay TR operates relay LN and relay LN operates counting chain relay C2 and opens the circuit of relay TR which releases after an interval. In that relays OC and CC have been previously operated, the operation of counting chain relay C2 effects the operation of relay PD in preparation for a long pause during the space of the second pulse, the operating circuit extending over the path from the indirect positive bus over contacts TC–1, GS–4, PS–4, OC–6, SC–8, CC–3, C2–1, C1–2, and the winding of relay PD to the negative bus. When relay TR releases, the mark period of the second pulse is terminated.

Relay TR releases relay LN, and the long pause begins. Relay LN releases counting chain relay C1 and also relay TC. Relay TC opens the circuit of relay PD which goes through its slow release period. When relay PD releases, the circuit of relay TC is re-established, operating relay TC. Relay TC operates relay TR and relay TR operates relay LN ending the long pause of the second pulse and beginning the make period of the third pulse.

Relay LN operates relay C–3 and opens the circuit of relay TR. After an interval, relay TR releases to restore relay LN, ending the mark period of the third pulse and beginning the short space period. The release of relay LN operates relay TR and releases counting chain relay C2. Relay TR operates relay LN to end the space and begin the mark period of the fourth pulse. Relay LN operates counting chain relay C4 and opens the circuit of relay TR which goes through its slow release period, in turn releasing relay LN which ends the mark period of fourth pulse and begins the short space. The release of relay LN releases the counting chain relay C–3 and operates relay TR. Relay TR operates relay LN, ending the space and beginning the mark period of the fifth pulse.

Relay LN operates relay C5 and opens the circuit of relay TR which goes through its slow release period. As relay C5 operates (relay OC having been previously operated) a circuit is closed for relay PD from the indirect positive bus over contacts TC–1, GS–2, PS–2, OC–7, ICC–2, IOC–4, C5–2, C4–2, and the winding of relay PD to the negative bus. Presently relay TR releases in turn releasing relay LN to begin the long pause associated with the fifth pulse.

Relay LN releases counting chain relay C4 and relay TC. The release of relay TC in turn releases relay PD which begins its slow release to prolong the fifth space. When relay PD releases, a circuit is re-established to relay TC. Relay TC operates and in turn operates relay TR which in turn operates relay LN to end the long pause and begin the sixth pulse mark period.

The operation of relay LN operates counting chain relay C0 and opens the circuit of relay TR which begins its slow release. The operation of relay C5 closes a circuit to operate the code stop relay CS (FIG. 17) which extends from the negative bus over the winding of relay CS, through contacts C0–10, C5–9, TC–4, to the indirect positive bus. Relay CS operates and locks over the path which extends from the negative bus through the winding of relay CS, through contacts CS–2, CF–5, OC–8 (when OC presently releases) and IFA–2 to the indirect positive bus. The operation of counting chain relay C0 effects the operation of pause determination relay PD over the path which extends from the negative bus over the winding of relay PD, contacts C5–1, C0–1, and TC–1 to the indirect positive bus. Relay CS releases and at its contacts CS–1 (FIG. 10), restores relays CC and OC. Relay OC releases and at its contacts OC–3 releases relay CA. When relay TR releases, the circuit of LN is opened to begin the intercode pause between the control code and the closed indication code. The release of relay LN releases relay TC and counting chain relay C5. The release of relay TC opens the circuit of relay PD which begins its slow release. When PD releases, the Control Station awaits operation by the Controlled Station.

*Close Code—Operation at Controlled Station*

The equipment at the controlled station responds to receipt of the incoming control code by registering the code and performing the function indicated thereby. That is, relay *ln* operates in response to the first energization of the channel, in turn operating counting chain relay *c*–1 (FIGURE 27) and also relay *ss* (FIGURE 27). At the end of the mark period of the first pulse of the close control code, relay *ln* releases, in turn releasing counting chain relay *c*0 which operates relay *sf* (FIG. 27).

During the short space the Controlled Station awaits receipt of the mark period of the second pulse, and as the mark period of the second pulse is received, relay *ln* operates, in turn operating relay *c*–2 of the counting chain. When the channel is de-energized at the end of the mark period of the second pulse, relay *ln* releases, in turn releasing counting chain relay *c*–1 and opening the circuit of relay *ss* which because of the long space received from the Control Station, goes through its slow release period. When relay *ss* releases, register relay *r*2 (FIG. 28) operates and locks through contacts *r*2–10, *ikc*–1, *pf*–4, and *ct*–3 to the indirect positive bus.

On the mark period of the third pulse, relay *ln* again operates, in turn operating counting chain relay *c*3 and relay *ss*. At the end of the mark period, relay *ln* releases in turn releasing counting chain relay *c*–2. When the channel is re-energized by the Control Station for the mark period of the fourth pulse, relay *ln* reoperates, in turn operating counting chain relay *c*4. At the end of this mark period, relay *ln* releases in turn releasing counting chain relay *c*3. When the channel is re-energized, relay *ln* reoperates, in turn operating counting chain relay *c*5. At the end of the mark period of the fifth space relay *ln* releases and the long pause of the fifth pulse begins. The release of relay LN releases counting chain relay *c*4 and opens the circuit of relay *ss* which, because of the long space received, releases after going through its slow release period, in turn operating register relay *r*5 (FIG. 28) which locks through contacts *r*5–8, *ikc*–1, *pf*–4 and *ct*–3 to the indirect positive bus.

When the channel is re-energized by the Control Station at the end of the long space, relay *ln* operates beginning the mark period of the sixth pulse. The operation of relay *ln* operates counting chain relay *c*0 and relay *ss*. At the end of this mark portion, relay *ln* releases, in turn releasing counting chain relay *c*–5 and opening the circuit of relay *ss* which, because of the long intercode pause received, goes through its slow release period. As the close code (2–5) has now been received at the Controlled Station, register relays *r*–2 and *r*–5 will have been operated, and as relay *ss* now releases, a circuit is completed to operate incoming code relay *inc* (FIG. 28) over the path which extends from the indirect positive bus over contacts *ss*–2, *sf*–3, *c*0–8, *r*1–4, *r*2–7, *re*–9, *r*4–9, *r*5–6, *gf*–3, *pf*–2, and the winding of the incoming code relay *inc* to the negative bus.

Incoming code relay (FIG. 26) at its contacts *inc*–8 completes an operating circuit for the close relay on point 1 which extends from the direct positive bus over contacts *os*–1, *inc*–8, *r*5–5, *r*2–5, *p*1–6 and the winding of the close relay to the negative bus. The close relay may be the relay which directly causes the circuit breaker to close, or it may operate a power relay connected to the circuit breaker which causes the circuit breaker to close. In either case when the circuit breaker closes, its contacts *a*1–1 (FIG. 26 [also see contacts *a*1–1 in FIG. 4]), to complete a circuit to operate the point 1 indication relay *i*–1 (FIG. 26) over the path which extends from the direct positive bus over contacts *a*1–1, contacts *s*1–8, which are normally closed because relay *s*1 is normally operated, and the winding of relay *i*–1 to the negative bus.

Figure 26:
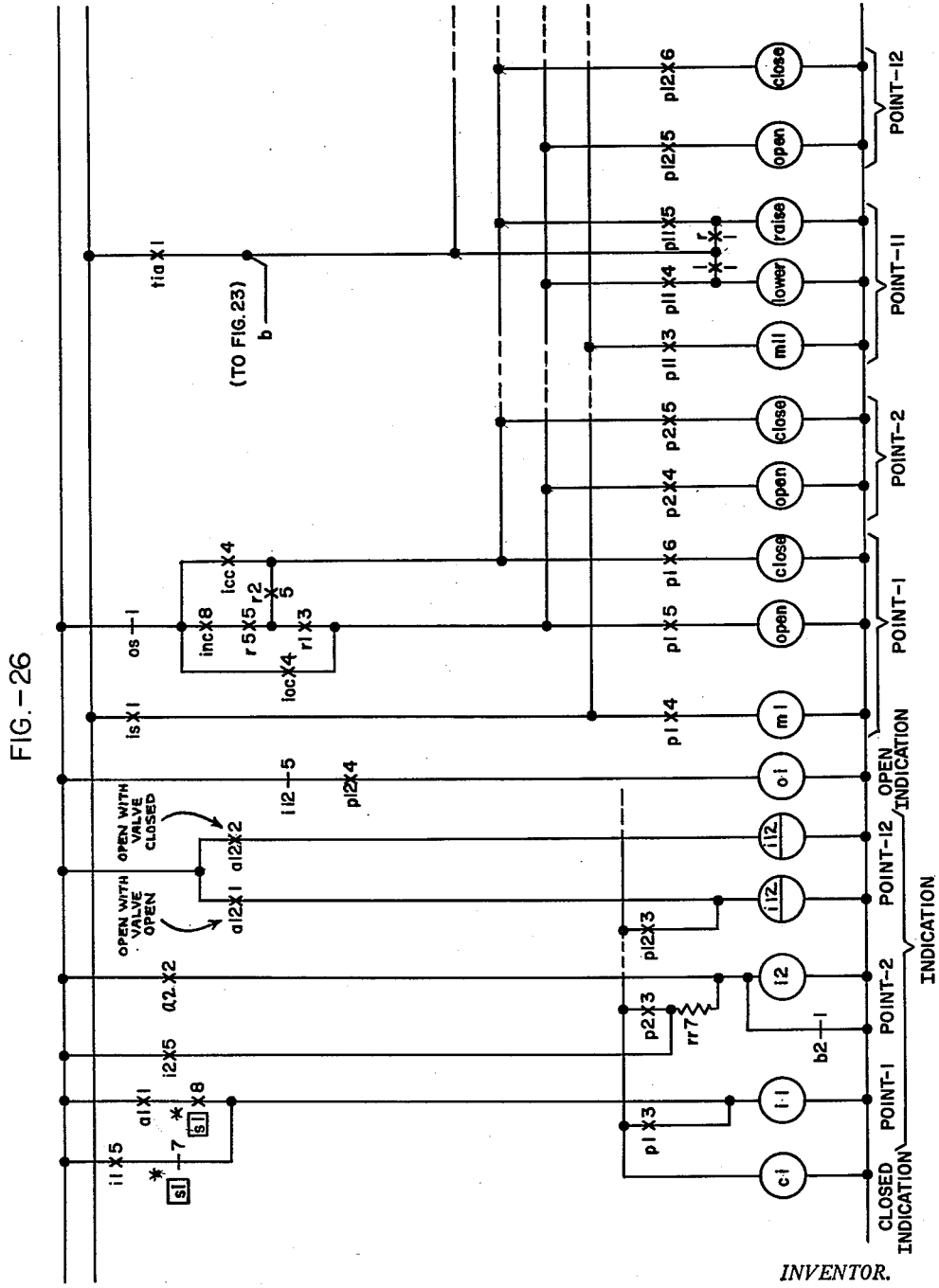

As the point selection relay *p*–1 has been closed, the same positive potential passes over contacts *p*1–3 to operate closed indication relay *ci* (FIG. 26).

At this point in the description, the functions of closed indication relay *ci* (FIG. 26) and open indication relay *oi* (FIG. 26) at the Controlled Station are considered briefly. The open indication relay *oi* functions only with respect to a valve point, and accordingly, at point 1 (which is not a valve point) relay *oi* remains non-operated.

Relay *ci* will be operated if a breaker is in the closed position; and will be non-operated if the circuit breaker is in the open position. It should be observed that the functioning of *ci* and *oi* is a little different at the Controlled Station than it is at the Control Station. That is, the operation of the closed indication relay *ci* effects the operation of the code start auxiliary relay *cta* over the path which extends from the negative bus over the winding of relay *cta* (FIG. 23) through contacts *ct*–2, *sc*–1, *ti*–1, *oi*–3, *ci*–6, *rc*–8, then contacts *r*5–2 (FIG. 22), *r*4–4, *r*3–4, *r*2–3, *r*1–2 to the indirect positive bus. Relay *cta* operates and at contacts *cta*–1 (FIG. 23) completes an energizing circuit for code start relay *ct*. Relay *ct* operates and at its contacts *ct*–1 locks to the aforesaid positive potential, independent of the contacts *cta*–1, and at its contacts *ct*–2, opens the circuit of slow release relay *cta* which begins its slow release period.

It is noted that any time relay *i*–1 (FIG. 26) changes its position, current direction through relay *s*1 (FIG. 25) will be reversed and relay *s*1 will be released. Before the operation of relay *i*1, relay *s*1 is held operated over the path which extends from the negative bus over contacts *i*1–4, the winding of relay *s*1, contacts *i*1–1, resistor *rr*–3, contacts *s*1–6, and *sc*–3 to the direct positive bus. When relay *i*1 operates, contacts *i*1–4 and *i*1–1 open to release relay *ss* and contacts *i*1–3 and *i*1–2 close to reverse the direction of current flow through the winding of relay *s*1, and prepare a circuit for the reoperation of relay *s*1 over the path which extends from the negative bus through contacts *i*1–2 (FIG. 25), the winding of relay *s*1, contacts *i*1–3, contacts *p*1–2 and the *c*-conductor to FIGURE 23, as more fully described hereinafter.

The release of relay *s*1 effects the operation of outgoing group 1 start relay *og*1 (FIG. 25) over the path which extends from the direct positive bus over contacts *sc*–3, *s*1–5 and the winding of relay *og*–1 to the negative bus. Outgoing start relay *og*–1 operates and at its contacts *og*1–3 effects the operation of preference lock-out relay *plo* (FIG. 29) from the indirect positive bus over contacts *og*1–3, *icc*–6, *ioc*–6, *inc*–11 and the winding of preference lockout relay *plo* to the negative bus. Preference lockout relay *plo* operates and at contacts *plo*–1 locks over the path which extends from the negative bus over the winding of relay *plo*, contacts *plo*–1 and break contacts *cs*–2 of the code stop relay to the indirect positive bus.

When code start auxiliary relay *cta* releases at the end of its slow release period, the opening of its contacts *cta*–2 (FIG. 28) opens the holding circuit of relays *r*–2, *r*–5, *sf* and *cs*, which release. The holding circuit of the code stop relay *cs* (FIG. 28) at this time extends from the negative bus over the winding of relay *cs* through contacts *cs*–1, *ti*–4, *pf*–4, and *cta*–2 to the indirect positive bus. The holding circuit for register relays r–2 and r–5 is over their make contacts, contacts ikc–1, pf–4, and cta–2, to the indirect positive bus. The release of the register relays therefore opens the circuit of relay inc (FIG. 28), to release the same, and opens the circuit of relay ct (FIG. 23) which releases. It should be observed that relay sf was holding over the circuit from the negative bus to relay sf (FIG. 27) through contacts sf–2, contacts ikc (FIG. 28), pf–4 and cta–2 to the indirect positive bus.

*Closed Indication Code—Operation at Controlled Station*

At this time, the equipment at the Control Station effects the generation of a closed indication code for transmission to the Control Station to indicate to the equipment thereat that the circuit breaker at the selected point has been closed as a result of the close code transmitted to the Controlled Station by the attendant at the Control Station. More specifically, the release of the code stop relay cs comples a circuit to reoperate transmitting control relay tc (FIG. 30) over a path which extends from the negative bus over the winding of relay tc, over contacts sf–6, cs–4, ioc–9, icc–9, os–5, and pd–6 to the indirect positive bus. Relay tc operates and at contacts tc–6 locks over contacts ln–2, resistor rr–14 to the indirect positive bus, as line relay ln presently operates, relay tc operates relay tr by extending the positive potential over contacts tc–6 to the winding of relay tr. Relay tc at contacts tc–5 operates relay dsa (FIG. 29), which at its contacts dsa–1 in turn operates delay start relay ds. Relay tr operates line relay ln and LN at the Controlled and Control Stations respectively, to begin the closed indication code.

The closed indication code in the present system comprises the code 2–5, and long pauses are therefore interposed at the second and fifth pulses of the impulse group. During the mark period of the first pulse, relay ln operates relay c1 (FIG. 27) and releases relay tr (FIG. 30). Relay tr releases, in turn releasing relay ln for the short space of the first pulse. The release of relay ln operates relay tr and releases counting chain relay co (FIG. 27). Relay tr operates relay ln for the second mark. Relay ln operates counting chain relay c–2 (FIG. 27) and releases relay tr. Relay c2 operates relay pd (FIG. 20) over the path which extends from the indirect positive bus, over contacts tc–1, gs–2, ps–4 (FIG. 21), ci–1, rc–2, contacts c2–1 (FIG. 20), c1–2, and the winding of relay pd to the negative bus.

Relay tr releases relay ln to begin the long pause associated with the second pulse. The release of relay ln releases the counting chain relay c1 and relay tc. Relay tc releases relay pd which goes through its slow release period and restores to operate relay tc which operates relay tr which in turn operates relay ln. This ends the long pause and begins the mark period of the third pulse.

Relay ln operates relay c–3 and opens the circuit of relay tr which releases after an interval. The release of relay tr releases relay ln to end the mark period and to begin the short space. The release of relay ln releases relay c–2 and operates relay tr. Relay tr operates relay ln to end the short space and begin the mark period of the fourth pulse. Relay ln operates relay c–4 and opens the circuit of relay tr. Relay tr releases and restores relay ln to end the mark and begin the short space. The release of relay ln releases relay c–3 and operates relay tr which in turn operates relay ln to begin the mark period of the fifth pulse.

Relay ln operates relay c–5 and opens the circuit of relay tr. Relay c5 operates relay pd over the path which extends from the indirect positive bus over contacts tc–1 (FIG. 20), gs–4, ps–3 (FIG. 21), oi–2, contacts ct–2 (FIG. 20), c4–2 and the winding of relay pd to the negative bus. Relay tr releases to open the circuit of relay ln, releasing the same to end the mark period and to begin the long space of the fifth pulse.

The release of relay ln releases relays c–4 and tc. Relay tc releases relay pd, which goes through its slow release period. When relay pd releases, it operates relay tc, which operates relay tr, which operates relay ln, which ends the long pause and begins the mark period of the sixth pulse.

Relay ln operates relay c0 and opens the circuit of relay tr. With relay co operated on the sixth mark period, a circuit is completed to operate relay pd over the path which extends from the indirect positive bus over contacts tc–1 (FIG. 20), co–1, c5–1 and the winding of relay pd to the negative bus. A circuit is also completed to operate the code stop relay cs (FIG. 28) which circuit extends from the indirect positive bus, over contacts tc–4, co–10, c5–9, and the winding of relay cs to the negative bus. Relay cs operates and at its contacts cs–2 (FIG. 29) releases relay plo. With the code stop relay cs operated, contacts cs–4 are open to hold open the circuit for relay tc so that the Controlled Station does not start a sending operation. Relay tr releases, in turn releasing relay ln, which ends the mark period of the sixth pulse.

Figure 20:
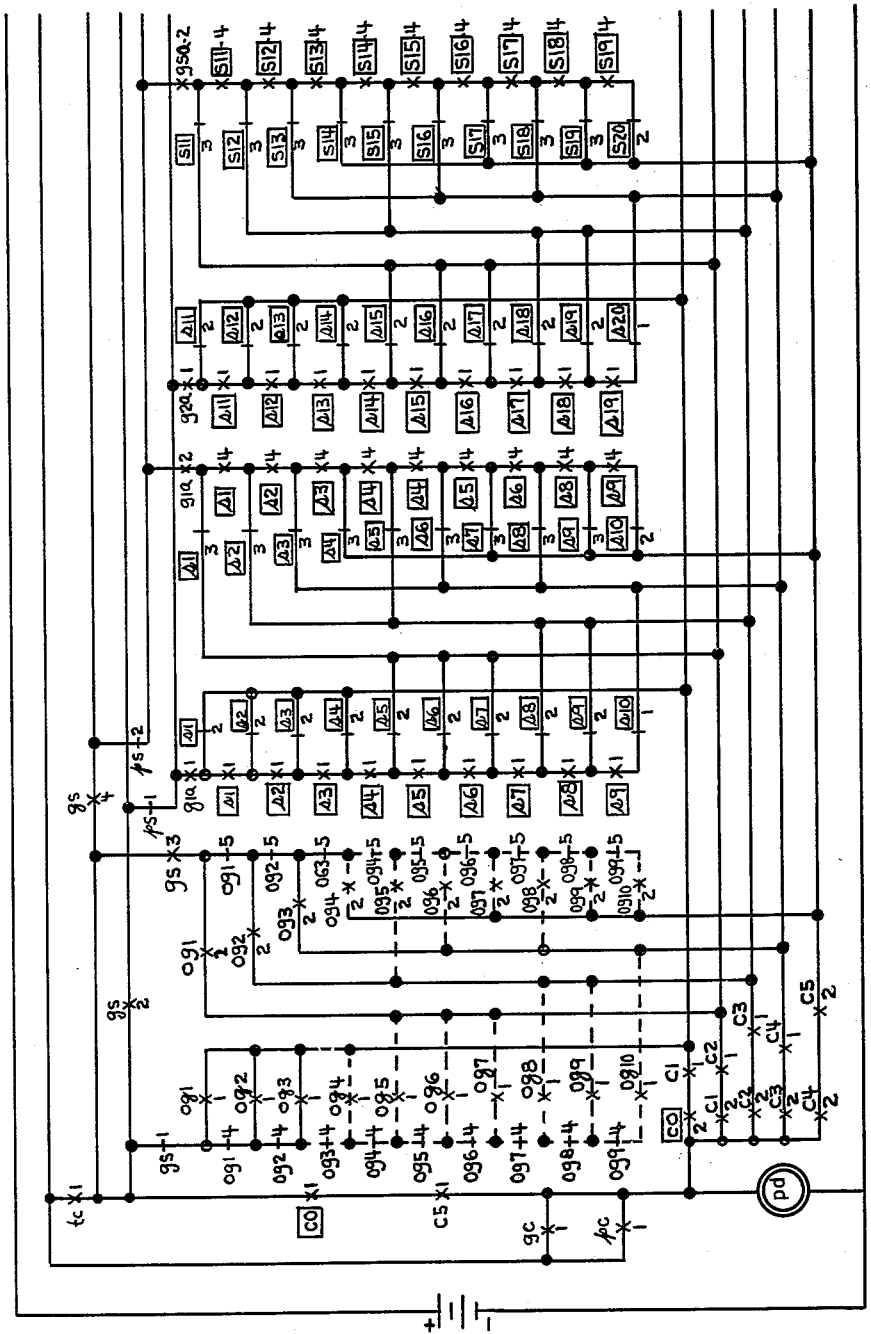

The release of relay ln releases relays c–5 and tc, which opens the circuit of relay pd, which goes through its slow release period. Relay pd releases to open the circuit of relay dsa, which goes through its slow release period in turn releasing relay ds, which goes through its slow release period. Thereafter, the Controlled Station awaits action from the Control Station. In brief summary, with relay ci (FIG. 26) operated as a result of the close code received by the Controlled Station the Controlled Station equipment initiates the transmission of a closed indication code, and as counting chain relay c2 operates on the mark period of the second pulse of the closed indication code a circuit is completed to operate relay pd (FIG. 20). When transmission control relays tc and counting chain relay c1 released at the end of the mark period, the circuit of pause determination relay pd released slowly to create a long pause. In a similar manner, when relay c–5 operated on the mark period of the fifth pulse, a circuit was completed to operate relay pd. As transmission control relay tc and counting chain relay c–4 released following the end of the mark period, relay pd released slowly to create a long pause. When counting chain relay co operated on the sixth mark period, a circuit was completed to again operate the pause determination relay pd and the termination of the transmission of the close indication code by the Controlled Station.

*Closed Indication Code—Operation at Control Station*

At the Control Station as a result of the receipt of the closed indication code (2–5) at the Control Station, the equipment is operative to register the incoming code and to accomplish an agreement test and the transmission of a closed indication check code to the controlled station. More specifically, line relay LN operates at the beginning of the mark period of the first pulse, to operate counting chain relay C–1 and relay SS (FIG. 16). When relay LN releases at the end of the mark period it effects the release of relay C0 which operates relay SF (FIG. 16). Relay LN operates at the beginning of the mark period of the second pulse to operate counting chain relay C2.

Relay LN releases at the end of the second mark period to open the circuit of counting chain relay C1, which releases. The release of relay LN also opens the circuit of relay SS which, because of the long pause transmitted from the Control Station, is allowed to release. When relay SS releases, register relay R2 (FIG. 17) operates and locks over the circuit which extends from the negative bus over the winding of relay R2 (FIG. 17), contacts IA–2 (FIG. 16) and PF–1 to the indirect positive bus. Relay SF also locks over its contacts SF–2 and contacts IA–2 and PF–1 to the indirect positive bus.

Relay LN operates at the beginning of the mark period of the third pulse following the long space, and operates counting chain relay C3 and reoperates relay SS. When relay LN releases at the end of the mark period of the third pulse beginning the short space, counting chain relay C2 releases to operate relay LN. Relay LN operates at the beginning of the mark period of the fourth pulse, and operates counting chain relay C4. At the end of the mark period the Controlled Station releases relay LN to open the circuit of counting chain relay C3, releasing the same.

With receipt of the mark period of the fifth pulse relay LN reoperates, in turn reoperating counting chain relay C5. At the end of the fifth mark period, relay LN releases, in turn releasing counting chain relay C4 and opening the circuit of relay SS which goes through its slow release period, and since the long space received is of sufficient time, relay SS releases to operate register relay R5, which locks over its contacts R5–7 to the circuit described for relay R2.

At the end of the long space, relay LN operates and energizes counting chain relay C0 and relay SS. At the end of the sixth mark period relay LN releases, in turn releasing counting chain relay C5 and also opening the circuit of relay SS which goes through its slow release period.

Relay SS at its contacts SS–2 reoperates relay INC (FIG. 17) over the path which extends from positive potential on the indirect positive bus over contacts SS–2, SF–4, C0–8, R1–6, R2–9, R3–9, R4–9, R5–5, GF–3, PF–4, and the winding of relay INC to the negative bus.

Incoming code relay INC operates and contacts INC–1, INC–2, INC–3 (FIG. 12) close to make an agreement test. It should be recalled that closed indication relay CI at the Control Station is restored and open indication relay OI at the Control Station is operated to indicate the last reported position of the circuit breaker as open. Accordingly, a comparison circuit is completed (as the test is made) over make contacts of register relays R2 and R5 which have been opened by the incoming code in conjunction with the non-operated position of the closed indication relay CI to effect an indication disagreement over the path which extends from positive potential on the indirect positive bus, contacts R1–2 (FIG. 12), R2–3, R3–4, R4–4, R5–2, INC–3, CI–8 and the winding of relay ID to the negative bus to operate indication disagreement relay ID.

Indication disagreement relay ID operates and at its contacts ID–4 (FIG. 14) operate the indication relay I–1 for point 1 over the circuit which extends from the direct positive bus over the winding of relay I–1 over contacts P1–3, ID–4, R2–7 and resistor RR–6 to the indirect positive bus. Relay I–1 operates and locks over resistor RR–7 and its own contacts I1–3 to the indirect positive bus, and at its contacts I1–2 (FIG. 13), releases relay OI, at its contacts I1–1 operates close indication relay CI, and at its contacts I1–4 extinguishes the green lamp, and at its contacts I1–5 energizes the red lamp. The green lamp had been lighted over the path from the direct positive bus over contacts F1–2, I1–4, over the green lamp to the negative bus. Now the red lamp lights over the path which extends from the direct positive bus over contacts F1–2, I1–5, and the red lamp to the negative bus.

Relay F1 (FIG. 14) which is the flashing relay for point 1 is not operated in the present operation inasmuch as the operation originated at the Control Station rather than the Controlled Station and contacts IS–1 are open. If relay F1 had been operated, as it does on an automatic reporting from a Controlled Station, relay F1 operates, opening contacts F1–2 (FIG. 15), and closing contacts F1–3 in a cyclic manner and flashing contacts FL3–1 flash the lamp.

As relay CI operates and relay OI releases, an agreement circuit obtains to operate the indication agreement relay IA over the path which extends from the indirect positive bus over contacts R1–2, R2–3, R3–4, R4–4, R5–2, INC–3, CI–7, OI–7 and the winding of relay IA to the negative bus. Indication agreement relay IA operates and at its contacts IA–2 (FIG. 16) releases relay SF and register relay R2 and R5, and at its contacts IA–3 (FIG. 17) releases the code stop relay CS. Register relays R2 and R5 restore to open the circuit of relay IA (FIG. 12) which goes through its slow release period. The release of the code stop relay SF operates relay TC (FIG. 19), and the release of register relays R2 and R5 and relay SF opens the circuit of incoming code relay INC, releasing the same. Relay INC restores and at its contacts INC–4 (FIG. 12), releases the indication disagreement relay ID. Relay TR operates relay LN at the Control Station and relay ln at the Controlled Station to initiate the transmission of the closed indication check code 3–4 by the Control Station.

*Closed Indication Check Code—Operation at Control Station*

The closed indication check code (3–4) is generated by the Control Station and transmitted over the channel to the Controlled Station for registration thereat. More specifically, line relay LN operates counting chain relay C1 and opens the circuit of relay TR which releases and in turn releases relay LN to begin the first short space. Relay LN operates relay TR and releases relay C0 and relay TR operates relay LN to begin the mark period of the second pulse. Relay LN operates relay C2 and opens the circuit of relay TR, which begins its slow release, the slow release of relay TR being the controlling factor in the length of the short mark periods. When relay TR releases, the circuit of relay LN is opened to begin the short space. The release of relay LN operates relay TR and releases counting chain relay C1, and relay TR operates relay LN to begin the mark period of the third pulse. Relay LN operates counting chain relay C3 and opens the circuit of TR. The operation of counting chain relay C3 completes the circuit to operate pause determination relay PD (FIG. 11) over the circuit which extends from indirect positive bus over contacts TC–1, GS–2, PS–2, OC–4, C3–1, C2–2, and the winding of relay PD to the negative bus.

As relay TR releases, the circuit of relay LN is opened to begin the long space of the third pulse. Relay LN releases relay TC and counting chain relay C2. As relay TC releases, contacts TC–1 (FIG. 11) open the circuit of pause determination relay PD which goes through its slow release to produce the long pause. As relay PD finally releases to reoperate relay TC, which operates relay TR which operates relay LN to begin the mark period of the fourth pulse. Relay LN operates counting chain relay C4 which opens the circuit of relay TR, and closes a circuit to operate relay PD as follows; indirect positive bus, contacts TC–1, CS–4, PS–4, contacts OC–5, CI–2, OI–1, C4–1, C3–2, the winding of relay PD to the negative bus.

Relay TR releases and opens the circuit of relay LN which releases, beginning the long space associated with the fourth pulse. The release of relay LN releases counting chain relay C3 and transmitting control relay TC. When relay TC restores to open contacts TC–1 (FIG. 11) relay PD begins its slow release to create the long pause associated with the fourth pulse. When relay PD releases, relay TC is operated, in turn operating relay TR which in turn operates relay LN to end the pause and begin the mark period of the fifth pulse. Relay LN operates counting chain relay C5 and opens the circuit of relay TR which goes through its slow release period. Relay C5 operates and at contacts C5–9 closes circuit to operate reset auxiliary relay RSA (FIG. 17) to prepare for reset of the system, the circuit extending from indirect positive bus, contacts TC–4, C5–9, C4–10, CA–3, SF–4, IF–5, CI–9, and the winding of relay RSA to the negative bus. Relay RSA operates and at contacts RSA–1 locks over the path which extends from the indirect positive bus over contacts RSA–1 and CI–9 at the winding of relay RSA to the negative bus.

The release of relay TR opens the circuit of relay LN, which releases to end the fifth mark period. The release of relay LN opens the circuit of counting chain relay C4 which releases, and operates relay TR. Relay TR operates relay LN, which ends the short pause and begins the sixth make period. The operation of relay LN operates counting chain relay C0 and opens the circuit of relay TR. The operation of relay C0 reoperates the code stop relay CS, and with relays C0 and CS operated, a circuit is completed to operate the pause determination relay PD (FIG. 11) from indirect positive bus over contacts TC–1, CO–1, CT–1, and the winding of relay PD to the negative bus.

Relay TR releases to release relay LN, the release of relay LN initiating the long interval before the reset period. Relay LN also releases the counting chain relay C5 and relay TC. The release of relay TC opens the circuit of relay PD, which goes through its slow release period. When relay PD does release, a circuit is completed to operate the reset relay RS (FIG. 19) over the path which extends from the indirect positive bus over contacts PD–6, OS–10, IF–6, CS–3, RSA–2, and the winding of relay RS to the negative bus. Relay RS at its contacts RS–5 operates relay TR, and relay TR operates relay LN at the Control Station and also relay ln at the Controlled Station. The operation of these line relays at this time constitutes the reset pulse.

*Closed Indication Check Code—Operation at Controlled Station*

As a result of receipt of the closed indication check code 3–4 at the Controlled Station, the equipment effects the registration of the check code 3–4 and effects the operation of an indication check relay if the check code agrees with the control conductor of the closed and open indication relays. More specifically, relay ln operates at the beginning of the mark period of the first pulse to operate counting chain relay c1 and relay ss. At the end of the mark period, relay ln releases in turn releasing relay c0 for the short space. The release of relay c0 operates relay sf. When relay ln reoperates at the beginning of the mark period of the second pulse, relay ln operates relay c2 of the counting chain. At the end of the second mark period, relay ln releases to begin the second short space, in turn releasing counting chain relay c1. When the third mark space is received from the Control Station, relay ln reoperates, in turn operating counting chain relay c3. At the end of this third mark period, relay ln releases to begin the long pause.

The release of relay ln releases counting chain relay c2 and opens the circuit of relay ss, which begins its slow release. The long space received allows relay ss to release, and relay ss in its release operates the register relay r3. At the end of the receipt of the long pause, relay ln operates when the channel is energized to begin the mark portion of the fourth pulse.

Relay ln operates the counting chain relay c–4 and relay ss. At the end of the mark period, relay ln releases to being the long pause associated with the fourth pulse. The release of relay ln releases counting chain relay c3 and opens the circuit of relay ss, which goes through its slow release period. At the end of its release, relay ss operates the register relay r4.

When the channel is re-energized at the end of the long pause, relay ln operates, beginning the mark period. Relay ln operates counting chain relay c5 and relay ss. At the end of the mark period of the fifth pulse, relay ln releases to begin the short pause. The release or relay ln releases counting chain relay c4. Upon receipt of the mark period of the sixth pulse, relay ln reoperates, in turn reoperating counting chain relay c0. At the end of the mark period of the sixth pulse, relay ln releases beginning the long pause before reset. Relay ln restores and releases counting chain relay c5 and opens the circuit of relay ss, which releases after going through its slow to release interval. The release of relay ss operates the incoming code relay inc (FIG. 28) over a path which extends from ground on the indirect positive bus over contacts ss–2, sf–3, c0–8, r1–4, r2–6, r3–8, r4–10, r5–7, gf–3, pf–2, and the winding of relay inc to the negative bus.

The operation of relay inc extends a circuit to operate indication check relay ikc (FIG. 23) if the received indication check code agrees with the position of the closed and open indication relays. It should be recalled that in considering circuit breaker operation, relay oi (FIG. 21) is indicative of the closed or opened position of the circuit breaker, relay ci being operated if the circuit is in closed position and being nonoperated if the circuit breaker is in the open position. In that register relays r–3 and r–4 were operated, in the present example as a result of the incoming close indication check code 3–4, and since it was assumed that the circuit breaker was in the operated condition as relay ci is operated, a circuit is completed for relay ikc which extends from the indirect positive bus in FIGURE 22 over contacts r1–2, r2–4, r3–5, r4–5, over contacts inc–7 (FIG. 23), rc–12, ci–8, and the winding of relay ikc to the negative bus.

This same direct positive potential also passes over the diode dd–1 in the forward direction via conductor c (FIG. 25) and over contacts p1–2, i1–3, the winding of relay s–1, i1–2, to the negative bus, reoperating relay s1. Relay s1 operates and closes its contacts s1–6, locking over the path from direct positive bus (FIG. 25) over contacts sc–3, contacts s1–6, resistor rr–3, contacts i1–3, the winding of relay s–1, contacts i1–2, to the negative bus. It is noted that when relay s1 releases, contacts s1–7 (FIG. 26) close before contacts s1–8 open, thereby holding relay i–1 operated. Now, when relay s1 operates, contacts s1–8 close before contacts s1–7 open to hold relay i–1.

Figure 23:
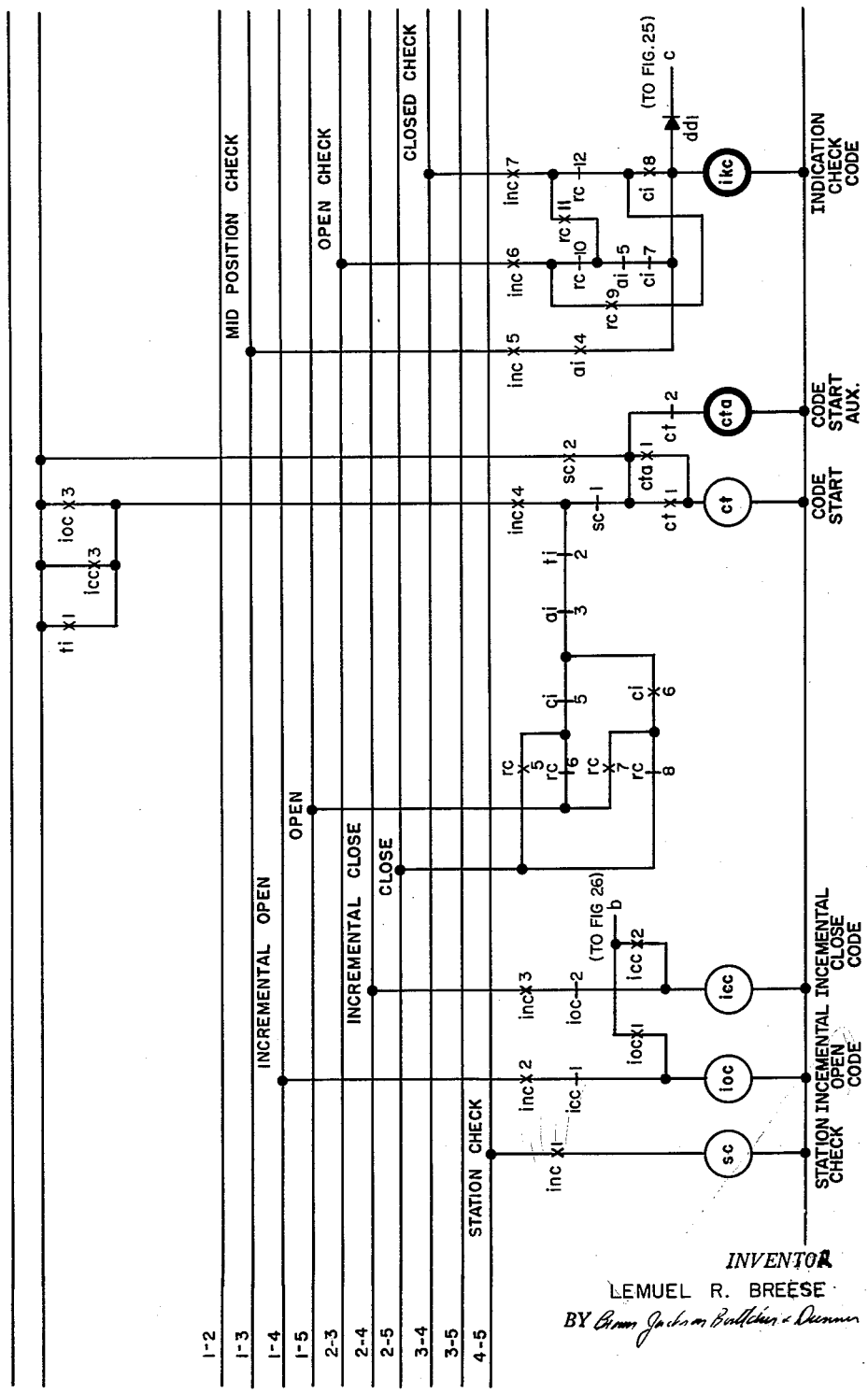

Since relay ct (FIG. 23) released at the end of the close control code, relays r3, r4, and sf have been held over break contacts ikc–1 of ikc (FIG. 28), make contacts pf–4, and break contacts ct–3 to the indirect positive bus. When relay ikc operates, contacts ikc–1 (FIG. 25) open to release relays sf, r3, and r4. Relay s1 (FIG. 25) operates and at its contacts s1–5, releases outgoing group start relay og–1. The release of register relays r3 and r4 open contacts on FIGURE 28 which release the incoming code relay inc. Also, the release of register relay contacts r3–5, and r4–5 (FIG. 22), opens the circuit of relay ikc (FIG. 23). Relay inc restores and at its contacts inc–7 further opens the circuit for relay ikc which releases slowly. The Controlled Station thereafter awaits the receipt of further signals from the Control Station.

*Reset—Operation at Control Station*

At the Control Station the equipment now prepares to generate a reset signal for effecting restoration of the equipment. With relay RS operated, contacts RS–4 open, disconnecting the regular circuits to relay TR and contacts RS–5 hold relay TR operated, so that the reoperation of relay LN does not release relay TR. Relay LN at its contacts LN–1 (FIG. 16) operates relay C1, and at its contacts LN–4 (FIG. 19), opens the circuit of the slow-to-release relay RL. The circuit of LN is held by relay TR, relay LN holding contacts LN–4 open, and allowing relay RL to complete its slow to release period.

It should be understood that with TR operated and relay LN operated, the channel is energized and relay ln at the Controlled Station is maintained operated, and such manner of operation constitutes the reset pulse which is maintained until relay RL finally releases. When relay RL does release, contacts RL–1 (FIG. 8) are opened to de-energize the indirect positive bus to open the circuit of relay RS (FIG. 19) which goes through its slow release period, and at contacts RL–2 (FIG. 16) opens the circuit of relay SS which goes through its slow release period. During the down period of relay RL with the indirect positive bus de-energized, a number of relays release as follows: IF (FIG. 13), GS (FIG. 12,), GF (FIG. 12), PS (FIG. 13), PF (FIG. 13), OS (FIG. 18), CS (FIG. 17), CI (FIG. 13), C0 and C1 (FIG. 16), RSA (FIG. 17), IFA (FIG. 13), CS1 and CS2 (FIG. 8), PS2 and PS4 (FIG. 9), G1 (FIG. 12), P–1 (FIG. 13).

Further, with contacts IF–3 and P1–5 open, the white selection lamp (FIG. 15) for point 1 is extinguished. When relay RS finally releases contacts RS–5 are opened to disconnect relay TR from the direct positive bus and relay TR goes through its slow release period. When relay TR releases, contacts TR–4 and TR–5 (FIGURE 19) open releasing relay LN, and contacts TR–1 and TR–2 (FIG. 19) close to transfer relay LN to the metering circuit. Relay LN releases and at its contacts LN–4 (FIG. 19), re-energizes relay RL which operates, re-energizing the indirect positive bus.

Relay LS is operative responsive to the metering impulses, and when relay LS operates, it in turn operates relay LSA (FIG. 18), and relays LS and LSA reactivate the telemetering impulse transmitter receiver (FIGURE 19). Relay CO (FIG. 16) reoperates as positive potential is connected to the indirect positive bus, and the Control Station is back to normal awaiting a further operation.

*Reset—Operation at Controlled Station*

At the Controlled Station, when the channel is energized in response to the reception of the reset pulse, relay *ln* at the Controlled Station operates counting chain relay *c–1* and relay *ss*, as a result of the prolonged operation of its contacts *ln–4* (FIG. 30) during the receipt of the reset signal allows the reset relay *rl* to release. Relay *rl* releases and at its contacts *rl–2* (FIG. 27) allows relay *ss* to restore slowly, and at its contacts *rl–1* (FIG. 27) opens the circuit over which the positive bus was connected to the indirect positive bus. The release of relay *rl* closes its contacts *rl–3* (FIG. 29) to operate delay start auxiliary relay *dsa* which close its contacts *dsa–1* to operate delay start relay *ds*. Relays *ds* and *dsa* operate during a reset to delay the start of another operation by the remote station for a period which is sufficient to permit the master station to start an operation and take preference, if desired. That is, relay *ds* opens contacts *ds–1* (FIG. 29) in the circuit of the outgoing start relay *os* and its contacts *ds–2* uses the circuit of the preference lockout relay *plo*. Relay *plo* operates to lock out the remote station preference feature so that the master station may take preference after a reset.

Figure 24:
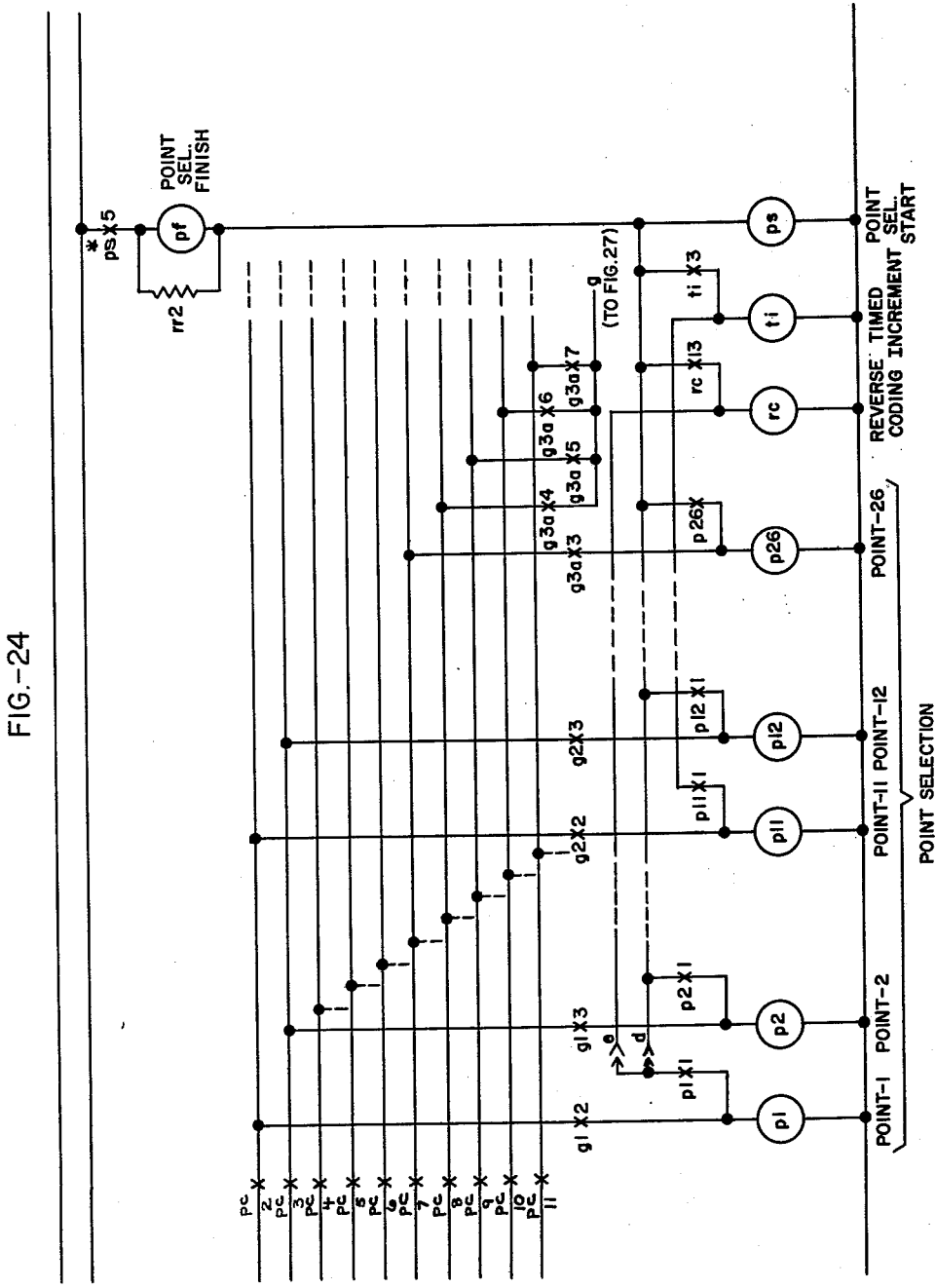

Relay *ds* at its contacts *ds–3* (FIG. 30) also operates automatic reset relay *ar* which disconnects positive potential from the indirect positive bus, and the following relays release; *gs* (FIG. 22), *gf* (FIG. 22), *ps* (FIG. 24), *pf* (FIG. 24), *is* (FIG. 29), *cs* (FIG. 28), *co* and *a1* (FIG. 27), *g1* (FIG. 22), *gia* (FIG. 22), and relay *p1* (FIG. 24).

Relay *ln* releases and at its contacts *ln–4* (FIG. 30) operates the release relay *rl*. However, relay *ln* in closing its contacts *ln–3* (FIG. 30) does not operate the transmitting relay at this time. Relay *rl* releases and at its contacts *rl–1* (FIG. 27) connects the positive bus over contacts *rl–1*, and contacts *slo–2* to the indirect positive bus to re-energize the bus. As the bus re-energizes, relay *co* (FIG. 27) reoperates over the path which extends from the indirect bus over break contacts of *co–6*, *c5–6*, *c4–6*, *c3–4*, *c2–4*, *c1–4*, resistor *rr–9*, through the right winding of relay *co* to the negative bus. Relay *rl* at its contacts *rl–3* (FIG. 29) also effects the opening of the circuit of slow release relay *dsa* which goes through its slow release period. When relay *dsa* releases contacts *dsa–1* open the circuit of slow release relay *ds*, which goes through its slow release period. When relay *ds* has gone through its slow release period, the Controlled Station is once more in its normal condition (as is the Control Station) awaiting a further operation. Relay *ds* at its contacts *ds–1* prepares a circuit for the out-going start relay OS, at its contacts *ds–2*, opens the circuit of relay *plo* previously discussed, and at its contacts *ds–3*, opens the holding circuit of the automatic reset relay *ar* which prevented its release during reset.

*Reporting a Circuit Breaker Opening on Point 1*

The previous description set forth the manner of operation of the equipment at the Control and Controlled Stations in effecting the selection of a point at the Controlled Station and the controlled operation of a circuit breaker thereat, including the transmission of information relative to the condition of such circuit breaker before and after the control operation. It is well known that circuit breakers are used to protect circuits from overloads, and in such capacity will automatically open when an overload occurs to effect such protection. In the event of such change of condition of a circuit breaker at a point in the system, it is desired and necessary for the equipment to automatically effect a reporting of the change of condition to the other circuit at the Control Station to permit the taking of appropriate action. The manner in which such reporting is automatically accomplished is now set forth.

With the system at rest the following relays will be found in the operated condition at the Control Station: RL, AR, C0, LS, LSA, LSB, LSC. Relay I1 (FIG. 14) will be found in the operated condition, and locked over the path which extends from the direct positive bus over the winding of relay I1, resistor RR–7, contacts I1–3, to the negative bus. The red lamp for point 1 (FIG. 15) will be found operated over the path which extends from the direct positive bus over contacts F1–2, I1–5, and the red lamp to the negative bus.

At the Controlled Station relays *rl, ar, co, s1* will be found in the operated condition, and the point 1 indication relay *i–1* (FIG. 26) will be found operated over the path which extends from the positive bus over contacts *a1–1*, *s1–8*, and the winding of relay *i1* to the negative bus. Also, the metering circuit is operative and relay LS at the Control Station follows the metering impulses, to provide a continuous metered set of information to the attendant thereat.

*Group Selection Code—Operation at Controlled Station*

Assuming now that the circuit breaker on point 1 at the Controlled Station opens, auxiliary contacts *a1–1* (FIG. 26) operate to release relay *i–1* (FIG. 26). Prior to this, relay *s1* (FIG. 25) was locked operated over a path which extended from the direct positive bus over contacts *sc–3*, *s1–6*, resistor *rr–3*, *i1–3*, the winding of relay *s1*, and contacts *i1–2* to the negative bus. However, when relay *i–1* releases, contacts *i1–3* and *i1–2* open, and contacts *i1–1* and *i1–4* close, and the current flow through the winding of relay *s1* is reversed, the path now extending from the direct positive bus over contacts *sc–3*, *s1–6*, resistor *rr–3*, contacts *i1–1*, the winding of relay *s1*, and contacts *i1–4* to the negative bus. The reversal of current in the winding of relay *s1* releases relay *s1*, which restores to complete a circuit for the outgoing group start relay *og1* from the direct positive bus over contacts *sc–3*, *s1–5*, and the winding of relay *og1* to the negative bus.

The operation of relay *og1* closes a circuit to operate the outgoing start relay *os* over the path which extends from the indirect positive bus over contacts *og1–3*, *icc–6*, *ioc–6*, *inc–10*, *ds–1*, *is–4* and the winding of relay *os* to the negative bus. Relay *os* operates and at its contacts *os–5* completes a circuit for the transmitting control relay *tc* (FIG. 30) which extends from the indirect positive bus over contacts pd–6, os–5, icc–9, ioc–9, cs–4, sf–6, and the winding of relay tc to the negative bus. Relay tc opens and locks over its contacts tc–6 and contacts ln–2 and resistor rr14 to the indirect positive bus. Thereupon, a circuit is completed to operate transmitting relay tr (FIG. 30) over the path which extends from the indirect positive bus, over contacts pd–6, os–5, icc–9, ioc–9, cs–4, sf–6, tc–6, ln–3, rs–3, and the winding of relay tr to the negative bus. Relay tc at its contacts tc–5 energizes delay start auxiliary relay dsa (FIG. 29) which operates and at its contacts dsa–1 operates relay ds, which is the delay start relay. Relay tr opens its break contacts tr–1 and tr–2, disconnecting the metering circuit from the line, and opens its break contacts tr–3 to remove the shunt from the resistor rr17, and at its contacts tr–4 and tr–5, energizes the line relay ln at the Controlled Station and the line relay LN (FIG. 19) at the Control Station over the channel.

At this time, the equipment at the Controlled Station has seized the channel for use in the transmission of a code set to the Control Station for the purpose of reporting a change in the position of the circuit breaker at point 1. As point 1 is the first point in the first group of points, the group selection code which represents group 1 will be transmitted (code 1–2), and thereafter the point selection code which represents the first point (code 1–2) will be transmitted. As the mark period of the first pulse of the group selection code (1–2) is now generated at the Controlled Station, relay operates, in turn operating counting chain relay c1 and releasing transmitting relay tr. At this time, make contacts ln–2 hold relay tc generated and with relay og–1 having been operated, the operation of counting chain relay c1 effects the operation of pause determination relay pd over the path which extends from the indirect positive bus (FIG. 20) over contacts tc–1, gs–1, og1–1, c1–1, co–2, and the winding of relay pd to the negative bus.

After an interval, relay tr releases, in turn releasing the line relays to begin the long pause. During the long pause, the release of relay ln effects the release of counting relay co and the release of relay tc, and the release of relays tc and co effect the operation of code register relay rl (FIG. 28) over the path whch extends from the indirect positive bus over contacts pd–4, tc–3, pf–3, co–9, cl–8 and the winding of relay rl to the negative bus. Relay rl operates and locks over its make contacts rl–6 and through contacts gs–6 (FIG. 27) to the indirect positive bus. The release of relay tc opens contacts tc–1, opening the circuit of relay pd which goes through its slow release period. The release of relay pd reoperates relay tc which reoperates relay tr, which reoperates relay ln at the Controlled Station and relay LN at the Control Station.

Relay ln operates relay c2 and opens the circuit of relay tr. With relays c2 and relay og1 both operated, a circuit obtains to operate pause determination relay pd over the path which extends from the indirect positive bus over contacts tc–1, gs–3, og1–2, c2–1, c1–2, and the winding of relay pd to the negative bus in preparation for the long pause of the second pulse. Relay tr releases to effect the release of relay ln beginning the long pause associated with the second pulse. The release of relay ln in turn releases counting chain relay c1 and relay tc. When relay c1 releases, a circuit is completed to operate register relay r2 over the path which extends from the indirect positive bus over contacts pd–4, tc–3, pf–3, co–9, c1–9, c2–8, and the winding of relay r2 to the negative bus. Relay r2 locks over its contacts r2–10, contacts gs–6 (FIG. 27) to the indirect positive bus.

Relay tc restores and at its contacts tc–1 (FIG. 20) opens the circuit of relay pd which goes through its slow release period. Relay pd releases to reoperate relay tc, which in turn reoperates relay tr, which in turn reoperates relays ln and LN to end the long pause and begin the mark period of the third pulse. As the mark period of the third pulse is received relay ln operates relay c3 and the opening of the circuit of tr. Relay tr releases to release relay ln. During the short space of the third pulse, the release of relay ln, the release of relay c2 and the operation of relay tr occurs. During the mark period of the fourth pulse relay ln and relay c4 operate and relay tr releases. During the short space period of the fourth pulse relay ln and relay c3 release and relay tr operates. During the mark portion of the fifth pulse relay ln and relay c5 operate and relay tr releases. During the short space period of the fifth pulse relay ln and relay c4 release and relay tr operates. During the mark period of the fifth pulse relay ln and relay c0 operate and relay tr releases. With the release of relay tr relay pd and code stop relay cs operate, relay pd operating over the circuit which extends from the indirect positive bus over contacts tc–1, contacts c0–1, contacts c5–1 and the winding of relay pd to the negative bus. The code stop relay cs operates over the path which extends from the indirect positive bus over contacts tc–4, c0–10, c5–9, and the winding of relay cs to the negative bus. Relay cs operates and locks over its contacts cs–1, t1–4, ikc, and contacts gs–6 (FIG. 27) to the indirect positive bus.

At the end of the mark period of the sixth pulse relay tr releases, in turn releasing relay ln, in turn releasing relays c5 and tc. The release of relay tc operates group code relay gc over the path which extends, from the indirect positive bus over contacts pd–4, tc–3, pf–3, c0–8, r1–5, r2–9, r3–11, r4–11, r5–7, gf–2 and the winding of relay gc to the negative bus. Relay gc operates relay g1 and g1a (FIG. 22) over the path which extends from the indirect positive bus over contacts r1–1, r2–1, gc–2, and the windings of relays g1 and g1a in parallel to the negative bus. Relay g1 opens and at its contacts g1–1 extends operating positive to relay gs which operates and at its contacts gs–5 (FIG. 22) closes a circuit in series with relay gf which is shunted by the operating positive of gs at this time, and at its contacts gs–6 (FIG. 27) opens the circuits which are holding relays r1, r2 and cs to release these relays. It should be observed that contacts c0–9 (FIG. 28) had previously opened the original energizing circuit of register relays r1 and r2.

The opening of contacts r1–5 and r2–9 (FIG. 28) effects the release of group code relay gc. The opening of contacts r1–1 and r2–1 (FIG. 22) interrupts the original energizing circuit for relay gs (FIG. 22), thus removing the shunt from relay gf which operates in series with relay g1 and gs. It should be observed that the opening of contacts tc–1 (FIG. 20) upon the release of relay tc did not effect the release of relay pd inasmuch as the contacts gc–1 close before relay pd can release, in turn creating a holding circuit for relay pd over the path which extends from the indirect positive bus over contacts pd–1, gc–1 and the winding of relay pd to the negative bus. Now, with contacts gc–1 released, the circuit of relay pd is opened, and relay pd goes through its slow release period. When relay pd releases, it reoperates relay tc (FIG. 30), which in turn reoperates relay tr (FIG. 30), which in turn reoperates line relays ln and LN to begin point selection.

*Group Selection Code—Operation at Control Station*

The equipment at the Control Station operates in response to the receipt of the group selection code 1–2 to effect the selection of the first group of points by operating register relays r1–r2 thereat. That is, relay LN operates in response to the receipt of the mark period of the first pulse (FIG. 19) the circuit extending from positive potential over conductor L2 through diode DD–6 in the forward direction, over the winding of relay LN, break contacts TR–3, resistor RR–19, to negative on the conductor L1 (FIG. 19). Diode DD–5 prevents the operating potential from passing over the metering circuits, the operating potential being of a polarity to that of the metering potential. As a result of the release of relay LS, contacts LS–1 (FIG. 18) open, in turn preparing for the release of relay LSA.

Relay LN operates counting chain relay C1 (FIG. 16) and relay SS (FIG. 16), the operation of relay C1 (FIG. 18) closing a circuit to operate the incoming start relay IS over the path which extends from indirect positive bus over contacts OS–7 and C1–10 and the winding of relay IS to the negative bus. Relay IS operates and locks over its contacts IS–4 to the negative bus, and at its contacts IS–6 (FIG. 18), releases relay LSA. Referring to FIG. 19, with contacts LS–2 and LSA opened, the impulse telemetering receiver is inactive.

At the end of the mark period of the first pulse relay LN releases beginning the long pause. The release of relay LN opens the circuit of counting chain relay C0, which releases, and also opens the circuit of relay SS (FIG. 16), which goes through its slow release period. The release of relay C0 effects the operation of relay SF (FIG. 16) over the path which extends from the indirect positive bus over contacts C0–7, SS–1, SF–1, and the winding of relay SF to the negative bus before the release of relay SS. Relay SF operates and locks over contacts SF–2 and GS–6 to the indirect positive bus. In that the long pause as transmitted from the Controlled Station is of sufficient length, relay SS releases, in turn operating register relay R1 over the path which extends from the indirect positive bus over contacts SS–2, SF–3, C0–9, C1–8, and the winding of relay R1 to the negative bus. Relay R1 operates and locks over its contacts R1–8, and GS–6 (FIG. 16) to the indirect positive bus.

On the mark period of the second pulse, relay LN operates in turn operating relays C2 and SS (FIG. 16). On the space period of the second pulse, relay LN releases, in turn releasing counting chain relay C1 and opening the circuit of relay SS which goes through its slow release period because the long pause is of sufficient length, in turn operating register relay R2 which operates and locks over contacts GS–6 (FIG. 16). Register relays R1–R2 are now open to indicate that the code 1–2 for effecting the selection of group 1 is being received.

At the beginning of the mark period of the third pulse, relay LN operates. Relay LN operates counting chain relay C3 and also reoperates relay SS. During the space of the third pulse, relay LN releases, in turn releasing relay C2. During the mark period of the fourth pulse, relay LN operates in turn operating counting chain relay C4. During the space period of the fourth pulse, relay LN and relay C–3 release. During the mark period of the fifth pulse relay LN operates, in turn operating relay C5. During the space period of the fifth pulse, relay LN releases in turn releasing counting chain relay C4. During the mark period of the sixth pulse relay LN operates, in turn operating relay C0. At the end of the mark period of the sixth pulse relay LN releases to initiate the intercode pause.

The release of relay LN releases relay C–5 and opens the circuit of relay SS, which goes through its slow release period. When relay SS has released, a circuit is completed to operate group code relay GC (FIG. 17) over the path which extends from the indirect positive bus over contacts SS–2, SF–4, C0–8, R2–7, R2–11, R3–11, R4–11, R5–6, GF–2, and the winding of relay GC to the negative bus. Group code relay GC operates group set relay G1 for the first group of points (FIG. 12) over the circuit which extends from the indirect positive bus over contacts R1–1, R2–1, and the winding of relay G1 to the negative bus. Group set relay G1 at its contacts G1–1 extends its operating positive to the winding of group set start relay GS, which operates, in turn closing its contacts GS–5 in series with GF which is shunted until the original operating circuit of GS is opened. Relay GS at its contacts GS–6 (FIG. 16) releases relays R1, R2 and SF. The opening of register contacts and contacts SF–3 (FIG. 17) effects the release of relay GC (FIG. 17). The release of register relays R1 and R2 effects the release of the original operating positive for relay GS, which was shunting GF, whereby relay GF operates in series with relays G1 and GS. The group selection code has been received and the relay operations at the Control Station responsive thereto have been completed, and the equipment connects the transmission of a point selection code by the Controlled Station.

*Point Selection Code—Operation at Controlled Station*

In the present example, it has been assumed that the equipment is reporting a change in the position of a circuit breaker at point 1 and accordingly the equipment now at the Controlled Station transmits point selection code 1–2 to the Control Station. On the mark period of the first pulse, relays $ln$, $cl$ and $pd$ operate and relay $tr$ releases in turn releasing relay $ln$.

During the long pause associated with the first pulse, the release of relay $ln$ effects the release of relays $tc$ and $c0$. Register relay $r1$ operates and relay $pd$ goes through its slow release. Relay $tc$ and relay $tr$ operate.

On the mark period of the second pulse, relay $ln$, relay $c2$ and relay $pd$ operate and relay $tr$ release, the release of relay $tr$ releasing relay $ln$ to begin the long pause associated with the second pulse. Relay $ln$ in releasing releases relays $c1$ and $tc$ and relay $r2$ operates. Relay $pd$ goes through its slow release period and relays $tc$ and $tr$ operate.

On the mark period of the third pulse, relay $ln$ and relay $c3$ operate, and relay $tr$ goes through its slow release On the space period associated with the third pulse relay $ln$ and $c2$ release and relay $tr$ operates. On the mark period of the fourth pulse, relay $ln$ and relay $c4$ operate and relay $tr$ releases. On the space period of the fourth pulse relay $ln$ and relay $ce$ release, and relay $tr$ operate. On the mark period of the fifth pulse relay $ln$ and relay $c5$ operate and relay $tr$ releases. On the space period of the fifth pulse, relay $ln$ and relay $c4$ release and relay $tr$ operates. On the mark period of the sixth pulse, relay $ln$ and relay $c0$ operate and relay $tr$ goes through its slow release period. Relay $pd$ operates over the circuit which extends from the indirect positive bus over contacts $tc$–1, $c0$–1, $c5$–1, and the winding of relay $pd$ to the negative bus. Relay $pd$ locks over contacts $pc$–1 and $pd$–1, to the indirect positive bus. Code stop relay $cs$ (FIG. 28) operates over the path which extends from the indirect positive bus through contacts $tc$–4, $c0$–10, $c5$–9 and the winding of relay $cs$ to the negative bus. Relay $cs$ along with register relays $r1$ and $r2$ lock over contacts $gf$–1 and $ps$–6 to the indirect positive bus (FIG. 27). At the end of the mark period of the sixth pulse, relay $ln$ releases. At this time, the incoming point selection code 1–2 has been transmitted over the channel to the Control Station.

The release of relay $ln$ releases counting chain relay $c5$ and relay $tc$ (FIG. 30). Relay $pc$ (FIG. 28) then operates over the path which extends from the indirect positive bus over contacts $pd$–4, $tc$–3, $pf$–3, $c0$–8, $r1$–5, $r2$–9, $r3$–11, $r4$–11, $r5$–7, $gf$–3, $pf$–1 and the winding of relay $pc$ to the negative bus. Relay $pc$ operates relay $p1$ (FIG. 24) over the path which extends from the indirect positive bus (FIG. 22) over contacts $r1$–1, $r2$–1, over the conductor in FIG. 23 to contacts $pc$–2 (FIG. 24), $g1$–2, and the winding of relay $p1$ to the negative bus. Relay $p1$ operates and extends its operating positive over contacts $p1$–1 and wiring option $d$ to the winding of relay $ps$. Relay $ps$ operates and at its contacts $ps$–5, establishes a circuit through relay $pf$ which is shunted at this time. When relay $p1$ operates, contacts $p1$–3 (FIG. 26) close but, because the circuit breaker is in the non-operated position the circuit of relay $i1$ is opened and no positive potential obtains over contacts $p1$–3 to the winding of closed indication relay $c1$ which remains non-operated. Relay $ps$ at its contacts $ps$–6 (FIG. 27) opens the circuit for register relays $r1$ and $r2$ and code stop relay $cs$ which release. Relays $r1$ and $r2$ at contacts $r1$–5 and r2–9 (FIG. 28) effect the release of point code relay pc, and at contacts r1–1 and r2–1 (FIG. 22) remove the shunt from relay pf (FIG. 24) to effect the operation of relay pf in series with relays p1 and ps. Relay pc restores and at contacts pc–1 (FIG. 20) opens the circuit of relay pd, and relay pd goes through its slow release period inserting a long pause in the intercode time. Relay pd releases to reoperate relay tc (FIG. 30), which reoperates relay tr, which reoperates relay ln to begin the open indication code.

*Point Selection Code—Operation at Control Station*

As a result of the receipt of the point selection code 1–2 at the Control Station the mark period of the first pulse, relays LN, C1 and SS operate. On the long pause associated with the first pulse, relay LN releases to open the circuit of relay C0 which releases, and opens the circuit of relay SS. The release of relay C0 also operates relay SF, which relay SS goes through its slow release period. The release of relay SS, as a result of the long pause received, effects the operation of register relay R1.

On the mark period of the second pulse relays LN, C2 and SS operate. On the long pause associated with the second pulse, relay LN, C1 and SS release because of the long space received. The release of relay SS effects the operation of relay R2.

On the mark period of the third pulse relays LN, C3 and SS operate. On the space associated with the third pulse relays LN and C2 release. On the mark period of the fourth pulse, relays LN and C4 operate, and on the space period of the fourth pulse, relays LN and C3 release. On the mark period of the fifth pulse, relays LN and C5 operate, and on the space period of the fifth pulse relays LN and C4 release. On the mark period of the sixth pulse, relays LN and C0 operate. At the end of the mark period of the sixth pulse relays LN and C5 release, and relay SS goes through its slow release period.

Relay PC (FIG. 17) operates over the circuit which extends from the indirect positive bus over contacts SS–2, SF–4, C0–8, R1–7, R2–11, R3–11, R4–11, R5–6, GF–3, PF–3, and the winding of relay PC to the indirect positive bus. Relay P1 (FIG. 13) operates over the circuit which extends from the indirect positive bus (FIG. 12) over contacts R1–1, R2–1, and over contacts PC–1 and the winding of relay P1 to the negative bus. Relay P1 operates and extends its operating positive over contacts P1–1 to the winding of relay PS, operating the same. Relay PS operates and closes its contacts PS–5 in series with relay PF, which is shunted. Relay P1 (FIG. 13) operates and closes a circuit to operate closed indication relay CI (FIG. 13) from the indirect positive bus over contacts P1–2, I1–1, and the winding of relay CI to the negative bus, relay I1 (FIG. 14) being operated as a result of its last memory of the position of the controlled device.

The white lamp (FIG. 15) associated with point 1 lights as an indication that point 1 has been selected, the circuit for the white lamp extending from direct positive potential over contacts IS–2, P1–5, and the white lamp to the negative bus. The opening of contacts PS–6 (FIG. 16) effects the opening of the holding circuits for relay R1 (FIG. 17), relay R2 (FIG. 17) and relay SF (FIG. 16), releasing the same. With reference to FIG. 17, the release of relays R1, R2 and SF opens contacts SF–3, R1–7 and R2–11 to effect the release of relay PC. The opening of contacts R1–1 and R2–1 effects the removal of the shunt from point selection finish relay PF (FIG. 13) and point selection finish relay PF operates in series with relays P1 and PS. The point selection code has now been registered on the equipment at the Control Station and the equipment at the Controlled Station is now open to generate an open indication code.

*Open Indication Code (1–5)—Operation At Controlled Station*

The open indication code is now generated at the Controlled Station in the manner described with reference to the closing of a circuit breaker on point 1, and reference is made to such description.

*Open Indication Code (1–5)—Operation at Control Station*

The response at the Control Station to the open indication code transmitted by the Controlled Station is the same as that set forth relative to the closing of a circuit breaker on point 1 until operation of relay INC following the sixth mark period during the intercode pause. Reference is therefore made to such portion of the description for the detailed operation of the switching circuits.

In that the Control Station remembers the position as being closed, and the Controlled Station is sending an open indication code as a result of the change at the station, a disagreement of conditions must be indicated, and as relay INC operates, a circuit is completed to operate the indication disagreement relay ID from the indirect positive bus over make contacts R1–1, break contacts R2–2, break contacts R3–2, break contacts R4–2, make contacts R5–1, contacts INC–2, make contacts CI–6, and the winding of relay ID to the negative bus. Relay ID operates and locks over contacts INC–4 and ID–1 to the indirect positive bus. In other words, the receipt of an open indication code was evidenced by the operated relays R1 and R5 and the closed indication as stored was evidenced by the operated contacts CI–6 and the disagreement circuit was therefore energized to indicate such condition.

The operation of relay ID completes a circuit to operate the point 1 flashing relay F1 over the path which extends from the direct positive bus through contacts IS–1, ID–2, P1–4, and the winding of relay F1 to the negative bus, and (referring to FIG. 14) a shunting circuit for point 1 indication relay I1 is coupled from the direct positive bus over contacts INC–5, R1–5, R2–6, ID–4, P1–3, the winding of relay I1 back to the direct positive bus; relay I1 therefore releases.

Relay F1 operates and locks over resistor RR–11, contacts F1–1, and contacts of the reset key to the direct positive bus. Relay AB operates over the path which extends from the indirect positive bus over contacts OS–5, ID–2, and the winding of relay AB to the negative bus. Relay AB operates and locks over contacts AB–1, resistor RR–4 and contacts of the alarm key to the direct positive bus. When contacts I1–1 open and contacts I1–2 close upon the release of relay I1, close indication relay CI releases and open indication relay OI operates.

Referring to FIGURE 15, with the release of relay I1 contacts I1–5 open and contacts I1–4 close, and a transfer of the energized circuit is made from the red lamp to the green lamp. In that contacts FL3–1 on flashing relay F1 open and close intermittently, as explained below, a flashing circuit for the green lamp associated with point 1 is intermittently closed from the direct positive bus over contacts FL31, contacts F1–3, and I1–4, through the green lamp labeled "G" to the negative bus and the red lamp is extinguished.

As a result of the operation of relay AB (FIG. 18) contacts AB–2 close and an obvious circuit obtains for ringing the alarm bell from the direct positive bus over contacts AB–2 and the alarm bell to the negative bus. When contacts F1–4 (FIG. 15) close as a result of the operation of the flashing relay F1 for point 1, a circuit is completed to operate the red lamp associated with station 1 to give the alarm that station 1 has had an automatic change of indication, the circuit extending from the direct positive bus over contacts F1–4 and the winding of the station 1 lamp to the negative bus.

The circuit for flashing the point lamp is now described in more detail. Referring to FIGURE 15, when relay F1 operates, a circuit is closed over the path which extends from the direct positive bus over contacts F1–4, diode DD–1 in the forward direction through the winding of relay FL–1 to the negative bus. Relay FL–1 is a slow-to-release relay, and at its contacts FL1–1 operates slow-to-release relay FL2, the circuit extending from the direct positive bus over contacts FL1–1 through the winding of relay FL2 to the negative bus. Relay FL2 operates and at its contacts FL2–2 operates fast relay FL3 over the path which extends from the direct positive bus over contacts FL2–2 and the winding of relay FL3 to the negative bus. Relay FL3 is a slave of relay FL2, and accordingly, the sequence of operation of relay FL1 and FL2 is as follows: relay FL1 operates relay FL2; relay FL2 opens the circuit of relay FL1, which goes through its slow to release period. When relay FL1 has released, it opens the circuit of relay FL2, which goes through its slow release period. When relay FL2 has released it reoperates relay FL1, which in turn reoperates relay FL2. Such cycle is repeated and contacts FL3–1 (FIG. 15) open and close to flash the green lamp on point 1.

It should be noted that any of the contacts of relays F1 to F26, associated with station 1, which close operate the station 1 red lamp; and the direct positive potential passes through diode DD1 in the forward direction and through the winding of FL1 to negative potential, operating relay FL1. Also, the operation of any of the relays F27 to F60 associated with station 2 results in the closure of contacts which extend direct positive potential over diode DD2 and the winding of relay FL1 as well as through the red lamp associated with station 2. It should be noted that any relays F41 to F80 associated with station 3 which operate closes contacts which extend direct positive potential through the winding of the red lamp associated with station 3, and over diode DD3 and the winding of relay FL1. If all the Controlled Station points were in a single controlled station, the leads from contacts of the relays referred to above to terminals 2 and 3 could be disconnected from terminals 2 and 3 and connected directly to terminal 1. The red lamps associated with stations 2 and 3 could be eliminated as well as the diodes DD1, DD2 and DD3. Similarly, if the situation were as shown except that the last group of points F41–F80 were in station 2, the lead from contacts of these relays to terminal 3 could be disconnected from terminal 3 and transferred to terminal 2. The red lamp associated with station 3 could be eliminated as well as the diode DD3.

Referring to FIGURE 12, when relay CI releases and relay OI operates a circuit is completed to the indication agreement relay IA over the path which extends from the indirect positive bus over contacts R1–1, R2–2, R3–2, R4–2, R5–1, INC–2, break contacts CI–5, make contacts OI–5, and the winding of relay IA to the negative bus. It should be noted that relay ID does not release at this time, and is held over contacts INC–4 and ID–1 until relay INC subsequently releases.

Relay IA (FIG. 13) operates and at its contacts IA–1 opens the indication finished relay IF over the path which extends fom the indirect positive bus over contacts IFA–3, IA–1 and the winding of relay IF to the negative bus. Relay IF operates and locks through the winding of relay IFA and contacts IF2 preparing a circuit for relay IFA which is shunted at this time.

It should be observed that register relays R1 and R5 (FIG. 17) and relay SF (FIG. 16) were holding over contacts IA–2 and IF–4 in parallel through contacts PF–1 to the indirect positive bus and that when relay IA operated one of these parallel circuits was opened. As relay IF now operates, the other of these parallel circuits is opened to release relays SF, R1 and R5. With relays SF, R1 and R5 released, relay INC releases. Also, with relays R1 and R5 released, the circuit of relay IA (FIG. 12) is opened and relay IA goes through its slow release period. With relay SF released, a circuit is completed to operate transmitting control relay TC (FIG. 19) over the path which extends from the indirect positive bus, over contacts PD–6, OS–9, IF–6, CS–4, SF–6, through the winding of relay TC to the negative bus.

Relay TC operates and when relay LN reoperates, locks through its contacts TC–7 and contacts LN–2. The operation of relay TC conditions the Control Station to transmit the open indication check code 2–3. When relay IA completes its slow release period the shunt for relay IFA is removed. Relay IFA as energized operates in series with relay IF; and at its contacts IFA–3 opens the original operating circuit of relay IF, which is held operated over contacts IF–2. Relay IFA at its contacts IFA–3 also holds the shunt circuit of relay IF open.

When relay TC operates relay TR operates. Relay INC releases and at its contacts INC–4 (FIG. 12), releases the indication disagreement relay ID. Relay TR operates Control Station relay LN, and Controlled Station relay ln to begin the open indication check code.

*Open Indication Check Code (2–3) and Reset—Operation at Control Station*

The Control Station is the transmitting station at this time and the Controlled Station is the receiving station. Relay LN operates and in turn operates counting chain relay C1 and opens the circuit of relay TR, which goes through its slow release. The release of relay TR releases relay LN to begin the short space associated with the first pulse. The release of LN releases the counting chain relay C0 and operates relay TR.

On the mark period of the second pulse relay LN, relay C2 and relay PD operate and relay TR releases. The release of relay TR restores relay LN to begin the long space. Relay C1 and relay TC release, and relay PD goes through its slow release period. The release of relay PD operates relay TC, relay PD having inserted an elongation in the space period. Relay TC operates relay TR. During the mark period of the third pulse relay LN operates, relay C3 operates, relay PD operates and relay TR goes through its slow release. On the long pause associated with the third pulse, relay LN releases, relays C2 and TC release, relay PD goes through its slow release period, relay TC operates, and relay TR operates.

On the mark period of the fourth pulse, relay LN and relay C4 operate, and relay TR goes through its slow release period. On the short space, relay LN releases, relay TR operates, and relay C3 releases. On the mark period associated with the fifth pulse relay LN and relay C5 operate, and relay TR goes through its slow release period. Relay C5 completes a circuit for reset auxiliary relay RSA (FIG. 17) which extends from positive point on the indirect positive bus over contacts TC–4, C5–9, C4–10, CA–3, SF–4, IF–5, OI–9, and the winding of relay RSA to the negative bus. The release of relay TR releases relay LN to begin the space period. Relay C4 releases and relay TR operates. On the mark portion of the sixth pulse relay LN operates, relay C0, relay PD and relay CS (FIG. 17) operate over the path which extends from the indirect positive bus over contacts TC–4, C5–9, C0–10 and the winding of relay CS to the negative bus, and locks over the path which extends from the indirect positive bus over contacts IA–3, OC–8, GF–5, CS–2. Relay TR goes through its slow release period, and as relay TR releases, relay LN is restored to begin the open period before the reset signal.

Relay LN releases relays C5 and TC and relay TC at its contacts TC–1 (FIG. 11) opens the circuit of relay PD, which goes through its slow release period to generate a long space. With relay RSA operated, the release of relay PD completes a circuit to operate the reset relay RS (FIG. 19) over the path which extends from the indirect positive bus over contacts PD–6, OS–9, CS–3, RSA–2 and the winding of relay RS to the negative bus. Relay RS operates and at its contacts RS–3 locks to the indirect positive bus; at its contacts RS–5 (FIG. 19), operates relay TR; and at its contacts RS–2 (FIG. 19), holds relay AR. Relay TR operates relay LN and over the channel relay *ln* to begin the reset signal at both stations.

Relay LN operates relays C1 and SS and at its contacts LN–4 (FIG. 19) opens the circuit of relay RL. The prolonged operation of relay LN allows relay RL to go through its slow release period. On an operation other than a reset operation, relay LN releases in time for its contacts LN–4 to catch relay RL and prevent its release, but because of this prolonged operation of relay LN relay RL is allowed to release. Relay RL (FIG. 8) restores and at its contact RL–1 disconnects positive potential from the indirect positive bus and all relays holding to the bus are de-energized. Relay RS now goes through its slow release period, and at its contacts RL–2 (FIG. 16) releases the counting chain relays C1 and C0 and allows relay SS to go through its slow release period.

As a result of the removal of positive potential from the indirect positive bus the following relays release: relay I*f* (FIG. 13); relays GS and GF (FIG. 12); relays PS and PF (FIG. 13); relay IS (FIG. 18) which had been holding through its contacts IS–4 to the indirect positive bus; relay CS (FIG. 17); relay OI (FIG. 13); relay RSA (FIG. 17); and relay IFA (FIG. 13); relay G1 (FIG. 12) which had been holding through its contacts G1–1 through the winding of relay GF and the contacts GS–5 in series with relay GF and in parallel with relay GS; and relay P1 (FIG. 13), which had been holding through its contacts P1–1 in parallel with relays PS and PF and contacts PS–5.

Relays IS and IF release and at their contacts IS–2 and IF–3 (FIG. 15) extinguish the white selection lamp. When relay RS releases after the elongated time period, contacts RS–5 (FIG. 19), open the circuit of relay TR, which goes through its slow release, in turn releasing relay LN, which ends the reset pulse. The release of relay LN closes contacts LN–4 (FIG. 19), reoperating relay RL, which re-establishes positive potential over contacts RL1 (FIG. 8) to the indirect positive bus. The re-establishment of positive potential to the indirect positive bus reoperates the counting relay C0 (FIG. 16). When relay TR releases, contacts TR–4 and TR–5 (FIG. 19) are opened and contacts TR–1, TR–2, and TR–3 (FIG. 19), are closed, re-establishing the metering circuit at the Control Station. In that the Controlled Station is also reset, relay LS is re-energized over the channel and at its contacts LS–1 (FIG. 18), reoperates relay LSA which locks over its contacts LSA–3 and contacts TC–5 and IS–6 to the indirect positive bus. Relay LSA at its contacts LSA–2 opens its original operating circuit and at its contacts LSA–1 extends indirect positive pulses over contacts LS–1 of metering relay LS to the windings of relay LSB which under normal operations keeps relay LSB operated. That is, the charge on condenser CC1 which is coupled over resistor RR18 and the winding of relay LSC is normally sufficient to keep relay LSB operated between pulses.

Referring to the lower portion of FIG. 19, the closure of contacts LS–2 connects direct potential to the impulse telemetering receiver returning its indicator to zero, and when contacts LSA–4 subsequently operate, 115 volts alternating current is connected to the impulse telemetering receiver. During the continuous metering, contacts LSA–4 remain closed and contacts LS–2 pulse to give an indication on the impulse telemetering receiver. The ratio of the open to close portions of these pulses determine the operation of the pen recorder (see also FIG. 2A), and the metering pulses received constitute the line supervision arrangement.

It should be observed at this time that the alarm bell (FIG. 18) is ringing; that the station on red lamp (FIG. 15) is lighted; and that the green lamp associated with point 1 (FIG. 15) is flashing. The attendant at the Control Station may now operate the alarm key (FIG. 13) which opens the holding circuit of relay AB (FIG. 13) to the direct positive bus, releasing relay AB, which opens its contacts AB–1 (FIG. 13) and AB–2 (FIG. 18), silencing the alarm bell (FIG. 18). The attendant also operates the reset key, a portion of which is shown in FIG. 14 to interrupt the holding circuit for relay F1, and to effect the opening of contacts F1–4 (FIG. 15) to extinguish station 1 alarm lamp and release flashing relays FL1, FL2, and FL3. The opening of contacts F1–3 and the closure of contacts F1–2 transfer the green lamp associated with point 1 from intermittent positive to a steady positive causing the lamp to light steadily. The operation of the reset key reoperates relay RS (FIG. 19), which in turn reoperates relay TR (FIG. 19), which goes through the motions to transmit a long reset signal again, resetting both ends. The equipment thereby is returned to normal operation at the Controlled Station as a result of the open indication check code 2–3.

*Open Indication Check Code (2–3) and Reset—Operation at Controlled Station*

At the Controlled Station, relay *ln* operates in response to the mark period of the first pulse of the open indication check code 2–3 received from the Control Station, in turn operating relays *c1* and *ss*. On the short space period of the first pulse relay *ln* and relay *co* release operating relay *sf* (FIG. 27). On the mark period of the second pulse, relay *ln* reoperates in turn operating counting chain relay *c2*. At the end of the mark period of the second pulse relay *ln* releases in turn releasing counting chain relay *c1* and opening the circuit of slow release relay *ss*. Since a long space is now received from the Control Station, relay *ss* has an opportunity to release and in its release operates the register relay *r2*.

On the receipt of the mark period of the third pulse, relay *ln* operates in turn operating relay *c3*. At the end of the mark period of the third pulse, relay *ln* releases, in turn releasing relay *c2* and opening the circuit of relay *ss*, which goes through its slow release period because of the long space received, to operate register relay *r3*. With register relays *r2* and *r3* operated, the open indication check code is marked on the register.

When the mark period of the fourth pulse is received, relay *ln* operates, in turn operating relays *c4* and *ss*. At the end of the mark period of the fourth pulse, relay *ln* releases, in turn releasing relay *c3*. When the mark period of the fifth pulse is received, relay *ln* operates, in turn operating relay *c5*. At the end of the mark period of the fifth pulse relay *ln* releases, in turn releasing relay *c4*. During the reception of the mark period of the sixth pulse, relay *ln* operates, in turn operating relay *co*. At the end of the receipt of the mark period of the sixth pulse, relay *ln* releases, in turn releasing relay *c5* and opening the circuit of relay *ss*, which goes through its slow release period because of the long pause received.

The release of relay *ss* operates relay *inc* (FIG. 28) over the path which extends from the indirect positive bus over contacts *ss–2*, *sf–3*, *c0–8*, *r1–4*, *r2–7*, *r3–10*, *r4–11*, *r5–7*, *gf–3*, *pf–2* and the winding of relay *inc* to the negative bus. With reference to FIG. 26, it should be recalled that open indication relay *oi* does not function on a circuit breaker operation, but that closed indication relay *ci* will be either operated or released when relay *p1* operates, depending upon whether the circuit breaker is in the closed position or in the open position. In the present example, relay *ci* will be found in the released condition indicating that the circuit breaker is open. Accordingly, inasmuch as the open indication code 2–3 has been received denoting an open indication and relay *ci* is non-operated, the agreement between the position of *ci* and the incoming code completes a circuit for the indication check code relay *ikc* (FIG. 23) to operate the relay from the indirect positive bus over contacts *r1–2*, *r2–3*, *r3–3* (FIG. 22), contacts *inc–6* (FIG. 23), *rc–10*, *oi–5*, *ci–7*, and the winding of relay *ikc* to the negative bus. Relay *inc* operates indicating that an indication check code in agreement with the conductor of the circuit breaker has been received.

Figure 25:
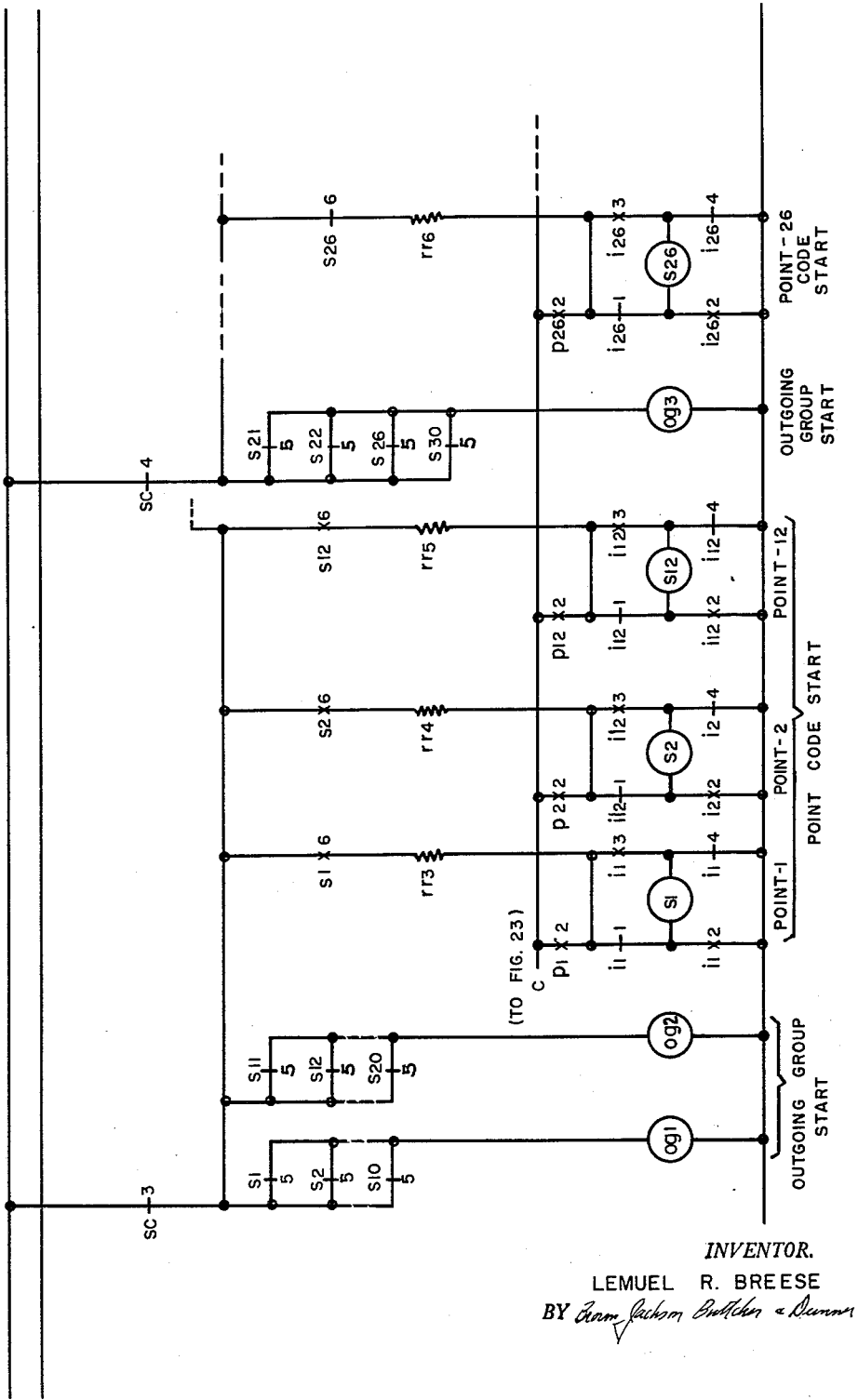

The same positive potential is coupled over the diode *dd1* (FIG. 23) over conductor *c*, over contacts *p1–2* (FIG. 25), *i1–1*, the winding of relay *s1*, and contacts *i1–4* to the negative bus reoperating relay *s1*, which then locks over the path which extends from the direct positive bus over contacts *sc–3*, *s1–6*, resistor *rr–3*, contacts *i1–1*, winding of relay *s1*, contacts *i1–4* to the negative bus. Relay *ikc* operates and opens its contact *ikc–1* (FIG. 28), releasing relay *sf* (FIG. 27) and relays *r2* and *r3* (FIG. 28), which had been holding over the break contact *ikc–1* of relay *ikc* and contacts *pf–4* and *ct–3* to the negative bus. Relay *s1* operates and at its contacts *s1–5* (FIG. 25) releases relay *og1* (FIG. 25). The opening of contacts *sf–3*, *r2–7* and *r3–10* (FIG. 28) effects the release of the incoming code relay *inc*. Relays *r2*, *r3* release and at contacts *r2–3* and *r3–3* (FIG. 22) open the circuit at the indication check code *ikc* (FIG. 23), and remove the original energizing circuit of relay *s1* (FIG. 25). Relay *ikc* goes through its slow release period.

When the reset signal is received, relay *ln* operates relays *c1* and *ss* and opens the circuit of the release relay *rl*. As the reset signal is a long mark signal, relay *rl* has time to release, and disconnects positive potential from the indirect positive bus (FIG. 27), and at its contacts *rl–2* (FIG. 17), opens the circuit of relay *ss*, which goes through its slow release period; at its contacts *rl–2* also releases counting chain relays *c0* and *c1*; and at its contacts *rl–3* (FIG. 29) operates relay *dsa* over the circuit which extends from the direct positive bus over contacts *rl–3* and the winding of relay *dsa* to the negative bus. Relay *dsa* at its contacts *dsa–1* operates delay start relay *ds*, and with ground removed from the indirect positive bus, the following relays release: relay *gs* (FIG. 22), relay *gf* (FIG. 22), relay *g1* (FIG. 22), relay *g1a* (FIG. 22), relay *ps* (FIG. 24), relay *pf* (FIG. 24), relay *p1* (FIG. 24), relay *os* (FIG. 29), and relay *cs* (FIG. 28) which was holding over the circuit from indirect positive through relays *t1–5* and *cs–1*.

At the end of the receipt of the reset signal, relay *ln* releases and at its contacts *ln–4* (FIG. 30), reoperate relay *rl*. Relay *rl* operates and re-establishes a circuit over contacts *rl–1* and *slo–2* to positive potential on the indirect positive bus (FIG. 27). The re-establishment of positive potential on the indirect positive bus reoperates the counting chain relay *c0* (FIG. 27), and the reoperation of relay *rl* effects the opening of contacts *rl–3* (FIG. 29) to allow relay *dsa* to go through its slow release period. After relay *dsa* has gone through its slow release period, contacts *dsa–1* open to in turn open the circuit of relay *ds*, which goes through its slow release period. when *ds* has gone through its slow release period, the equipment is returned to normal.

*Opening a Disconnect Switch on Point 2*

The disconnect switch at point 2 in the Controlled Station is a switch which moves relatively slowly from the closed limit position to the open limit position and vice versa, contrasting with a circuit breaker which closes and opens abruptly. Disconnect switches usually open dry circuits, or hold open circuits which a circuit breaker already has opened. With reference to FIGURE 26, the disconnect switch thereat releases auxiliary make contacts *a2–2* which close when the disconnect switch is in its extreme closed position and break contacts *b2–1* which close when the disconnect switch is in its extreme open position, and the contact sets can therefore be used as transfer contacts. In a circuit breaker, of course, a single set of auxiliary contacts are operative between the open and close condition. As a result of the difference in operation of the disconnect switch and the circuit breaker it is necessary to provide a different operating arrangement.

It is initially noted for background purposes that when contacts *a2–2* (FIG. 26) close with the switch in the extreme closed position, indication relay *i2* operates over the circuit which extends from the direct positive bus over contacts *a2–2* and the winding of relay *i2* to the negative bus, and at its contacts *i2–5* locks over resistor *rr7* to the direct positive bus. When the disconnect switch moves away from the extreme closed limit position, contacts *a2–2* open, but relay *i2* is held over the described holding circuit until the disconnect switch reaches its extreme open position, at which time break contacts *b2–1* close to shunt relay *i2* which releases and opens contacts *i2–5*.

Similarly if the disconnect switch is in the open position, relay *i2* is in the non-operated position, having been shunted by contacts *b2–1*. As the disconnect switch moves from the open position to the closed position, and contacts *b2–1* are opened with the initial movement of the switch but relay *i2* is not energized and operated until the disconnect switch reaches the closed position and closes contacts *a2–2* to complete the operated circuit for relay *i2*.

With the system in the idle condition and assuming that the disconnect switch on point 2 is in the closed position, relays RL, AR, CO, LS, LSA, LSB, LSC, and I2 at the Control Station will be in the operated condition. At the Controlled Station, relays *rl*, *ar*, *co*, *sl* and *i2* will be in the operated condition. With relay I2 at the Control Station operated, the red lamp on point 2 (FIG. 15) will be energized over the circuit which extends from the positive bus over contacts F2–2 and I2–5, the red lamp and negative battery.

When the attendant momentarily depresses the selection key for point 2 (FIG. 3), circuits are completed to operate relay GS1 (FIG. 8) in series with relay GS2 (FIG. 8) through the portion of the selection key designated selection key 1–10 to prepare for the transmission of group code 1–2, the operation of the relays *gs1*, *gs2* indicating that the device on point 2 is in the first group of points. Energizing circuits are also completed over that portion of the key on FIGURE 9 designated selection key 2, 12, 22, to operate relay PS1 in series with relay PS3 to prepare the system for the transmission of code 1–3 to indicate and effect selection of the second point in the first group.

The functioning of the relays at Control and Control Stations during the group selection code is the same as that already described, long pauses occurring during the space periods of the first and second pulses to effect the selection of group 1 at the Control and Controlled Stations, and the operation of register relays R1 and R2 which effect the operation of group selection relays G1 at the Control Station, and register relays *r1* and *r2* which effect the operation of group selection relays *g1* and *g1a* at the Controlled Station.

The functioning of the relays at the Control and Controlled Station during the point selection code is also similar to that already described. Pause determination relay PD at the Control Station is operated during the mark portion of the first and third pulses, and register relays R1 and R3 operate in turn effecting the operation of relay P2 (FIG. 13), the operating path extending from positive potential on the indirect positive bus over contacts R1–1, R2–2, R3–1, PC–2, G1–3, and the winding of relay P2 to the negative bus. The release of relay PD during the first and third pulses introduces long pauses in the space periods of the first and third pulses which results in the operation of relay *ss* at the Controlled Station during the mark portion of the first and third pulses and the release thereof during the space period of the first and third pulses. Register relays *r1* and *r3* operate to in turn control the operation of relay *p2* (FIG. 24) over the path which extends from the indirect positive bus (FIG. 22) over contacts r1–1, r2–2, r3–1, through FIG. 23 into FIG. 24, contacts pc–3, and the winding of relay p–2 to the negative bus.

The closed indication code as transmitted from the Controlled Station has long pauses on the second and fifth pulses resulting in the operation of register relays R2 and R5 at the Control Station. With relay CI operated, agreement relay IA is operated over the path which extends from the indirect positive bus over contacts R2–2, R2–3, R3–4, R4–4, R5–2, INC–3, CI–7, OI–7, the winding of relay IA to the negative bus.

When the relays of the Control and Controlled Stations come to rest, an impulse type metering circuit will be completed from positive battery (FIG. 20), over the direct positive bus in FIGS. 20–30, contacts slo–7, resistor rr16, contacts f2–7, is–11, tr–2, the winding of relay ln, contacts tr–3, resistor rr18, conductor L1, through FIGURE 1 to the Control Station, resistor RR19, contacts TR–3, the winding of relay LN, diode DD–5 in the forward direction, contacts TR–2, the winding of relay LS, contacts P2–6, OS–11, GF–7, TC–8, SF–7, TR–1, conductor L2, through FIGURE 1 back to the Controlled Station, contacts tr–1, if–7, tc–7, is–10, p2–6, the 10-inch valve transmitter, resistor rr15 to the negative bus, through FIGURES 30–20, to negative battery.

As contacts of the 10-inch valve transmitter unit open and close, relay LS at the Control Station follows these pulses and the ratio thereof effects a meter reading, as illustrated in FIGURE 2A. The selective metering of the 10-inch valve continues until the attendant operates the Open Control Key or the Reset Key. Assuming that the attendant operates the Open Control Key, the metering circuit is interrupted and the equipment at the Control Station transmits the code 1–5, i.e., long pauses at the first and fifth pulses, resulting in the operation of register relays r1 and r5 at the Controlled Station, which in turn effect the operation of the open control relay (FIG. 26) on point 2 over a path which extends from the direct positive bus, over contacts os–1, inc–8, r5–5, r1–3, p1–5, and the winding of the open coil on point 2 to negative battery.

The operation of the open control relay causes the disconnect switch to start moving from the closed position in the direction of the open position, opening make contacts a2–2 as soon as it starts to move. As noted heretofore, relay i2 (FIG. 26) remains locked over its contacts i2–5 to maintain relay ci (FIG. 26) operated.

When the Disconnect Switch reaches its extreme open position, break contacts b2–1 close to shunt relay i2 which releases, and opens contacts i2–5 to release closed indication relay ci. The release of relay i2 in turn releases relay s2 (FIG. 25).

When relay ci releases, an agreement is reached between the received open control code (relays r1 and r5 operated) and the position of relay ci (i.e., released for open position of controlled device) and accordingly relay cta (FIG. 23) operates over the path which extends from the indirect positive bus (FIG. 22), over contacts r1–1, r2–2, r3–2, r4–2, r5–1, contacts rc–6 (FIG. 23), ci–5, oi–3, ti–2, sc–1, ct–2, and the winding of relay cta to the negative bus. Relay cta (FIG. 23) operates relay ct (FIG. 23), to release relay cta which goes through its slow release period. With relay cta released and relay ct operated contacts cta–2, ct–3 open the holding circuit to the code start relay cs (FIG. 28) to release relay cs so that the Controlled Station can send the indication code.

Thereupon, the Controlled Station sends the Open Indication Code 2–5 comprising long pauses at the second and fifth pulses to drive the relays at Controlled and Control Stations in the manner previously described. At the end of receipt of this code by the Control Station, relay SS releases during the intercode pause to operate relay INC. When relay INC operates, a circuit is completed to operate the disagreement relay ID in that the last remembered position of the Disconnect Switch was the closed position, and the Indication Code just received as a result of opening the Disconnect Switch is the open position.

More specifically, it should be appreciated that point 2 selection relay P2 (FIG. 13) and the point 2 indication relay (FIG. 14) were operated and locked, and accordingly, relay CI (FIG. 13) is in the operated condition and relay OI (FIG. 13) is in the released condition. Thus, with register relays R1 and R5 operated as a result of receipt of the open indication code, a circuit is completed to operate the disagreement relay ID from indirect positive bus, over contacts R1–1, R2–2, R3–2, R4–2, R5–1, INC–2, CI–6, winding of relay ID to the negative bus.

With relay R1 operated (as contrasted with relay R2 if the closed indication code had been received), relay I2 (FIG. 14) is shunted over the path from the direct positive bus, contacts INC–5, R1–5, R2–6, ID–4, P1–3, winding of relay I2, to the direct positive bus. When relay I2 releases, contacts I2–1 (FIG. 13) open and contacts I2–2 close, releasing relay CI and operating relay OI. Relay I2 at its contacts I2–5 extinguishes the red lamp on point 2 and at its contacts I2–4 lights the green lamp on point 2 to indicate to the attendant that the Disconnect Switch is open.

When relay CI releases, contacts CI–6 (FIG. 12) open the operating circuit of relay ID which remains locked until contacts INC–4 open. The closing of break contacts CI–5 due to the release of relay CI and the closing of make contacts OI–5 due to the operation of relay OI effect the operation of agreement relay IA (FIG. 12).

When relay IA operates contacts IA–2 (FIG. 16) open, and relays SF, R1 and R5 which have been holding therethrough release, and contacts IA–3 (FIG. 17) open to release relay CS.

Digressing briefly, it should be appreciated that with contacts IFA–2 (FIG. 17) open, the opening of contacts IA–3 can release relay CS. However, with the first indication code received before the control operation, relay IFA could not operate until relay IA released to remove the shunt therefrom. Accordingly, contacts IA–3 (FIG. 17) closed before contacts IFA–2 opened to prevent the release of code start relay CS and to prevent the Control Station from sending an indication check code in response to the first indication received. However, once relay IFA (FIG. 13) operated contacts IFA–3 open so that the subsequent functioning of relay IA cannot affect it. Once contacts IFA–2 (FIG. 17) open the next operation of relay IA can release the code stop relay CS.

Returning from the digression, the release of the register relays opens the circuit of relay IA which goes through its slow release period. The release of relay SF and the register relays release relay INC, which releases relay ID. With the code stop relay CS released, relay TC reoperates to cause the Control Station to send the open indication check code. Thereupon the Control Station sends the open indication check code 2–3 involving long pauses on the second and third pulses to drive the equipment at both Control and Controlled Stations in a manner apparent from the previous disclosure.

At the Control Station when counting chain relay C5 operates, a circuit is completed to operate reset auxiliary relay RSA over the path which extends from the indirect positive bus through contacts TC–4, C5–9, c4–10, CA–3, SF–4, IF–5, CI–9, and the winding of relay RSA to the negative bus. With relay RSA operated, as relay PD releases at the end of the indication check code, an operating circuit is completed over reset relay RS.

At the Controlled Station, when relay ss releases at the end of the indication check code, relay inc (FIG. 28) operates over the path which extends from the indirect positive bus, through contacts is–2, sf–3, co–8, r1–4, r2–7, r3–10, r4–11, r4–7, gf–3, pf–2, and the winding of relay inc to the negative bus. Indication check code relay ikc operates over the path which extends from the indirect positive through contacts r1–2, r2–3, r3–3, inc–6, oi–5, ci–7, and the winding of relay ikc to the negative bus. The positive potential extends over diode dd–1 and conductor c to FIGURE 25, through contacts p2–2, i2–1, winding of relay s2, contacts i2–4 to the negative bus, reoperating relay s2, which locks. Thereupon relays sf, r2, r3, ogi, inc, and ikc release.

With relay RS operated at the Control Station, the Control Station sends the Reset Pulse to effect reset and return to normal at the Control and Controlled Station.

*Reporting a Disconnect Switch Closure on Point 2*

A Disconnect Switch does not automatically function in the manner of a circuit breaker. However, if a Disconnect Switch is manually changed from the open position to the closed position, a report of the change must be automatically forwarded. Accordingly, when the Disconnect Switch leaves the open position, contacts b2–1 open but relay i2 does not operate until the Disconnect Switch reaches the closed position and contacts a2–2 close. Relay i2 locks from positive potential on the direct positive bus over contacts i2–5, resistor rr–7, and the winding of relay i2 to negative potential.

The opening of contacts i1–1 and i1–4, and the closure of contacts i1–3 and i1–2 cause current to flow through the winding of relay s1 in the reverse direction, releasing relay s1 which initiates a reporting operation by the Controlled Station in a manner which is apparent from the preceding description.

*Selective Controlled Amplitude Metering on Point 11*

Point 11 at the Controlled Station is illustrative of a point which locates a device which when selectively "raised" or "lowered" over the channel controls an output which is metered over the channel. Such device might comprise a variable transformer, the "raise" operation controlling a motor to change the turns ratio of the transformer to increase the output voltage, and the "lowerIf ( operation controlling a motor to function to change the turns ratio to decrease the transformer output voltage. A metering source, such as ms2 (FIG. 30), derives a current which varies as a function of the transformer output voltage, and the amplitude of this variable current causes the left meter to read accordingly.

As shown in FIGURE 3, the point 11 equipment at the Control Station comprises a point selection key, a White Selection Lamp, and a point selection relay P11, but not indication relay or flashing relay. It is noted at this time that relay P11 operates common timed increment relay TI (FIG. 13).

As shown in FIGURE 4, the point 11 equipment at the Controlled Station comprises a point selection relay p11, but no point indication relay or point code start relay. It should be observed that the point selection relay p11 controls the metering relay m11 and the raise and lower coils, and that relay p11 operates common timed increment relay ti (FIG. 24).

With the equipment at rest, the usual common relays are in the operated condition. To select point 11, the attendant at the Control Station momentarily depresses the point selection key on point 11 (FIG. 3), point 11 being the first point in the second group of points. When the point 11 selection key is depressed, a first portion of the selection key (labeled Selection Key 11–20 in FIGURE 8) closes its contacts to select the second group of points, operating relays GS1 and GS3 in series, the operating circuit extending over the second winding of GS1 and the first winding of GS3.

Relay GS1 operates and locks from the negative bus, over its first winding contacts GS1–1, resistor RR1 and contacts OS–1 to the direct positive bus. Relay GS3 operates and locks from the negative bus, over its first winding, contacts GS3–1, resistor RR1, and contacts OS–1 to the direct positive bus. The operation of relays GS1 and GS3 prepares the equipment at the Control Station for the transmission of the group 2 selection code 1–3 including long pauses on the first and third pulses.

A second portion of the point 11 selection key, labeled Selection Key 1, 11, 21 in FIGURE 9, closes its contacts to select the first point (in the second group), operating relays PS1 and PS2 in series via the second winding of relay PS1 and the first winding of relay PS2. Relay PS1 operates and locks from the negative bus, over its first winding, contacts PS1–1, through resistor RR1 (FIG. 9) and contacts OS–1 to the direct positive bus. Relay PS2 operates and locks from the negative bus over contacts PS2–1 to the locking circuit to which PSi is connected.

As a result of the receipt of the group selection code 1–3, register relays R1 and R3 at the Control Station and register relays r1 and r3 at the Controlled Station operate, resulting in the operation of group selection relay G2 (FIG. 12) and g2 and g2a (FIG. 22). As a result of the point selection code 1–2, register relays R1 and R2 at the Control Station and register relays r1 and r2 at the Controlled Station operate to result in the operation of point selection relay P11 and timed increment relay TI (FIG. 13) and point selection relay p11 and timed increment relay ti (FIG. 24). More specifically, relay P11 operates and extends its operating positive potential to relay T1 which operates, and extends its operating positive potential to relay PS. Relay p11 extends its operating potential to relay ti which operates, and extends its operating potential to relay ps.

Relay T1 at its contacts T1–2 and TI–3 (FIG. 10), prepares a circuit for the Incremental Open Key which will operate the Open Code relay 26 instead of the Incremental Open Code Relay IOC; and at its contacts TI–4 and TI–5 prepares a circuit for the Incremental Close Key which will operate the Close Code relay CC instead of the Incremental Close Code Relay ICC. Such arrangement prevents the occurrence or a stall in the event one of the incremental control keys is operated while standing on point 11.

Relay P11 operates and at its contacts P11–4 (FIG. 19) prepares a circuit to the amplitude meter M, at its contacts p11–3 (FIG. 26) operates metering relay m11, which operates and at its contacts m11–1 and m11–2 connects the metering source ms2 to the amplitude transmitter t in preparation for amplitude metering on point 11. Relay P11 at its contacts P11–2 (FIG. 13) operates the open indication relay OI. As there are no indication relays and no red and green lamps on point 11, the operation of relay OI is in preparation of the receipt of the open indication code which is in the pattern of codes transmitted by the Controlled Station whenever point 11 is seized.

Thereafter the Controlled Station sends the indication code which, with relays oi and ci (FIG. 26) both non-operated, comprises the open code 1–5. This can be appreciated by referring to the indication code fan circuit in the right side of FIGURE 21 for controlling pause determination relay pd (FIG. 20). As there shown, with relays ci and oi both non-operated, circuits are provided to relay pd on the first and fifth pulses, the circuit on the first pulse being over contacts ci–2, rc–4, c1–1, and co–2, and the circuit on the fifth pulse being over contacts oi–2, c5–2, and c4–2. At the end of the open indication code, the code stop relay cs (FIG. 28) operates and locks over contacts cs–1 and t1–5 to the indirect positive bus.

At the Control Station the reception of the open indication code 1–5 results in the operation of register relays R1 and R5. With register relays R1 and R5 operated as a result of the receipt of the open indication code, and with relay OI having been operated with point 11 selection, a circuit is completed to operate Indication Agreement relay IA from positive potential on the indirect positive bus, over contacts R1–1, R2–2, R3–2, R4–2, Rt–1, INC–2, Ci–5, OI–5, and the winding of relay IA to the negative bus. Relay IA operates and at its contacts IA–1 operates relay IF. The operation of relays IF and IA opens contacts IA–2 and IF–4 (FIG. 16) allowing relays SF, R1, and R5 to release. Relay IF at its contacts IF3 (FIG. 15) completes a circuit for the white selection lamp on point 11.

The release of relays SF, R1, and R5 releases relay INC (FIG. 17). The release of relays R1 and R5 opens the circuit of relay IA which goes through its slow release period, and the release of relay IA opens contacts IA–1 (FIG. 13) which removes the shunt from relay IFA which operates and opens its contacts IFA–3. Thus the receipt of the open indication code from the Controlled Station matches with the synthetic open indication expectation at the Control Station to permit further advancement of the desired relay sequence.

An amplitude metering circuit is now found completed from positive potential on transmitter $t$ (FIG. 30), over contacts $tr$–2, winding of relay $ln$, contacts $tr$–3, resistor $rr18$, conductor L1, through FIGURE 1, conductor L1 at the Control Station (see FIGURE 19), resistor RR19, contacts TR–3, winding of relay LN, diode DD–5 in the forward direction, contacts TR–2, OS–12, amplitude meter M, contacts P11–4, OS–11, GF–7, TC–3, SF–7, TR–1, conductor L2, through FIGURE 1, conductor L2 at the Controlled Station, contacts $tr$–1, $sf$–7, $tc$–7, $is$–10, $p11$–6, to negative from transmitter $t$.

The metering circuit thus described becomes effective upon the release of relay SF at the Control Station, the release of relay SF being dependent upon the operation of relay IF which was in turn dependent upon the operation of relay IA which was dependent upon receipt of the open indication code (determined synthetically for point 11) from the Controlled Station and the matching thereof with the open indication synthetically set up for point 11 at the Control Station.

The reading of the meter M (FIG. 17) shown in the upper left of FIG. 2A apprises the attendant as to the value of the function to be observed (such as the voltage values) and/or the function to be controlled at point 11 at the Controlled Station.

If the voltage is correct as first read, the attendant depresses the Reset Key to return the equipment to normal. If an adjustment of the function, voltage for example is needed, the attendant does not depress the Reset Key at this time, but momentarily depresses the Close Key or incremental Close Key to raise the valve of the telemetered function, such as voltage; or momentarily depresses the Open Key or Incremental Open Key to lower the value of the telemetered function, such as voltage.

It should be recalled that with relay T1 (FIG. 13) operated when point 11 was selected, the incremental keys are transferred to perform the same functions as the regular close and open keys. In the present example, it is assumed that it is desired to raise the voltage being monitored, and the attendant accordingly momentarily depresses the Close Key (or Incremental Close Key).

When the attendant depresses the Close Key (FIG. 10), relay CC operates over the path which extends from the indirect positive bus over contacts OS–4, IF–1, CA–1, contacts of the Close Key, and the winding of relay CC to the negative bus. If the Incremental Close Key had been depressed, relay cc would have been operated over the path from the indirect positive bus, contacts OS–4, IF–1, CA–1, contacts of the Incremental Close Key, contacts TI–4, and the winding of relay CC to the negative bus. Relay CC operates and extends its operating positive over its contacts $cc$–1 to the winding of relay OC to operate the same. Relay OC operates and at its contacts OC–3, operates relay CA to the indirect positive bus, and at its contacts OC–8 releases the code stop relay CS (FIG. 17) so that the Control Station can transmit the Close (Raise) code. The release of relay CS results in the closure of contacts CS–1 over which relay CC locks through contacts OC–1, CS–1, and OC–3 to the indirect positive bus. This positive potential extends back over contacts $cc$–1 to hold relay CC.

As a result of the release of the code stop relay CS, transmitter control relay TC (FIG. 19) operates over contacts CS–4, starting the transmittal of the Close (Raise) code as determined by the control contact fan at the right in FIG. 11 which was conditioned by the relays of FIG. 10. The Control Station transmits the Close control code 2–5 resulting in the operation of register relays $r2$ and $r5$ at the Controlled Station.

At the end of receipt of the Close control code at the Controlled Station, relay $ss$ releases, operating relay $inc$. Because relay $ti$ (FIG. 24) is in the operated condition with its contacts $ti$–1 (FIG. 23) closed, the operation of relay $inc$ completes a circuit to operate code start auxiliary relay $cta$ (FIG. 23) over the path which extends from the indirect positive bus over contacts $ti$–1, $inc$–4, $sc$–1, $ct$–2, and the winding of relay $cta$ to the negative bus. Relay $cta$ operates and extends its operating positive potential over contacts $cta$–1 to the winding of code start relay $ct$, which operates and locks over its contacts $ct$–1 and locks independent of relay $cta$. Relay $ct$ at its contacts $ct$–4 (FIG. 30) operates timed increment control relay $tia$ over the path which extends from the indirect positive bus over contacts $ti$–6, $ct$–4, and the winding of relay $tia$ to the negative bus, and at contacts $ct$–2 opens the circuit of relay $cta$, allowing relay $cta$ to go through its slow release period.

The operation of relay $inc$ also completes a circuit, with relays $r2$ and $r5$ operated, to operate the raise relay (FIG. 26; also FIG. 4) on point 11 over the path which extends from the positive bus over contacts $os$–1, $inc$–8, $r5$–5, $r2$–5, $p11$–5, and the winding of the raise relay to the negative bus.

The raise relay on point 11 operates and locks over contacts $tia$–1 to the indirect positive bus. The operation of the raise relay causes the motor (not shown) to operate and raise the voltage of the point 11 device.

When relay $cta$ releases contacts $cta$–2 open the holding circuits of relays $r2$, $r5$, and $sf$ (FIG. 28). Relay $cs$ is held over contacts $ti$–5 and contacts $cta$–2 (FIG. 28). With relay $cs$ held, contacts $cs$–4 remain open, and transmitter control relay $tc$ remains non-operated. With relay $sf$ and the register relays released, relay $inc$ (FIG. 28) releases, and opens contacts $inc$–4 (FIG. 23), releasing relay $ct$. The release of relay $ct$ effects the opening of contacts $ct$–4 (FIG. 30) allowing circulating current to flow through the loop comprising the winding of relay $tia$, resistors $rr11$, $rr12$, and rheostat $rr13$ back to the other side of the winding of relay $tia$, keeping relay $tia$ in the operated condition for a period of time as determined by the loop circuit constants and the setting of the rheostat.

When timed increment auxiliary relay $tia$ releases, it opens its contacts $tia$–1 (FIG. 26) to release the raise coil on point 11 which de-energizes the control motor associated with the variable transformer to terminate changing or adjustment of the output voltage and the telemetered quantity is now at a constant value.

If the attendant now decides that the correct voltage has been reached he momentarily presses the Reset Key. If, however, he decides that additional control is necessary he again momentarily presses a control key. Assuming now that the attendant again depresses the Close Control Key to further increase the output voltage of the transformer on point 11, as the Close Key is depressed, relays CC, OC, and CA (FIG. 10) reoperate. Relay OC at its contacts OC–8 (FIG. 17) releases code stop relay CS (FIG. 17) which reoperates relay TC (FIG. 19) which initiates the transmission by the Control Station of the close control code. At the conclusion of receipt of the close control code by the Controlled Station, relay $ss$ releases and relay $inc$ operates.

With relay $ti$ (FIG. 24) still locked, the operation of relay $inc$ reoperates relay CTA (FIG. 23) which reoperates relay $ct$. Relay $ct$ operates and opens the circuit of relay *cta* allowing it to go through its slow release. Relays *r2*, *r5* and *inc* reoperate to energize the raise relay on point 11 which again locks through contacts *tia–1* (FIG. 26), relay *tia* having also been reoperated through contacts *ti–5* and *ct–4* by relays *ti* and *ct*. During the period that the raise coil is energized, the voltage of the controlled transformer on point 12 is raised, and results in an increased voltage reading on the meter at the Control Station. Relay *cta* releases to release others of the relays as previously described.

This process can be repeated as many times as the attendant wishes by merely momentarily depressing the Close or Open Control Key. If the Open Control Key is depressed, circuits are completed to effect the transmission of an Open Control Code by the Control Station which results in operation of the lower coil (FIG. 26) on point 11 instead of the raise coil, and resultant reduction of the voltage from the contrlled transformer. If the controlled transformer is driven to the limit position of adjustment in either direction, limit switches of the transformer open so that if the raise or lower coil is again energized no further energization of the motor to drive it in such direction may occur. When the attendant is satisfied that the correct setting of the controlled transformer has been achieved, the depressing of the control keys is terminated. It should be appreciated that the repeated operation of the control keys reoperates relay CA (FIG. 10) repeatedly to open its contacts CA–3 (FIG. 17) and then prevent the normal operation of relay RSA (FIG. 17).

At this point, the following relays at the Control Station will be in the energized condition: GS–1, GS–3, PS–1, PS–2, G–2, GS, GF, P–11, TI, PS, PF, OI, IF, IFA, CS, OS, LSD, LSC, LSB, LSA, LS, RL.

At the Controlled Station, the following relays will be in the energized condition: *g2, g2a, gs, gf, p11, ti, ps, pf, cs, is*.

When the attendant momentarily operates the Reset Key (FIG. 2A), a circuit is completed from the positive bus (FIG. 19) over the contacts of the Reset Key, and the winding of the reset relay RS to the negative bus, operating relay RS. Relay RS operates and at its contacts RS–3 locks to the indirect positive bus; at its contacts RS–2 operates relay AR; at its contacts RS–5, operates relay TR, which releases relay LS. Relay TR operates and at its contacts TR–4 and TR–5 operates relays LN and *ln*. Relay LN operates and at its contacts LN–4 opens the circuit of slow release relay RL, which goes through its slow release. Relay RL operates and at its contacts RL–1 (FIG. 8) disconnects positive potential from the indirect positive bus.

With the indirect positive bus at the Control Station de-energized, the following relays release: G–2, GS, GF, P–11, TI, PS, PF, OI, IF, IFA, CS, OS, OSA. The release of relay OS in turn releases relays GS–1, GS–3, PS–1 and PS–2. With the indirect positive bus at the Control Station de-energized the holding circuit of relay RS is opened, and assuming the contacts of the Reset Key have opened (i.e., that the Reset Key has been released by the attendant) relay RS goes through its slow release period, in turn opening the RS–5 circuit of relay TR, which goes through its slow release. Relay TR releases, and in turn releases relays LN and *ln*. Relay LS reoperates, in turn reoperating relay LSA. The release of relay LN, recloses contacts LN–4 for the circuit of relay RL to reoperate relay RL. Relay RL at its contacts RL–1 (FIG. 8) reconnects positive potential to the indirect positive bus.

At the Controlled Station, the prolonged operation of relay *ln*, at contacts *ln–4* (FIG. 30), closes the circuit of release relay *rl*. Relay *rl* operates and at its contacts *rl–1* disconnects positive potential from the indirect positive bus. With the indirect positive bus at the Controlled Station de-energized, relays *g–2, g2a, gs, gf, p–11, ti, ps, pf, cs,* and *is* release. When Control Station reset signal terminates, relay *ln* releases, reoperating relay *rl* (FIG. 30) which reconnects positive potential to the indirect positive bus.

Thus both Control and Controlled Stations are returned to normal.

*Controlling a Valve on Point 12*

In the idle condition of the equipment the continuous impulse metering will be operative in the manner heretofore described and certain common relays will be in the operated position at the Control and Controlled Stations as noted above.

Assuming the valve (not shown) on point 12 to be in the open position (the "flow" position), indication open relay IO–12 (FIGURES 3, 14) at the Control Station will be operated over the path which extends from the direct positive bus, over the winding of relay IO–12, the resistor RR–10, and contacts IO12–2 to the negative bus. With contacts IO12–3 (FIGS. 3, 15) closed, the red lamp on point 12 (i.e., red indicates flow) will be lighted over the path which extends from the direct positive bus over contacts FI2–2, 10, 12–3, and the red lamp to the negative bus.

At the Controlled Station, with the valve in the open position, make contacts *a12–1* (FIGS. 4, 26) which are controlled by the valve (not shown) will be open, and contacts *a12–2* (FIGS. 4, 26) will be closed. Accordingly, relay *i12* (FIG. 26) will be operated over the path which extends from the direct positive bus over contacts *a12–2*, and the right winding of relay *i12* to the negative bus. Also point code start relay *s12* (FIGS. 4, 25) will be held over the path which extends from the direct positive bus over contacts *sc–3, s12–6*, resistor *rr5, i12–3*, the winding of relay *s12*, contacts *i12–2* to the negative bus.

Digressing, with reference to relay *i12* it should be noted that relay *i12* is operated over its left winding through closed make contacts *a12–1* if the valve is fully open, and relay *i12* is operated over its right winding through closed make contacts *a12–2* if the valve is fully closed. Relay *i12* is released if the valve is in the mid-position with contacts *a12–1* and *a12–2* both closed, because the left and right windings are opposed and both energized, causing the armature of the relay and associated contacts to be in the released position. Furthermore, it should be noted that when selection relay *p12* (FIG. 24) for point 12 subsequently operates to close contacts *p12–3* and *p12–4* (FIG. 26) and the left winding of relay *i12* is energized, the positive potential is extended over contacts *p12–3* to relay *ci* (FIG. 26). If relay *i12* is released due to both windings being energized, contacts *i12–5* (FIG. 26) will be closed and relay *oi* (FIG. 26) will be operated. The following table shows the position of relays *ci* and *oi* upon point selection with the valve in the three states of operation and the indication codes which are provided by the equipment when the different states of operation occur.

| Valve | Relay *ci* | Relay *oi* | Indication Code |
|---|---|---|---|
| Open | −*ci* | −*oi* | 1–5 |
| Closed | +*ci* | −*oi* | 2–5 |
| Mid. Pos | +*ci* | +*oi* | 1–2 |

NOTE: − released; + operated.

Returning from the digression, the valve was assumed to be open in the present illustration, and relay *i–12* is energized over its right winding only, and neither relay *ci* nor relay *oi* are prepared to operate upon the subsequent point selection.

To select point 12, the attendant at the Control Station momentarily depresses the point 12 Selection Key (FIGS. 2B, 3, 8, 9). Since point 12 is the second point in the second group, the closure of contacts labeled Selection Key 11–20 (FIG. 8) operate relays GS1 and GS3 in series to condition the equipment to transmit the code for group 2 (long spaces on pulses 1 and 3). Relays GS1 and GS3 lock in the manner described above. The closure of contacts labeled Selection Key 2, 12, 22 (FIG. 9) operates relays PS1 and PS3 in series which prepare the equipment to transmit the code for point 2 (long spaces on pulses 1 and 3), relays PS1 and PS3 locking in the manner described above.

Relays gs1 and gs3 operate and at contacts GS1–4 and GS3–6 close parallel circuits to operate outgoing start relay OS, which locks over its contacts OS–6 to the indirect positive bus.

Relay OS at the Control Station initiates the transmission of the group selection code with long pauses on pulses 1 and 3 in the manner previously described to effect the operation of register relays R1 and R3 (FIG. 17) and group 2 selection relay GS (FIG. 12) at the Control Station; and register relays r1 and r3 (FIG. 28) and group 2 selection relays g2 and g2a (FIG. 22) at the Controlled Station. Referring to FIG. 11, the circuit for operating relay PD on the first pulse extends from the indirect positive bus over contacts TC–1, GS–1, GS1–2, C1–1, C0–2, and the winding of relay PD to the negative bus. The circuit for operating relay PD on the third pulse extends from the indirect positive bus over contacts TC–1, GS–3, GS5–4, GS4–5, GS3–4, C3–1, C2–2, and the winding of relay PD to the negative bus.

It should be observed that the contact chains are arranged so that for the first digit of the group selection code the lower numbered relay of the group GS1–GS5 through contacts GS–1 open contacts which disable the circuit through the contacts of the higher numbered relays of this group; and that for the second digit of the group selection code, the higher numbered relay of the group GS1–GS5 through contacts GS–3, open contacts which disable circuits through the contacts of the lower numbered relays of this group.

On the sixth pulse, relay PD is operated over the path which extends from the indirect positive bus over contacts TC–1, C0–1, C5–1 and the winding of relay PD to the negative bus. Relay PD operates and locks over contacts GC–1 and PD–1. When relay GC releases during the space following the sixth pulse, the circuit of relay PD is opened, and relay PD goes through its slow release to provide the long intercode pause. The release of relay PD operates relay TC initiating the transmittal by the Control Station of the point selection code 1–3 for the second point of the group.

The circuits for operating relay PD during the mark periods of the first and third pulses of the point selection code so that relay PD may then be released to provide long pauses on the space periods of the first and third pulses, include (a) on the first pulse path which extends from the indirect positive bus over contacts TC–1, GS–2, PS–1, PS1–2, C1–1, C0–2 and the winding of relay PD to the negative bus; (b) on the third pulse a path which extends from the indirect positive bus over contacts TC–1, GS–4, PS–3, PS5–4, PS4–5, PS3–4, C3–1, C2–2, and the winding of relay PD to the negative bus. As before, with the extension of the first digit path through contacts PS–1, contacts of the lower numbered relays disable paths through contacts of the higher numbered relays, and with the extension of the second digit path over contacts PS–3 of the point selection code, contacts of the higher numbered relays disable paths through contacts of the lower numbered relays.

During the point selection code, register relays R1 and R3 at Control Station and register relays r1 and r3 at the Controlled Station operate, and at the end of the point selection code, point selection relay P12 operates at the Control Station and point selection relay p12 operates at the Controlled Station. Referring to FIGURES 4 and 30, relays P12 and p12 at contacts P12–7 connect the 12-inch meter transmitter to the metering circuit in preparation for the selective metering of the 12-inch pipe.

It is assumed that the valve is in the open position, and relay i12 is therefore in the operated position. As relay p12 operates to close its contacts p12–3 and p12–4, open contacts a12–1 prevent relay ci from operating, and open contacts i12–5 prevent relay oi from operating, thus preparing circuits through contacts in the right portion of FIGURE 21 to operate relay pd (FIG. 20) on the mark portion of the first and fifth pulses so that release on the space periods of these pulses can produce long pauses. Relay p12 operates relay ps which releases relays r1, r3, and sf. Relay ps operates and at its contacts ps–7 (FIG. 30) operates relay tc to initiate transmission from the Controlled Station of the open indication code 1–5.

The paths for operating relay pd (FIG. 20) on the first and fifth pulses pass over contacts tc–1, gs–2, ps–4, c1–2, and rc–4 for the first pulse; and over contacts tc–1, gs–4, ps–3, and oi–2 for the fifth pulse.

The transmission of the open indication code 1–5 by the Controlled Station with the long pauses on the first and fifth pulses results in the operation of register relays R1 and R5 at the Control Station. When relay SS at the Control Station releases after the open indication code, relay INC operates. Because the expected open and received open codes agree, indication agreement relay IA operates, in turn operating relay IF which releases relays SF, R1, and R5. Also the white selection lamp on point 12 operates over the circuit which extends from the direct positive bus, over contacts IF–3, P12–7, and over the white selection lamp to the negative bus.

The release of relay SF closes a selective impulse metering circuit for metering the 12-inch valve from the positive bus (FIG. 30), over contacts slo–7, resistor rr16, contacts p12–8, is–11, tr–2, the winding of relay ln, contacts tr–3, resistor rr18, conductor L1, through FIGURE 1 to conductor L1 at the Control Station, resistor RR19, contacts TR3, winding of relay LN, diode DD5 in the forward direction, contacts TR2, winding of relay LS, contacts P12–8, OS–11, GF7, TC8, SF7, TR1, conductor L2, through FIGURE 1 back to the Controlled Station, contacts tr–1, sf–7, tc–7, is–10, p12–7, the pulsing contacts of the 12-inch transmitter, and resistor rr15 to the negative bus. Metering of the 12-inch pipe is thus effected by momentarily operating the point 12 selection key.

The attendant may only have wanted to monitor the 12-inch pipe, in which case, after he has completed his observation of the metering of the 12-inch pipe he may depress the Reset Key which effects the operation of reset relay RS (FIG. 19) to control the transmittal of the Reset signal by the Control Station, and returning of the equipment to normal.

*Closure of Valve on Point 12*

Assuming that the attendant desires to close the valve of point 12, the attendant now operates the Close Key (FIG. 10) to operate relay CC which operates relay OC and in turn operates relay CA.

The operation of relay OC effects the opening of contacts OC–8 (FIG. 17), to release the code stop relay CS, which operates relay TC (FIG. 19) to initiate the transmitting of the close control code 2–5 by the Control Station. Relays CC and OC at the contacts on the right side of FIG. 11 control relay PD to provide long pauses on the second and fifth pulses, and the transmitted code results in the operation of register relays r2 and r5 at the Controlled Station. At the end of receipt of the Close Code, relay ss (FIG. 27) at the Controlled Station releases, operating relay inc (FIG. 28). Thereupon the close coil (FIG. 26) on point 12 operates over the path which extends from the direct positive bus over contacts os–1, inc–8, r5–5, r2–5, and the winding of the close coil to the negative bus. Close coil operates to move the valve from the extreme open position in the direction of the closed position.

As soon as the valve moves from the extreme open position, contacts a12–1 (FIG. 26) close, in turn operating relay ci (FIG. 26) over the path which extends from direct positive potential over contacts a12–1, p12–3, and the winding of relay ci to the negative bus. Also, positive potential from the direct positive bus, extended over contacts a12–1, energizes the left winding of relay i12. With both windings energized (the right winding through contacts a12–2), the relay armature returns to the non-operated position, closing contacts i12–5, in turn operating relay oi (FIG. 26). The release of relay i12 in turn releases relay s12 (FIG. 25), which operates relay og2 (FIG. 25) which operates relay plo (FIG. 29). The close relay (FIG. 26) remains operated until the valve has been driven to the close limit position.

When the valve has reached the close limit position, contacts a12–2 (FIG. 26) open, de-energizing the right winding of relay i12 (FIG. 12). Thereupon, with only the left winding energized and unopposed, the armature assumes the operated position, opening contacts i12–5 which releases relay oi (FIG. 26). Relay ci remains operated through closed contacts a12–1.

Figure 21:
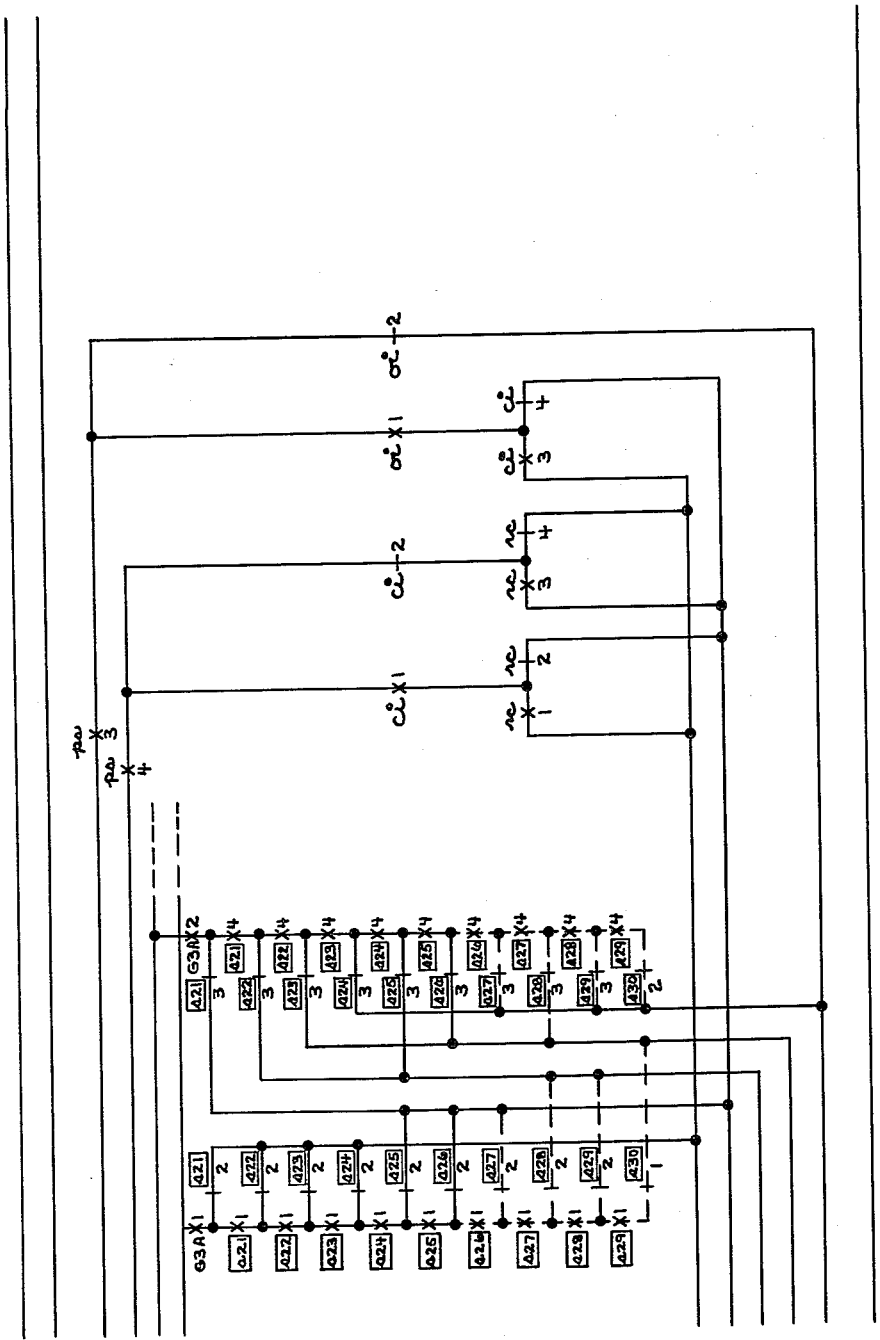

With relay ci operated, and relay oi released to indicate a closed valve, and with register relays r2 and r5 operated as a result of the close indication code which was received, an agreement is reached for operating the code start auxiliary relay cta (FIG. 23) over the path which extends from the indirect positive bus (FIG. 22), over contacts r1–2, r2–3, r3–4, r4–4, r5–2, into FIG. 21, rc–8, ci–6, oi–3, ti–2, sc–1, ct–2, and the winding of relay cta to the indirect positive bus.

Relay cta operates relay ct which operates and opens the circuit of relay cta which initiates its slow release period.

The release of relay cta effects the opening of its contacts cta–2 (FIG. 28), to release relays r2, r5, sf, and cs which have been holding thereover, and the opening of contacts cta–1 (FIG. 23) release relay ct. The release of relay sf and register relays r2 and r5 release relay inc (FIG. 28) which releases the interposing close relay on point 12. The release of relays cs and sf operate transmitting control relay tc (FIG. 30), which operates transmitting relay tr (FIG. 30) and relay dsa (FIG. 29). Relay dsa operates relay ds (FIG. 29), and relay tr operates relay ln and LN to begin the transmission of the closed indication code.

With relay ci operated, and relay oi released, pause determination relay pd (FIG. 20) is operated on the second and fifth pulses to provide long spaces on these pulses as previously described to in turn effect the operation of register relays R2 and R5 at the Control Station. As a result of such operation the disagreement relay ID (FIG. 12) operates, in turn operating relay IC12 (FIG. 14) over the path which extends from the direct positive bus over the winding of relay IC12, contacts P12–4, ID–4, R2–7, and resistor RR6 to the negative bus. Relay IC12 operates and locks over contacts IC12–2, and relay IO12 is shunted over the path which extends from the direct positive bus over the winding of relay IO12, contacts ID–3, R1–4, R2–5, and INC–5 to the direct positive bus.

Relay IC12 at its contacts IC12–1 (FIG. 13) closes to operate relay CI, and relay IO12 at its contacts IO12–1 releases relay OI. Contacts IC12–3 (FIG. 15) light the green lamp on point 12 indicating "No Flow" or closed valve and contacts IO12–3 open to extinguish the red lamp on point 12. Thereupon with contacts R2–3, R5–2, CI–7, and OI–7 (FIG. 12) operated relay IA operates, and relays SF, R2, R5, CS, INC, ID, IA, TC and TR release.

The Control Station now sends the Closed Indication Check Code 3–4. Relay RSA operates on the fifth pulse, allowing a reset at the end of the code. With relays r3, r4 and ci operated and relay oi released, relay ikc (FIG. 23) operates and extends its operating potential through diode dd1, conductor c to FIG. 25, contacts p12–2, i12–3, the winding of relay s12, contacts i12–2, to the negative bus operates relay s12 which locks.

Following the Closed Indication Check Code, the Control Station sends the long mark constituting the Reset signal, and resetting the Control and Controlled Stations.

*Incremental Control*

It is now assumed that after point selection, the attendant desires to effect an incremental closing of the valve on point 12. To effect the first short movement of the valve, he momentarily depresses the incremental close key (Inc. Close Key) FIG. 10, operating incremental close code relay ICC over the path which extends from the indirect positive bus over contacts OS–4, IF–1, CA–1, the contacts of the Inc. Close Key, contacts TI–5, and the winding of relay ICC to the negative bus.

Relay ICC operates relay OC by extending its operating positive to relay OC over contacts ICC–1, and relay OC at its contacts OC–3 operates relay CA, and at its contacts OC–8 (FIG. 17), releases code stop relay CS. When relay CS releases and contacts CS–1 (FIG. 10) close, relay OC locks over the path which extends from the indirect positive bus over contacts OC–3, CS–1, OC–1, and the winding of relay OC to the negative bus, holding relay ICC over such path. Relay CS at its contacts CS–4 also operates transmitting control relay TC which effects the transmittal of the incremental close code 2–4. The pause determination relay PD (FIG. 11) operates on the mark portions of the second and fourth pulses to provide long spaces on these pulses, the circuit for effecting the operation of relay PD on the second pulse extending from the indirect positive bus over contacts TC–1, GS–4, PS–4, OC–6, SC–8, CC–2, ICC–2, C2–1, C1–2, and the winding of relay PD to the negative bus, and the circuit for effecting the operation on the fourth pulse extending from the indirect positive bus over contacts TC–1, GS–2, PS–2, OC–7, IOC–2, ICC–3, C4–1, C3–2, and the winding of relay PD to the negative bus. Relay CS (FIG. 17) reoperates at the end of the transmission of the incremental code to terminate sending, the path for relay CS extending over contacts TC–4, c5–9, and co–10.

At the Controlled Station, the receipt of the incremental close code 2–4 results in the operation of register relays r2 and r4 (FIG. 28) which operate relay inc (FIG. 28). Relay inc in turn operates incremental close code relay icc (FIG. 23) (with register relays r2 and r4 operated) over the path which extends from the indirect positive bus (FIG. 22) over contacts r1–2, r2–3, r3–4, r4–3, into FIG. 23, contacts inc–3, ioc–2, and the winding of relay icc to the negative bus. Relay icc (FIG. 26) operates the interposing close relay or magnet over the path which extends from the direct positive bus over contacts os–1, icc–4, and the winding of the close coil to the negative bus. The length of time that the close magnet on point 12 is held energized is determined by the increment adjustment control rheostat and the timed increment auxiliary relay tia (FIG. 30).

More specifically, relay icc operates relay cta (FIG. 23) over the path which extends from the indirect positive bus over contacts icc–3, inc–4, sc–1, ct–2, and the winding of relay cta to the negative bus.

Relay cta at its contacts cta–1 operates relay ct. Relay ct operates and locks over contacts ct–1, sc–1, inc–4, and icc–3 to the indirect positive bus, and at its contacts ct–2, opens the circuit of slow to release relay cta, and at its contacts ct–4 operates timed increment auxiliary relay tia (FIG. 30) over the path which extends from the indirect positive bus over contacts pd–6, ps–7, icc–8, ct–4, and the winding of relay tia to the negative bus.

Relay *tia* holds relay *icc* (FIG. 23) over the path which extends from the negative bus over the winding of relay *icc*, contacts *icc–2*, conductor *b* to FIG. 26, and contacts *tia–1* to the indirect positive bus. Relay *cta* (FIG. 23) goes through its slow release period and opens the circuits of register relays *r2* and *r4* and also relays *sf* and *cs*, which restore. The transmitting control relay TC, however, is prevented from operating at this time because of open contacts *icc–9* (FIG. 30).

With relays *r2*, *r4*, and *sf* released the circuit of relay *inc* is opened, and relay *inc* releases, and at contacts *inc–4* (FIG. 23) effects the release of relay *ct*. Relay *ct* at its contacts *ct–4* (FIG. 30) effects the opening of the original energizing circuit of relay *tia* which is held operated by circulating current for a period of time determined by the value of resistances *rr1*, *rr12*, *rr13* and the setting of the rheostat. Relay *tia* subsequently releases, and at contacts *tia–1* opens the holding circuit of relay *icc*, and relay *icc* releases. The release of relay *icc* effects the opening of contacts *icc–4* (FIG. 26) to release the interposing close coil (FIG. 26) on point 12. The release of relay *icc* also effects the closure of contacts *icc–9* (FIG. 30) to operate the transmitting control relay *tc* (FIG. 30) to institute sending of a code indicating the present position of the valve.

The valve has been operated from the open position in the direction of the closed position an amount related to the time that the interposing relay was held operated, and will therefore be indicated as being in the mid-position which means any position between the extreme open and closed positions. Therefore the Controlled Station sends a mid-position indication code 1–2, resulting in the operation of register relays R1 and R2.

In that the last remembered position of the valve by the Control Station was in the closed position, relay CI will be found operated and a circuit must therefore obtain for the indication disagreement relay ID, such circuit extending over the path from the indirect positive bus (FIG. 12) over contacts R1–1, R2–1, INC–1, CI–3, OI–4, and the winding of relay ID to the negative bus.

Relay ID operates relays IC12 and IO12, the path for operating relay IC12 extending from the direct positive bus over the winding of relay IC12, contacts P12–4, ID–4, R2–7 and resistor RR6 to the negative bus, and the path for operating relay IO12 extending from the direct positive bus over the winding of relay IO12, contacts P12–5, ID–3, R1–3, and resistor RR5 to the negative bus. In that an agreement now exists, relay IA (FIG. 12) is operated over the path which extends from the indirect positive bus, over contacts R1–1, R2–1, INC–1, CI–3, OI–3, and the winding of relay IA to the negative bus. Relay IA operates and releases relays R1, R2, SF, and the code stop relay CS. Code stop relay CS at its contacts CS–4 (FIG. 19) reoperates relay TC to initiate transmission of the mid-position indication check code 1–3.

Recalling that relays ICC, OC, and CA (FIG. 10) are operated, circuits are completed for relay PD (FIG. 11) to operate on the first and third pulses, the circuit on the first pulse extending over the path from the indirect positive bus over contacts GS–4, PS–4, OC–5, CI–2, OI–2, C1–1, C0–2, and the winding of relay PD to the negative bus, and on the third pulse extending from the indirect positive bus over contacts GS–2, PS–2, OC–4, C3–1, C2–2, and the winding of relay PD to the negative bus.

It is noted for general reference purposes that break contacts OC–4 provide for a long pause in space 3 for all indication check codes, and the circuit through break contacts OC–5, and break contacts CI–1 provide for a long pause in space 2 with relay CI non-operated on an open condition. The circuit through break contacts OC–5, make contacts CI–2 with relay CI operated for a closed condition, and break contacts OI–1 provide for a long pause in space 4, and the circuit through break contacts OC–5, make contacts CI–2, and make contacts OI–2 provide for a long pause in space 1 on a mid-position condition.

Returning to the assumed set of conditions, and referring to FIG. 17, as the Control Station sends the mid-position indication check code 1–3, and during the mark portion of the fifth pulse when the closure of contacts C5–9 would operate relay RSA on non-incremental codes, the fact that both of relays CI and OI are operated with the valve in the mid-position holds the circuit of relay RSA open at both of contacts CI–9 and OI–9 to prevent the operation of relay RSA. On the sixth impulse relay PD operates to prepare for the long intercode pause, and relay CS operates as usual to stop sending and locks through contacts CS–2, GF–5, OC–8, IA–3 to the indirect positive bus. It should be noted that whereas relay IA released, relay IFA remained locked to hold contacts IFA–2 open. When relay PD releases at the end of the code, contacts RSA–2 prevent the operation of reset relay RS (FIG. 19), and the Control Station waits for the receipt of a return code.

At the Controlled Station register relays *r1* and *r3* operate as a result of receipt of the mid-position check code. When relay *inc* operates, with relays *r1* and *r3* operated, indication check code relay *ikc* is operated over the path which extends from the indirect positive bus (FIG. 22) over contacts *r1–1*, *r2–2*, *r3–1*, into FIG. 23, contacts *inc–5*, *oi–4*, and the winding of relay *ikc* to the negative bus, the operating potential being extended over diode *dd1* in the forward direction, over conductor *c* to FIG. 25, through contacts *i12–1*, the winding of relay *s12*, and contacts *i12–4* to the negative bus, reoperating relay *s12* which locks. Relay *ikc* operates and at its contacts *ikc–1* (FIG. 28) releases relays *sf*, *r1*, *r3*, and *og2* in preparation for another control code if the equipment does not reset. With the register relays released, relays *inc* and *ikc* are deenergized, relay *inc* releasing immediately and relay *ikc* going through its slow release.

The attendant may now operate the close key, the open key, the incremental open key, the incremental close key (FIG. 10), or the reset key, and the equipment will respond accordingly.

It is apparent for exemplary purposes that the attendant again momentarily depresses the incremental close key, and relays ICC, OC, and CA operate in response thereto.

When relay OC operates, the opening of contacts OC–8 (FIG. 17) releases relay CS. The closure of contacts CS–4 (FIG. 19) operates relay TC, and the Control Station again transmits the incremental close code 2–4 with the system responding as before. The valve is advanced in the closing direction through a movement which is determined by relay *tia* and its associated local circuit (FIG. 30) as described before.

Such actuation of the valve may be repeated until the valve reaches its extreme closed position, at which time contacts *a12–2* (FIG. 26) open. With the left winding of relay *i12* (FIG. 26) energized, and the right winding of relay *i12* (FIG. 26) non-energized, the armature of relay *i12* assumes its operated position to open contacts *i12–5* (FIG. 26) and release relay *oi* (FIG. 26). With relay *ci* operated and relay *oi* released, the closed position of the valve is marked in the system. The operation of relay *i12* (FIG. 26) releases relay *s12* (FIG. 25), and the Controlled Station returns a closed indication code 2–5.

The Control Station registers a disagreement, and with relay ID operating, changes the indication thereat, and then registers an agreement by operating relay IA and initiating the transmission of the close indication check code 3–4. On the make period of the fifth pulse, with contacts CI–9 closed as a result of receipt of the closed indication code, relay RSA operates to prepare for reset. At the end of receipt of the closed indication check code by the Controlled Station, relays *s12* and *ikc* (FIG. 23) operate. When relay PD releases at the Control Station at the end of the indication check code, reset relay RS operates through contacts RSA–2, resetting Control and Controlled Stations.

It should be observed that if a disagreement obtains because of the receipt of an indication check code which disagrees with the position of the controlled device which the Controlled Station remembers (as for example because of a device having automatically changed since the last reported condition) the *s*— relay on the particular point involved will be released in turn operating the associated relay *og*—, and after the Control Station resets itself and the Controlled Station, the Controlled Station will report to the Control Station as already described. Relay *s*— has operated relay *og*—, which will operate relay *os* when relay is released on reset.

Also, if no indication check code and no reset signal is received, the *s*— relay remains released to operate the associated *og*— relay; and the following contacts (FIG. 30) for the automatic reset relay *ar* will be found open: *ss*–3, *ds*–3, *gc*–12, *pc*–12, *is*–7, *cs*–3, *icc*–7, and *ioc*–7.

After an interval as determined by its slow to release characteristic, relay *ar* releases, and at its contacts *ar*–1 (FIG. 29) operates reset relay *rs*, which locks over contacts *rs*–2 to the indirect positive bus. Relay *rs* at its contacts *rs*–4 operates relay *tc* (FIG. 30). Relay *tr* at its contacts *tr*–4 and *tr*–5 operates line relays *ln* and LN, which open the circuits of relays *rl* and RL respectively, which release slowly removing positive potential from the indirect positive buses at Control and Controlled Stations.

The removal of positive potential from the indirect positive bus at the Controlled Station opens the operating and holding circuits of relay *rs* which goes through its slow release. The release of relay *rs* effects the opening of contacts *rs*–4 (FIG. 30) releasing relay *tr* which goes through its slow release and in turn releases relays *ln* and LN. The release of relays *ln* and LN reoperates relays *rl* and RL re-establishing positive potential on the indirect positive buses. The closure of contacts *pc*–12 and *is*–7 (FIG. 30) upon reset reoperates relay *ar*.

With relay *s12* released and relay *og2* operated when relay *is* releases on reset, a circuit is completed to operate the outgoing start relay *os* (FIG. 29) to initiate the transmission of a report code for point 12.

Station Check

Station Check is accomplished by selecting the first point in a given station and sending a station check code 4–5 which is different than any other control code.

If the attendant at the Control Station (FIG. 1) wishes to check the position of the devices at all points (i.e. 1– 26), in station #1 (FIG. 1) he momentarily depresses the "Check 1" Key (FIG. 2A). If he wishes to check the position of the devices at all points (i.e. 27–40; 51–60) in station #2 (FIG. 1), he momentarily depresses the "Check 2" Key (FIG. 2A). Also, if he wishes to check the position of the devices at all points (i.e. 41–50; 61–80) in station #3 (FIG. 1), he momentarily depresses the "Check 3" Key (FIG. 2A). After any depression of a key, the points at the particular Controlled Station report in to the Control Station, one after the other.

More specifically, suppose the attendant momentarily depresses the "Check 1" key, and thereby effects the momentary closure of three sets of switch contacts each labeled Station 1 Check Key in FIGS. 8 and 9.

In FIG. 8 the uppermost contacts operate the station check relay SC over a path which extends from the indirect positive bus over contacts OS–2, Station 1 Check Key contacts, the winding of relay SC to the negative bus. Relay SC operates and locks through its contacts SC–4 independent of relay OS to the indirect positive bus. The lower contacts operate group selection relays GS1 and GS2 in series over the path which extends from the indirect positive bus over contacts RL–1, OS–2, the second winding of relay GS1, Station 1 Check Key contacts, the first winding of relay GS2, to the negative bus. Relays GS1 and GS2 at their contacts GS1–1 and GS2–1 respectively prepare to lock themselves over resistor RR1, and contacts OS–1 to the indirect positive bus.

Station 1 Check Key (FIG. 9) contacts operate relays PS1 and PS2 in series over the path which extends from the indirect positive bus, over contacts OS–3, the second winding of relay PS1, Station 1 Check Key contacts, the first winding of relay PS–2 to the negative bus. At their contacts PS1–1 and PS2–1, Relays PS1 and PS2 prepare to lock themselves over resistor RR1 and contacts OS1 to the indirect positive bus.

Group selection relays GS1 and GS2 operate and prepare to transmit group selection code 1–2 to select the first group of points in station #1. Point selection relays PS1 and PS2 prepare to transmit point selection code 1–2 to select the first point in the selected group in station #1.

Digressing briefly, to examine the general pattern, if the Station 2 Check Key had been momentarily operated, relays GS1 and GS4 would have been operated to select the third group; and relays PS2 and PS5 would have been operated to select the seventh point in the group (i.e. point 27) which is the first point in Controlled Station #2. In a like manner, if the Station #3 Check Key had been momentarily depressed, relays GS2 and GS3 would have been operated to select the fifth group; and relays PS1 and PS2 would have been operated to select the first point in the selected group (i.e. point 41) which is the first point in Controlled Station #3. It is apparent that for station checking, any point in a Controlled Station could be assigned, but for simplicity of the example the first has been assigned in each instance.

Relays GS1 and GS2 (FIG. 18) operate and at contacts GS1–4 and GS2–5 operate the outgoing start relay OS which operates and locks through its contacts OS6. Contacts OS–1 on relay OS close before contacts OS–2 and contacts OS–3 (FIG. 9) open, to hold relays GS1, GS2, PS1, and PS2 while opening the original energizing circuit of these relays. Thereupon, with relays GS1, GS2, PS1 and PS2 operated as a result of operating the Station 1 Check Key (which is the same pattern as was effected by operating the Selection Key for point 1) and with outgoing start relay OS operated, the relays of the Control Station and of the Controlled Station #1 function in sequence as before described to select point 1 and return and register the indication therefor.

When indication finished relay IF operates at the end of the indication code, it releases relays SF and the operated register relays and lights the white selection lamp on point 1 as usual, and additionally closes a circuit to operate relay OC (FIG. 10) over the station check relay contacts SC–7, the circuit extending from indirect positive bus over contacts OS–4, IF1, CA–1, IFA–1, SC–7, and the winding of relay OC to the negative bus. Relay OC operates relay CA and locks. The release of relay SF and the register relays effects the release of relays INC and IA, and the release of relay IA operates relay IFA which opens the original energizing circuit of relay OC which remains locked. The operation of relay OC effects the opening of contacts OC–8 (FIG. 17), releasing the code stop relay CS, and the release of relay CS closes contacts CS–4 (FIG. 17) operating the transmitting control relay TC.

Thereupon the Control Station sends the control code comprising the station check code 4–5, the contacts of the station check relay SC in the right portion of FIG. 11 operating relay PD on the fourth and fifth pulses, the circuit for operating relay PD on the mark period of the fourth pulse extending from the indirect positive bus over contacts TC–1, GS–5, PS–4, OC–6, SC–9, C4–1, C3–2, and the winding of relay PD to the negative bus, and the circuit for operating relay PD on the mark period of the fifth pulse extending from the indirect positive bus over contacts TC-1, GS-2, PS-2, OC-7, ICC-2, ICC-4, C5-2, C4-2, and the winding of relay PD to the negative bus.

With reference to the contacts which appear at the right of FIG. 11, as all regular control codes (not incremental) end in 5, and relay OC is always operated for a control code the circuit through contacts OC-7, IOC-2, and ICC-4 provide a "5" on any non-incremental control code. As incremental control codes end in 4, contacts IOC-2 of relay IOC open the path to the "5" bus and contacts IOC-1 close the path of the "4" bus. The contacts of relay ICC are arranged in a similar manner.

As a result of receipt of the control code comprising the station check code 4-5 at Controlled Station #1, register relays r4 and r5 will be operated. At the end of the mark period of the sixth pulse, relay ln releases, in turn operating relay c5 and opening the circuit of relay ss which goes through its slow release. When relay ss has released, relay inc (FIG. 28) operates over the path which extends from the indirect positive bus over contacts ss-2, sf-3, co-3, r1-4, r2-6, r3-7, r4-8, r5-6, gf-3, pf-2, and the winding of relay inc to the negative bus. When relay inc operates with register relays r4 and r5 operated, a circuit is completed to operate station check relay sc over the path which extends from the indirect positive bus through contacts r1-2, r2-4, r3-6, r4-7, r5-4, into FIG. 21, contacts inc-1, and the winding of relay sc to the negative bus.

Relay sc at its contacts sc-3 (FIG. 25) releases all of the "s" relays of the various points such as s1, s2, s12, to s26, and the release of these relays prepares for the operation of the associated group relays og1, og2, and og3.

Relay sc at its contacts sc-5 operates relay plo over the path which extends from the indirect positive bus over contacts sc-5, and the winding of relay plo to the negative bus. Relay plo operates and locks over the path which extends from the indirect positive bus over contacts cs-2, plo-1 and the winding of relay plo to the negative bus (when the code stop relay cs releases shortly before contacts sc-5 open). Relay plo at its contacts plo-2, holds open the circuit through contacts og1-3, and og3-3 to relay rs so that the subsequent operation of these relays does not effect the operation of relay rs at this time, to thus avoid reset at this time, and allow the regular sequence of operation to continue. In this manner, the position of the device on point 1 may be reported and will not have to be reported against when the various points report in during station check.

Relay sc at its contacts sc-2 (FIG. 23) operates code start auxiliary relay cta over the path which extends from the indirect positive bus, over contacts sc-2, ct-2, and the winding of relay cta to the negative bus. Relay cta closes its contacts cta-1, operating relay ct which locks over contacts ct-1, sc-2 to the indirect positive bus, and relay ct opens its contacts ct-2 which opens the circuit of relay cta which goes through its slow release period. Relay cta releases to open its contacts cta-2 (FIG. 28), and release register relays r4 and r5, and relays sf and cs. The release of relays r4, r5, and sf effects the release of relay inc which releases relay sc which releases relay ct. Relay sc in releasing closes its contacts sc-3 (FIG. 25), and the outgoing group relays og1, og2, and og3 (FIG. 25) operate. The release of relay cs closes a circuit to operate relay tc. Relay tc operates relay dsa which operates relay ds. Relay tc also initiates the sending of the indication code.

Assuming that no automatic change of device has occurred on point 1, the same indication code which was sent after point selection is repeated. Such code transmission is provided by reason of the fact that point 1 selection relay p1 is operated, and relay ci is positioned through make contacts of relay p1 according to the position of the device on point 1. The position of relay ci determines the circuit of relay pd to effect the insertion of the long pauses at the proper spaces of the code. When relay cs operates at the end of this code, relay plo releases. As a result of receipt of this indication code, the Control Station returns the indication check code followed by the reset signal.

As the indication check code agrees with the indication sent relay ikc (FIG. 23) is operated following the receipt of the indication check code, and operating potential of relay ikc is extended over diode dd1 and conductor c to FIG. 25 over contacts of relay i1 and the winding of relay s1 and other contacts of i1 to the negative bus to reoperate relay s1 which locks.

As reset is completed, the code stop relay cs and the incoming start relay is released. With any one of contacts og1-3, og2-3, or og3-3 (FIG. 29) operated, a circuit is completed to operate the outgoing start relay os when relays dsa and ds have finally released.

If the attendant at the Control Station wishes to interrupt the check for the purpose of performing a control operation, the slow release of relays dsa and ds hold the operating circuit of outgoing start relay os (FIG. 29) open at contacts ds-1 so that the operation of the line relay c1 and relay ss which effect the operation of incoming start relay is, can prevent the operation of outgoing start relay os at contacts is-4, whereby the Control Station takes preference.

With relay cs released and relay os operated, a circuit is completed to operate the transmitting control relay tc which initiates the automatic reporting from the Controlled Station #1 as to the position of the device on point 2, the report being effected as though a device had automatically changed position on point 2 in a manner apparent from the previous description.

More specifically, referring to FIGS. 20 and 21 the following contacts will be in the position shown.

| | |
|---|---|
| og 1-1—closed | s1-1—closed |
| og 1-2—closed | s1-2—open |
| og 1-4—open | s1-3—open |
| og 1-5—open | s1-4—closed |
| og 2-1—closed | s2-1—open |
| og 2-2—closed | s2-2—closed |
| og 2-4—open | s2-3—closed |
| og 2-5—open | s2-4—open |
| og 3-1—closed | |
| og 3-2—closed | |
| og 3-4—open | |
| og 3-5—open | |

Relays s3-s26 same pattern as s2

*Reporting from Point 2*

In reporting from point 2, circuits obtain to operate relay pd on the first and second pulses of the group selection code, relay pd operating the first pulse over the path which extends from the indirect positive bus over contacts tc-1, gs-1, og1-1, c1-1, co-2, and the winding the relay pd to the negative bus, and operating the second pulse over the path which extends from the indirect bus over contact tc-1, gs-3, og1-2, c2-1, c1-2, and the winding of relay pd to the negative bus.

Circuits obtain to operate relay pd on the first and third pulses of the point selection code, relay pd operating over the path which extends from the indirect positive bus over contacts tc-1, gs-2, ps-1, g1a-1, s1-1, s2-2, c1-1, co-2, and the winding of relay pd to the negative bus, and on the third pulse over the path which extends from the indirect positive bus over contacts tc-1, gs-4 ps-2, g1a-2, s1-4, s2-3, c3-1, c2-2, and the winding of relay pd to the negative bus.

On the receipt of the indication check code by the Controlled Station, relay s2 is operated and locked. As one or more of relays og1, og2, and og3 are found operated when reset has been completed, it can be seen that a start circuit to the outgoing start relay os (FIG. 29) is repeatedly completed until all points report in.

Reporting from Point 3

In reporting from point 3, relay *pd* will be operated over the circuits described for the group selection code. As relays *s1* and *s2* are operated, circuits obtain for operating relay *pd* on the first and fourth points selection pulses, the relay *pd* operates on the first pulse over the circuit which extends over contacts *s1–1, s2–1, s3–2, c1–1, co–2*, etc., and on the fourth pulse over the circuit which extends over contacts *s1–4, s2–4, s3–3, c4–1, c3–2*, etc.

Reporting from Remaining Points

This same sequence is followed by the equipment in reporting the indications for points 4–10. When the last relay in the group *s1–s10* is operated, relay *og1* releases. As shown in FIG. 4, point 11 has no *s—* relay. However, in FIG. 20 *s—* relay contacts are shown which would obtain if there were an *s—* relay on point 11. If there actually is no *s—* relay on point 11, the circuits through contacts *s11–2* and *s11–3* would be eliminated; and the circuits through contacts *s11–1* and *s11–4* would be direct.

Assuming there is a device to be reported on point 11, an *s—* relay is equipped, and circuits would obtain to operate relay *pd* on the first and third group selection pulses; the circuit on the first pulse extending over contacts *og1–4, og2–1, c1–1, co–2*, etc., the circuit on the third pulse extending over contacts *og1–5, og2–2, c3–1, c2–2*, etc.

Circuits would also obtain to operate relay *pd* on the first and second point selection pulses, the circuit on the first pulse extending over contacts *tc–1, gs–2, ps–1, g2a–1, s11–2, c1–1, co–2*, etc., and the circuits on the second pulse extending over contacts *tc–1, gs–4, ps–2, g2a–2, s11–3, c2–1, c1–2*, etc.

Such pattern and sequence continues until all points have reported in. At the end of the reporting of each point, the slow release of relays *dsa* and *ds* hold the circuit of relay *os* open, giving the Control Station a chance to interrupt and take preference by operating relay *is* to hold the circuit of relay *os* open.

Miscellaneous—Point Hold After Control

If it is desired to hold a point after a control has been performed thereat, the attendant keeps his finger on the control button until the equipment comes to rest. Thereupon he can release the particular control button, and the point will be held selected. At such time he can depress the same or another control button to perform the same or another control on the device at the selected point without experiencing reset.

In more detail, if the attendant holds his finger on the control key such as the close control key (FIG. 10), relay CA (FIG. 10), which normally releases toward the end of the control code, is held operated over the path which extends from the indirect positive bus over contacts OS–4, IF–1, CA–2, make contacts of the Close Key, and the winding of relay CA to the negative bus, break contacts CA–1 allowing the other relays of FIG. 10 to release as usual.

With relay CA held operated, contacts CA–3 (FIG. 13) are held open so that relay RSA cannot be operated by relay C5 on the fifth pulse of the indication check code. It should be appreciated that relay RSA normally operates on this fifth pulse to prepare for reset. With relay RSA non-operated, contacts RSA–2 (FIG. 19) remain open so that the release of relay PD at the end of the long pause following the mark period of the sixth pulse cannot effect the operation of the reset relay RS.

With relay RS non-operated, no reset signal is placed on the line, and relays IF, GS, GF, PS, PF, OS, CS, CI—CO, IFA, GS1, GS2, PS1, PS2, G1, and P1 are held operated, and the white selection lamp on point 1 is maintained lighted. The equipment is thus in the same position as it is following group selection, point selection and indication, i.e., waiting for a control code.

Miscellaneous—Substation Preference

After the Control Station initiates the selection of a point at a Controlled Station, and an automatic change of indication occurs before the Control Station sends the Control Code, the Controlled Station resets the system, and reports the automatic change, thus taking preference.

More specifically, with one of the *s—* relays (FIG. 25) released due to an automatic change, one of the relays *og1, og2, og3* will be operated through a break contact of the released *s—* relay. Accordingly one of the contacts *og1–3, og2–3, og3–3* (FIG. 29) will be closed, and a circuit to operate the reset relay *rs* will obtain over the path which extends from the indirect positive bus over one of the *og* contacts, contacts *icc–6, ioc–6, inc–10, ds–1, is–6, gf–4, plo–2*, and the winding of the reset relay *rs* to the negative bus. Relay *rs* operates and locks over its contacts *rs–2*, effecting reset of the system.

When relays *is* and *ds* have released, a circuit is completed to operate the outgoing start relay *os* to initiate the reporting from the Controlled Station; the circuit extending from indirect positive bus, over contacts *og1–3, og2–3*, or *og3–3*, contacts *icc–6, ioc–6, inc–10, ds–1, is–4*, and the winding of relay *os* to the negative bus. The pattern of contacts on FIG. 20 established by the released *s—* relay and the operated *og—* relay determines the selection codes sent. The pattern of contacts at the right of FIG. 21 which is controlled by the changed position of the device determines the indication code sent.

Miscellaneous—Substation Preference Lockout
(*Relay plo FIG. 29*)

If the Control Station has sent a control code which has been received by the Controlled Station, preference lockout relay *plo* (FIG. 29) will be operated to prevent the reset of the system, whereby the Control Station can complete its control operation even though an automatic operation occurs.

More specifically, after the control code has been received by the Controlled Station, relay *inc* (FIG. 28) operates momentarily, closing its contacts *inc–11* (FIG. 29). When one or more of the relays *og1, og2*, or *og3* operate thereafter as a result of a control operation, or as a result of an automatic change, a circuit is completed from the indirect positive bus over one or more of the contacts *og1–3, og2–3, og3–3*, contacts *icc–6, ioc–6, inc–11*, and the winding of relay *plo* to the negative bus, operating relay *plo*. In the case of incremental codes, contacts *icc–5* or *ioc–5* operate in parallel with contacts *inc–11* before contacts *inc–11* open. Relay *plo* locks through contacts *plo–1* and *cs–2* when relay *cs* releases before contacts *inc–11* open, and relay *plo* also locks immediately through contacts *plo–3* and one or more of the contacts *og1–3, og2–3*, and *og3–3*.

Relay *plo* at its contacts *plo–2* prevents the operation of reset relay *rs* when contacts *icc–6, ioc–6, inc–10*, and *ds–1* are all in the released position, thus allowing the control sequence to be completed. With at least one of the contacts *og1–3, og2–3, og3–3* closed when reset occurs, a circuit is immediately closed to operate outgoing start relay *os* to initiate reporting of the change which occurred.

Miscellaneous—Station Lockout (*Relay slo FIG. 27*)—
Condition–1

In multi-station operation, when the Control Station sends a group code, all Controlled Stations receive the code and if a particular station contains the group identified by the code of the corresponding relays *g—* and *g—a* operates as a result thereof. If a particular station does not contain this group, station lockout relay *slo* (FIG. 27) operates instead.

More specifically, let us suppose that the attendant at the Control Station momentarily depresses the selection key for point 31 which is in Controlled Station #2 and which is the first point in the fourth group. Controlled Stations #1, #2, and #3 all respond to the group selection code 1–5 for group 4. In Controlled Station #2 relay g4 would operate, and in Controlled Stations #1 and #3, relay *slo* would operate instead. The functioning in Controlled Station #1 (which is illustrative also of the functioning in Controlled Station #3) will be considered first.

At Controlled Station #1 when relay *ss* releases at the end of the group code, relay *gc* (FIG. 28) operates over the path which extends from the indirect positive bus over contacts *ss*–2, *sf*–3, *co*–8, *r1*–5, *r2*–8, *r3*–9, *r4*–10, *r5*–7, *gf*–2, and the winding of relay *gc* to the negative bus.

Thereupon, instead of operating relays g4 and g4a (which occurs in Controlled Station #2), a circuit is completed in Controlled Station #1 to operate station lockout relay *slo* over the path which extends from the indirect positive bus (FIG. 22), over contacts *r1*–1, *r2*–2, *r3*–2, *r4*–2, *r5*–1, contacts *gc*–5, conductor *a* to FIG. 27, and the winding of relay *slo* to the negative bus. Relay *slo* locks over contacts *slo*–1 and *r1*–1 to the direct positive bus.

Relay *slo* at its contacts *slo*–3 (FIG. 27) holds the circuit to the counting chain open so that the counting chain cannot respond to further pulsing on the line, and at its contacts *slo*–6 and *slo*–7 (FIG. 30) holds the metering circuit open.

Station #1 remains in this position until the reset signal appears on the channel, at which time it is reset.

*Condition–2*

Let us suppose instead that the attendant at the Control Station momentarily depresses the selection key for point 27 which is the seventh point in the third group and is located at station #2. As a result of the transmission by the Control Station of group code 1–4 for the third group, relays g3 and g3a will be operated in Controlled Station #2. As points 21–26 are part of the third group and are in Controlled Station #1, relays g3 and g3a in Controlled Station #1 will also be operated.

The path in both Controlled Stations #1 and #2 extend from the indirect positive bus over contacts *r1*–1 (FIG. 24), *r2*–2, *r3*–2, *r4*–1, *gc*–4, and the winding of relays g3 and g3a to the negative bus. In Controlled Station #3, however, relay *slo* is operated over the path which extends from the negative bus over contacts *r1*–1, *r2*–2, *r3*–2, *r4*–1, *gc*–4 to conductor *a* instead of relays g3 and g3a, to FIG. 24, and the winding of relay *slo* to the negative bus. Relay *slo* operates to lock Controlled Station #3 out in the manner previously described.

As the Control Station sends the point selection code 2–5 for point 7, Controlled Station #3 counting chain does not respond but Controlled Stations #1 and #2 both respond. Point selection relay *p27* in Controlled Station #2 would operate over the path (using the schematics of Controlled Stations #1 for reference) from the indirect positive bus over contacts *r1*–2, *r2*–3, *r3*–4, *r4*–4, *r5*–2, through FIGS. 22 and 23 into FIG. 24, contacts *g3a*–4, through the winding of relay *p27* to the negative bus. In Controlled Station #1, point 27 is not equipped, and the circuit just traced through contacts *g3a*–4 extends to conductor *g* and thence into FIG. 27 and over the winding of relay *slo* to the negative bus. Relay *slo* operates and locks out Controlled Station #1.

When the Control Station sends the reset signal at the end of signal transmission between the Control Station and Controlled Station #2, relay *ln* operates in all three Controlled Stations, releasing relay *rl*, and effecting reset of each. When relay *rl* releases in Controlled Stations #1 and #3, relay *slo* releases.

Thus, in selecting a point at Station #2 in a group common to Stations #1 and #3, Controlled Station #3 is locked out on the group selection code, and Controlled Station #1 is locked out on the Point Selection Code.

*Condition–3*

If any Controlled Station is trying to send a long space when another station (Control or Controlled) is trying to send a mark, the station trying to send the long space will be locked out.

Assume, for example, that Controlled Stations #1 and #2 both try to report to the Control Station simultaneously; Controlled Station #1 trying to report an automatic change at point 1 (which is a point in group 1); and Controlled Station #2 trying to report an automatic change at point 27 (which is a point in group 3). Controlled Station #1 tries to send group code 1–2 whereas Controlled Station #2 tries to send group code 1–4. As more than one station tries to send codes, the common parallel line arrangement insures that all line relays *LN* and *ln* operate in synchronism.

Referring to FIG. 32 which illustrates the basic codes in the system, it is assumed that both Controlled Stations in the system, transmit the first mark, the first long space and the second mark at the same time. Thereafter Controlled Station #1 tries to transmit the long space whereas Controlled Station #2 tries to send the second short space followed by the third mark.

Referring now to FIG. 27, in Controlled Station #1, contacts *pd*–2 will be closed as a result of trying to send the second long space, and contacts *ln*–1 will be closed as a result of the line relay *ln* being operated by the third mark transmitted by Controlled Station #2. Accordingly, station lockout relay *slo* will become operated over the path from the direct positive bus through contacts *ln*–1, *r1*–2, *inc*–9, *tc*–2, *pd*–2, and the winding of relay *slo* to the negative bus. Relay *slo* operates and locks over contacts *slo*–1 and *r1*–1 to the direct positive bus, and at its contacts *slo*–2, disconnects positive potential from the indirect positive bus (contacts *is*–2 being open with Station #1 in the initiating condition) whereupon all relays in Controlled Station #1 which are holding to the indirect positive bus are released; at its contacts *slo*–3 (FIG. 27) prevents the counting chain from responding to further line signals, at its contacts *slo*–5, operates relay *dsa* which operates relay *ds*; at its contacts *slo*–4 prepares a circuit to reset relay *rs*, which circuit is held open at contacts *ds*–1; and at its contacts *slo*–6 and *slo*–7 (FIG. 30), *slo* holds the metering circuit open.

When the Control Station resets the system at the conclusion of the Controlled Station #2 reporting, the extended operation of relay *ln* releases relay *rl* which releases relay *slo*. Relay *slo* at its contacts *slo*–5 (FIG. 29) opens the circuit of slow release relay *dsa* which releases after an interval, opening the circuit of relay *ds* which releases after another interval. Thereupon with relay *og1* still operated, the circuit of outgoing start relay *os* is completed to reinitiate the reporting from Controlled Station #1.

As a further example, assume there were ten different Controlled Stations, the first containing group 1, the second group 2, etc.; and that all tried to report to the Control Station simultaneously. It can be seen with reference to FIG. 32 that Controlled Stations 1, 2, 3, and 4 would be locked out on the long space of the first pulse; Controlled Stations 5, 6, and 7 would be locked out on the long space of the second pulse; Controlled Stations 8 and 9 would be locked out on the long space of the third pulse; and that Controlled Station #10 would effect its reporting. Upon reset by the Control Station, the other Controlled Stations would again attempt to report.

*Repeat Lockout*

The system is so arranged that if a Controlled Substation tries twice to report a change, and does not receive an answer back over the line, the substation will lock out to prevent pumping action.

More specifically, assume that the circuit breaker on point 1 of Controlled Station #1 has automatically tripped and that Controlled Station #1 has sent the group code, the point code, and the open indication code as is apparent from the previous description.

Referring to automatic reset relay *ar* (FIG. 30), when the Controlled Station #1 initiated reporting, contacts *os–4* opened out before slow to release relay *ar* could release, and relay *ds* operated to close its contacts *ds–3* and hold relay *ar*. When relay *ds* releases at the end of the transmission by the Controlled Station #1 of the open indication code, contacts *ds–3* open, and inasmuch as contacts *ss–3* have not been closed as a result of the receipt of a signal over the line, the circuit of relay *ar* is opened and relay *ar* goes through its slow release.

As a result of the release of relay *ar*, reset relay *rs* (FIG. 29) operates over the path which extends from the indirect positive bus over contacts *ar–1* and the winding of relay *rs* to the negative bus. Relay *rs* operates and locks over contacts *rs–2* to the indirect positive bus and operates relay *tr* (FIG. 30). Relay *rs* also operates repeak lockout relay *rlo* (FIG. 29) over the path which extends from the direct positive bus over contacts *rs–1* and the winding of relay *rlo* to the negative bus. Relay *rlo* operates and at its contacts *rlo–2* opens the original circuit of relay *rs*, relay *rs* remaining locked; at its contacts *rlo–3* and *rlo–4* (FIG. 30) completes a parallel circuit with contacts *os–6* and *os–7* respectively of relay *os*, so that continuous metering or line supervision can be in effect even though the circuit becomes locked out.

Relay *tr* operates and at its contacts *tr–4* and *tr–5* applies the reset signal to relay *ln* and the channel. Relay *ln* opens and at its contacts *ln–4* opens the circuit of slow release relay *rl* which releases after an interval, disconnecting positive potential from the indirect positive bus, resetting Controlled Station #1. During reset, relay *rs* releases along with the other relays.

With relays *os*, *pc*, and *is* released, relay *ar* (FIG. 30) operates over the path which extends from the direct positive bus over contacts *co–12*, *os–4*, and the parallel circuit comprising contacts *pc–12*, *is–7*. When relay *ar* releases, contacts *ar–1* (FIG. 29) close, and reset relay *rs* is prevented from reoperating by contacts of locked up relay *rlo–2*, which remains locked after reset. When relay *rs* releases upon reset contacts *rs–4* open (FIG. 30), allowing slow release relay *tr* to release.

The release of relay *tr* releases line relay *ln* which closes its contacts *ln–3* (FIG. 30) and reoperates relay *rl*. The operation of relay *rl* re-establishes positive potential on the indirect positive bus. With relay *og1* still operated to hold its contacts *og1–3* closed, relay *os* reoperates causing Controlled Station #1 to again send the group code, point code, and open indication code. When relay *ds* releases at the end of the open indication, relay *ar* again releases, but because relay *rlo* is operated, the closure of contacts *ar–1* (FIG. 29) does not result in the reoperation of relay *rs*, thus preventing reset and resulting in a stall.

If the line is effective, the attendant will have received a line alarm indication. When the attendant has fixed the line, relay LS at the Control Station will operate over the path closed by contacts *rlo–3* and *rlo–4* (FIG. 30). Relay LS operates relay LSA which locks and extends a circuit through contacts LS1 and LSA to relay LSB, which operates relay LSC. With relay LSD (FIG. 18) having been operated and locked due to the line alarm, a circuit is completed from the direct positive bus (FIG. 19) through contacts LSC–3 and LSD–4 to operate the reset relay RS which locks to the indirect positive bus, initiating reset of the system. When relay RS releases during reset contacts RS–1 open (FIG. 18) releasing relay LSD.

On the reset pulse, contacts *ln–1* (FIG. 27) close, operating relay *ss* (FIG. 27) before contacts *r1–2* open over the path from the direct positive bus, contacts *ln–1*, *r1–2*, *inc–9*, *tc–2* and the winding of relay *ss* to the negative bus. Relay *ss* operates relay *sf* over the path which extends from the indirect positive bus through contacts *co–7*, *ss–1*, *sf–1* and the winding of relay *sf* to the negative bus. Relay *sf* at its contacts *sf–4* releases relay *rlo*.

After reset, the Controlled Station reinitiates the reporting of the automatic opening of the circuit breaker on point 1.

Line Alarm

When line fails, relay LS releases and opens the circuit of relay LSB which releases after an interval as determined by its local RC network. Relay LSB opens the circuit of slow release relay LSC which releases after an interval to operate the Alarm Bell over the path which extends from the direct positive bus over contacts LSC–1, LSD–1, AB–3, and the Alarm Bell to the negative bus. The release of relay LSC also lights the Channel Alarm Lamp over the path which extends from the direct positive bus over contacts LSC–1, LSD–1, FL1–1, and the lamp to negative battery.

Flashing relays FL1, FL2, and FL3 are activated by operation of relay FL1 over the path which extends from the direct positive bus through contacts LSC–1, LSD–1, conductor C to FIG. 15, diode DD3A, contacts FL2–1 and the winding of relay FL1 to the negative bus. As the flashing relays function, contacts Fl1–2 (FIG. 18) flash the Channel Alarm Lamp.

When the attendant momentarily pushes the alarm key, relay LSD (FIG. 18) operates over the path which extends from the direct positive bus over contacts LSC–1, alarm key contacts, and the winding of relay LSD to the negative bus. Relay LSD operates and locks over the path which extends from direct positive bus over contacts RS–1, LSD–3, resistor RR16, and the winding of relay LSD to the negative bus. Relay LSD operates and establishes a holding circuit for the Channel Alarm Lamp over the path which extends from the direct positive bus, through contacts RS–1, LSD–3, LSD–2, FL1–2, and the lamp to the negative bus, and at its contacts LSD–1 opens the circuit to flashing relay FL1 (FIG. 15) whereby the flashing relays are released, and the lamp lights steadily through contacts FL1–2. The opening of contacts LSD–1 also silences the Alarm Bell.

It should be observed that when the relay AB operates due to an Indication Disagreement contacts AB–2 ring the Alarm Bell but contacts AB–3 prevent positive potential from lighting the Channel Alarm Lamp and from reaching flashing relay FL1 via conductor C.

Line Supervision

Referring to FIG. 30, if it is desired to supervise the line without continuous metering, *f*-wiring will be connected; the cycle timer will be disconnected between connections 3 and 4; the 10-inch transmitter and contacts *p2–6* will be disconnected between connections 5 and 1; and the 12-inch transmitter and contacts *p12–7* will be disconnected between connections 6 and 2. At the Control Station, contacts LS–2 and LSA–4 and the Impulse Telemeter Receiver can be eliminated.

The line supervision circuit will then be the same as the continuous metering circuit traced hereinbefore with the *f*-wiring taking the place of the 10-inch or 12-inch pulsing metering contacts, whereby relay LS (FIG. 19) is held continuously operated in the at rest condition of the system, holding relay LSB operated which holds relay LSC operated.

If a line failure occurs, relay LS releases to release relays LSB and LSC to generate a line alarm in the manner previously indicated.

Reset Butt-In

Referring to FIG. 19, it can be seen that if the attendant operates the Reset Key, a circuit will always be completed from the direct positive bus over contacts of the Reset Key and the winding of reset relay RS to the negative bus to operate relay RS. Relay RS at its contacts RS–5

(FIG. 19) operates relay TR. Relay TR at its contacts TR-4 and TR-5 connects positive and negative potential to relay LN and the line, contacts TR-1 and TR-2 holding the metering and line supervision circuits open.

Relay LN at its contacts LN-4 opens the circuit of relay RL which disconnects positive potential from the indirect positive bus resetting the Control Station. Relay ln at its contacts ln-4 at each Controlled Station opens the circuit of relay rl which disconnects positive potential from the indirect positive bus to reset the Controlled Station.

*Two and Only Two Out of Five Check With Sixth Checking Pulse Required*

Referring to the contact fans of the register relays in FIGS. 12, 17, 22, and 28, it can be seen that no selection as the result of any code will be made unless two and only two out of five register relays have been operated as a result of receipt of two and only two long spaces in a code.

Furthermore the circuit through the register relay contacts is completed in series with a make contact of relay C0 or co, so that no selection results unless the counting chain relay C0 or co has operated on the sixth pulse. Thus, six and only six pulses are always required. The selection circuit also passes through break contacts of relay ss and make contacts of relay sf, so that the selection must be made during the selection interval when relay ss releases with relay sf generated following the sixth pulse.

*Miscellaneous*

(1) Referring to FIG. 24, the operation using wiring option "d" has been described. If wiring option "e" is used, relay p1, for example, does not operate relay ps direct, but operates reverse coding relay rc which in turn operates relay ps. Such arrangement is necessary if contacts ai-1 (FIG. 20) are break contacts instead of make contacts, with relay i1 being released with the circuit breaker closed and operated with the circuit breaker open. Also upon point selection, relay cs (FIG. 26) would be released with the circuit breaker closed and relay ci would be operated with the circuit breaker open. In order to adjust the circuits for this situation, relay rc operates and at its contacts (FIG. 21) adjusts the circuits for outgoing codes, and at its contacts (FIG. 23) adjusts the circuits for incoming codes.

With relay rc non-operated, the circuit through ci-2 with relay ci released should result in the same code as results with relay rc operated and relay ci operated, i.e., code 1-5. Accordingly, a circuit obtains through contacts c1-2, rc-4, c1-1, and co-2 to the winding of relay pd; and a circuit also obtains through contacts ci-1, rc-1, c1-1, and co-2 to the winding of relay pd for the first long pause. As the second long pause always occurs on the fifth pulse through contacts oi-2, no discrimination need be made.

(2) The circuit through contacts OS-9 and IF-6 (FIG. 19) allows relay TC to be operated to send an indication check code on an automatic reporting. On a control operation originated from the Control Station, contacts IF-6 prevent sending until the control button is depressed.

(3) Contacts slo-4 (FIG. 29) enable a locked-out station (locked out under condition 1 or 2 above) to operate relay rs to reset the system, and start reporting a change which occurs during lockout. Relay rs operates over the path which extends from the indirect positive bus through contacts og1-3, og2-3, or og3-3, contacts icc-6, ioc-6, inc-10, ds-1, is-6, plo-2, and the winding rs to the negative bus. After reset, relay os operates to initiate the reporting over the path which extends from the indirect positive bus, through contacts og1-3, og2-3, or og3-3, contacts icc-6, ioc-6, inc-10, ds-1, is-4, and the winding of relay os to the negative bus.

(4) It should be recalled that the operation of a point selection key operates two out of five of the relays GS1, GS2, GS3, GS4, and GS5 (FIG. 8). These relays operate in pairs as follows:

| Group | Code | Relays |
| --- | --- | --- |
| 1 | 1-2 | GS1-GS2 |
| 2 | 1-3 | GS1-GS3 |
| 3 | 1-4 | GS1-GS4 |
| 4 | 1-5 | GS1-GS5 |
| 5 | 2-3 | GS2-GS3 |
| 6 | 2-4 | GS2-GS4 |
| 7 | 2-5 | GS2-GS5 |
| 8 | 3-4 | GS3-GS4 |
| 9 | 3-5 | GS3-GS5 |
| 10 | 2-5 | GS4-GS5 |

Whenever two of these relays operate, the lower numbered relay should operate relay PD to determine the first long pause of a code and the higher numbered relay should operate relay PD to determine the second long pause of a code.

With the contacts of these relays arranged as shown in FIG. 11, as the counting chain runs up from C1 to C5, the contacts of relays GS1 to GS5 on the left will be scanned first, with the lowest numbered GS— relay taking preference. As the counting chain continues, the contacts of relays GS2-GS5 on the right will be scanned last, with the highest numbered GS— relay taking preference. A similar arrangement of contacts holds for point selection relays PS1-PS5.

(5) Referring to a Controlled Station (FIGS. 20-21), a plurality of s— relays may be released at a given time and one or a plurality of relays og— may be operated at a given time.

Assuming that relays og1 and og2 are both released relay og1 at its contacts og1-1 completes a circuit to the first horizontal code lead and at contacts og1-4 cuts off relay og2 (and all higher numbered og— relays). Thus relay og1 determines the first long pause. Relay og1 at its contacts og1-2, completes a circuit to the second horizontal code lead and at contacts og1-5 cuts relay og2 off. Thus relay og1 also determines the second long pause. When the counting chain scans the horizontal code leads from top to bottom, it will find a signal from the left contacts of relays og— first and a signal from the right contacts of relays og— second.

It should be observed that in FIG. 11 two relays operated in a two out of five code for group selection, and that the contacts of one of these relays in the left column provided the first long pause and the contacts of another of these relays in the right column provided the second long pause. Only one pair of relays for a single code can be operated at a time. Contrasting with this, in FIG. 20, a single outgoing group relay og— provides contacts in the left column for the first long pause and contacts in the right column for the second long pause. Relays for more than one group code can be operated at a time. Therefore in FIG. 20 any operated og— relay takes precedence over any higher numbered og— relay in both columns.

The functioning of relay pd to insert the long pauses selectively determines the register relays which will operate in FIG. 28, to determine the group selection relays which operate in FIG. 22 to determine the contacts pairs g1a-1, g1a-2, or g2a-1, g2a-2, etc., which will close in FIGS. 20-21, to determine which group of s— relays will be scanned for point selection.

If relay og1 is operated contacts g1a-1, g1a-2 become operated; if relay og2 is operated contacts g2a-1, g2a-2, become operated, etc. Assuming that contacts g1a-1 and g1a-2 become operated, as the counting chain scans the five horizontal code leads at the bottom of FIG. 20, the lowest numbered s— relay takes precedence in similar fashion to the group precedence. Relays s— are normally operated however and release to initiate a reporting operation. Accordingly if relays s1 and s2 both release, break contacts s1-2 close and make contacts s1-1 open, giving relay s1 preference over s2 (and all higher relays) in the left column. Also break contacts s1-3 close and make contacts s1-4 open, giving relay s1 preference in the second column.

During automatic reporting of a number of changes which occur substantially simultaneously or during a station check, the lowest numbered og— relay takes preference and keeps preference until all s— relays associated therewith have been restored during successive reportings, whereupon that og— relay releases, and contacts of the next og— relay take precedence and keeps precedence until all s— relays associated therewith have been restored during successive reportings. This procedure continues until all s relays of the system have been restored.

The system inherently includes certain desirable and reliable self-controlling features. That is, if relay og2 is operated, placing positive on the first code lead through contacts og2-1 for the first long pause which has been transmitted and that relay og1 operates before the second long pause can be transmitted. The second long pause will be determined by positive potential through contacts og1-2 on the second code lead, and contacts g1a-1 and g1a-2 close to initiate a reporting from the points of group 1 instead of a reporting from group 2 which began. However, no harm is done in that group 2 will report after group 1 has finished reporting.

Again, suppose group 8 is trying to report and group 7 tries to report before the second long pause has occurred. Positive potential through contacts og8-1 obtains on the third code lead, producing a long pause on the third space. Normally, positive potential through contacts og8-2 would obtain on code lead 4, producing a long pause on the fourth space, but it is assumed that relay og7 operates before the counting chain has scanned the fourth code lead. Contacts og7-5 now remove the positive potential from the fourth code lead and contacts og7-2 place positive potential on the fifth code lead, producing a long pause on the fifth space. Thus long pauses produced on the third and fifth spaces corresponds to group 9 which results in the operation of relays g9a-1 and g9a-2 indicated, but not shown. As no change has occurred in this group, no s— relay is released, and hence the Controlled Station transmits six pulses for point selection containing no long pauses. Accordingly no register relays are operated at Controlled and Control Stations.

At the Control Station, when contacts SS-4 open, contacts PC-11 do not close, and accordingly the circuit of relay AR is open to permit the slow release thereof, and at its contacts AR-2 operates reset relay RS. Relay RS at its contacts RS2 reoperates relay AR and relay TR which operates relay LN which releases relay RL. Relay TR also operates relay ln for reset. Relay RL removes positive potential from the indirect positive bus, opening the circuit of relay RS which had locked through contacts RS-3. When slow release relay RS releases, it releases relay TR which releases relay LN which reoperates relay RL establishing positive potential on the indirect positive bus. Thereupon relay AR holds through its contacts AR-2 (as relay AR has a slow enough release characteristic to keep its contacts AR-1 closed until positive potential was restored to the indirect positive bus) and contacts C0-11 and IS-7. Accordingly the system is reset.

If an s— relay had been released, a point selection code containing two long pauses would have been transmitted selecting this point at the Control and Controlled Stations, and the reporting for this point would go to completion. Accordingly a reporting on a point in a group not intended would result, with no harm done, the system would reset at the end of the reporting, and the original changed point would report in.

(6) Contacts sc-7 (FIG. 28) allow a point to be selected for station check which is a raise-lower point. Open contacts sc-7 under these circumstances allow return of indication code after 4-5 code, allowing completion of sequence and reset so that other points may report.

(7) With the system at rest, relay AR (FIG. 19) is held operated over the path which extends from the indirect positive bus through contacts C0-11, IS-7, AR-1, and the winding of relay AR to the negative bus. Relay AR is a slow to release relay and will become released only if an abnormal pause occurs. In performing a control from the Control Station, the system relays operate and release, holding relay AR if no abnormal pause occurs and releasing relay AR if an abnormal pause occurs.

More specifically, during the transmission of the group selection code, contacts C0-11 open, removing the holding circuit through contacts C0-11 and IS-7, but contacts TC-6 close. During the transmission of a long pause, contacts TC-6 open but contacts PD-5 close. At the end of the group selection code contacts C0-11 close, re-establishing the holding circuit through contacts IS-7. This same procedure holds for the point selection code.

During the reception of the open indication code contacts C0-11 open but contacts SS-4 open and close, holding relay AR. At the end of the open indication code, contacts C0-11 close and hold relay AR. An interval may ensue before the attendant depresses the Control Key.

During the transmission of the control code, contacts C0-11 open but contacts TC-6 and PD-5 in operating and releasing, hold relay AR. Thus it can be seen that between codes, the circuit through contacts C0-11 and IS-7 hold relay AR. During the reception of the indication code following the control, contacts SS-4 close and open, holding relay AR. During the transmission of the indication check code, contacts C0-11 open but contacts TC-6 and PD-5 in operating and releasing, hold relay AR. At the end of the indication check code, contacts C0-11 close and relay AR is held over contacts C0-11 and IS-7. When the reset relay RS operates during reset, contacts RS-2 hold relay AR to the indirect positive bus in parallel with the circuit through contacts C0-11 and IS-7 until relay RL releases to disconnect positive potential from the indirect positive bus. Normally reset is completed and positive potential re-established to the indirect positive bus reoperating relay C0 which closes contacts C0-11 reestablishing the holding circuit through contacts IS-7 before relay AR can go through its slow release period.

Thus at the various stages, relay AR is held operated by relays going up and down and if, due to any cause, any remaining holding circuit is opened beyond the release period of relay AR, relay AR releases and at its contacts AR-2 (FIG. 19) operates relay RS to effect reset of the system. For example: relay SS is cocked during reception of pulses and releases if a long space is received, but reoperates before relay AR can release if the next mark period is forthcoming without delay. However, if a space is prolonged, contacts SS-4 remain open sufficiently long for relay AR to release and initiate reset.

During a reporting from a Controlled Station, and with the system at rest, relay AR is normally operated over contacts C0-11, IS-7, and AR-1. As the Control Station receives the group selection code, contacts IS-7 open and remain open until reset, and contacts C0-11 open at the beginning of the code and remain open until the end. During the receipt of the group selection code, contacts SS-4 close and open three times, holding relay AR. At the end of the group selection code contacts C0-11 close and contacts SS-4 open, but contacts GC-12 close momentarily giving relay AR a brief energizing pulse. Contacts SS-4 close at the beginning of the point selection code before relay AR has had a chance to release. Contacts SS-4 close and open three times during receipt of the point selection code, holding relay AR. If pause is prolonged relay AR releases in similar fashion to that described for group selection. Contacts C0-11 close at the end of the point selection code and thereafter when contacts PC–11 momentarily close, relay AR is again momentarily energized to hold it operated until relay SS operates at the beginning of the receipt of the indication code.

Contacts SS–4 close and open three times during the open indication code, holding relay AR. At the end of the indication code, contacts CO–11 close and contacts ID–6 momentarily close, giving relay AR a brief energizing pulse. There after contacts TC–6 normally close at the beginning of the indication check code before relay AR can release. Shortly thereafter contacts CO–11 open. During transmission of the indication check code contacts TC–6 and PD–5 open and close, holding relay AR. At the end of the indication check code, after both of contacts TC–6 and PD–5 have released, contacts RS–2 close, holding relay AR energized until relay RL de-energizes the indirect positive bus. During reset contacts IS–7 close. Normally before relay AR can release, relay RL reoperates connecting positive potential to the indirect positive bus reoperating relay CO, which closes its contacts CO–11 holding relay AR though contacts IS–7.

(8) Relay $ar$ at the Controlled Station (FIG. 30) is normally held operated in the at rest position over the path which extends from the direct positive bus over contacts $co$–12, $os$–4, $is$–7, and the winding of relay $ar$ to the negative bus. Contacts $is$–7 open at the beginning of a control operation initiated by the Control Station and remain open until reset. At the beginning of the group selection code, contacts $ss$–3 close before contacts $co$–12 open, contacts $ss$–3 closing and opening three times during the group selection code. Contacts $ss$–3 open during receipt of a long pause, and if the pause is prolonged, release relay $ar$ which at its contacts $ar$–1 operates relay $rs$ to reset the system.

At the end of the group selection code, contacts $co$–12 close and shortly thereafter contacts $ss$–3 open. Immediately after contacts $ss$–3 open, contacts $gc$–12 close momentarily giving relay $ar$ a brief energizing pulse. If less than two register relays had operated as a result of the receipt of less than two long pauses, contacts $gc$–12 would not have closed and relay $ar$ would have released. Normally the momentary energization through contacts $gc$–12 enables relay $ar$ to hold until contacts $ss$–3 operate at the beginning of the receipt of the point selection code. Contacts $ss$–3 close and open three times during the point selection code holding relay $ar$.

At the end of the poin selection code contacts $co$–12 close, and shortly thereafter contacts $ss$–3 open and immediately contacts $pc$–12 close momentarily, giving relay $ar$ a brief energization pulse which holds relay $ar$ until contacts $ds$–3 close at the beginning of the open indication code. If less than two long pauses are received, relay $pc$ does not operate and relay $ar$ releases, effecting reset. Contacts $ds$–3 remain closed during the indication code holding relay $ar$.

At the end of the indication code contacts $co$–12 close and immediately thereafter contacts $cs$–3 and relay $ar$ is held over the circuit which extends from the direct positive bus over contacts $co$–12, $cs$–3. Thereafter contacts $ds$–3 open, and such condition exists before the attendant operates the control key.

Upon receipt of the Close Control code, contacts $ss$–3 close and shortly thereafter contacts $co$–12 open. Contacts $ss$–3 close and open three times during receipt of the control code. At the end of the control code, contacts $co$–12 close and shortly thereafter contacts $ss$–3 open. When contacts $co$–12 closed, a circuit was completed through contacts $cs$–3 to hold relay $ar$. If less than two long pauses were received relay $inc$ (FIG. 28) would not operate. Assuming however, that two long pauses are received, contacts $cs$–3 open and shortly thereafter contacts $ds$–3 close at the beginning of transmittal of the indication code by the Controlled Station. Contacts $ds$–3 remain closed during transmittal of the indication code.

Near the end of the indication code contacts $co$–12 close and immediately thereafter contacts $cs$–3 close. Sometime thereafter contacts $ds$–3 open. Contacts $ss$–3 close at the beginning of receipt of the indication check code, holding relay $ar$. During the receipt of the indication check code contacts $ss$–3 operate and release three times, holding relay $ar$. Near the end of the indication check code, contacts $co$–12 close before contacts $ss$–3 open and a circuit is completed through contacts $cs$–3, which have remained closed, to relay $ar$.

At the beginning of reset contacts $ss$–3 close, and during reset, contacts $cs$–3 open. Thereafter contacts $ss$–3 open, and after relay $rl$ reoperates to re-energize the indirect positive bus, contacts $co$–12 close. Normally this is accomplished before relay $ar$ can release.

During an automatic reporting operation the circuits of relay $ar$ are maintained in a similar manner. At the beginning of an automatic reporting operation contacts $os$–4 open and remain open until reset. Shortly thereafter contacts $ds$–3 close and remain closed during the transmission of the group code, point code, and indication code. Thus relay $ar$ is quite positively held, and is not dependent upon abnormal pauses as the Controlled Station is in control and not receiving over the channel. Contacts $ss$–3 close before contacts $ds$–3 open upon initiation of receipt of the indication check code. During the indication check code, contacts $ss$–3 close and open three times, holding relay $ar$. Near the end of the indication check code contacts $co$–12 close before contacts $ss$–3 open, and a circuit through contacts $cs$–3 then holds relay $ar$. At the beginning of the reset period, contacts $ss$–3 close. Later during reset contacts $cs$–3 open and $os$–4 close an interval thereafter contacts $ss$–3, and contacts $ds$–3 closed. When relay $rl$ releases, contacts $co$–12 close to establish a circuit through contacts $as$–4 and $is$–7, holding relay $ar$. Thereafter, contacts $ds$–3 open.

With reference to FIGURE 31 a modified circuitry for adapting the system for use with carrier, radio, or microwave operations is shown thereat. Both carrier channels are normally energized and relays RR and $rr$ are normally energized. Relays TR and $tr$ at contacts TR–1 and $tr$–1 respectively, transmit impulses to the other stations, and at contacts TR–4 and $tr$–4 respectively, energize relay LN or relay $ln$ locally to register impulses in the transmitting station.

Relays LSC, RL, $r1a$ and $rl$ are normally energized. If a channel failure occurs on the channel between the remote station transmitter and the master station receiver, relay RR releases and at contacts RR–1 operates relay LN which at contacts LN–4 releases relay RL, and in turn at contacts RL–1 releases relay LSC to sound an alarm, as previously described. If a channel failure occurs between the Master Station transmitter and the Remote Station receiver, relay $rr$ releases and at contacts $rr$–1 operates relay $ln$ which at contacts $ln$–4 releases relay $rl$ which at contacts $rl$–1 releases relay $r1a$. Relay $r1a$ at contacts $r1a$–1 opens the keying circuit to the carrier channel back to the Master Station which de-energizes relay RR and sounds the alarm as described above.

The normal de-energization of either channel during normal transmission of impulses is not long enough to release either relay LSC or relay $r1a$, which relays are connected to detect the abnormally long interruption of the signal which occurs when the channel fails.

It should be noted that when, on a reset operation, reset relay RS operates and at its contacts RS–6 disconnects the winding of relay LSC from the indirect positive bus, contacts RS–7 and LSC–2 reconnect the winding of relay LSC to the direct positive bus to prevent relay LSC from releasing during a normal reset operation.

The further operations of the arrangement are similar to those previously described.

While what is described is regarded to be a preferred embodiment of the invention, it will be apparent that variations, rearrangements, modifications and changes

What is claimed is:

1. In a supervisory system including at least a first and a second station connected over a communication channel, a plurality of functional units divided into groups and points in a group, each group of points being preassigned a different group selection code signal, and each point in a group being assigned a different point selection code signal, each code signal being of a self-checking code in which each signal is comprised of a group of six pulses each of which is comprised of a marking and spacing element, certain of the spaces less than the total spaces in the code being elongated, the position of the elongated spaces being varied to provide different codes; signal generator means at said first station, at least, for generating impulses, control means for controlling the number of marks and spaces generated for each code signal by said signal generator means, and selection means at one point at least including a first means operative to enable said control means to effect the generation of a group selection code of six impulses including a first and a second elongated space at the point assigned to the code for the group of points which includes said point, and a second means at said point operatively controlled by said first means responsive to complete transmission of said group selection code to enable said control means to effect the generation by said signal generator means of a point selection code signal having six impulses including a first and a second elongated space at the positions assigned to the code signal for the point.

2. In a supervisory system including at least a first and a second station connected over a communication channel, a plurality of functional units divided into groups and points in a group, each group of points being preassigned a different group selection code signal, and each point in a group being assigned a different point selection code signal, each code signal being of a self-checking code in which each signal is comprised of a fixed, like number of impulses having marking and spacing elements and including a fixed number of spaces less than the total spaces in the code which are elongated, the position of the elongated spaces being varied to provide different code signals; signal generator means at the first station, at least, for generating impulses for transmission over said channel, control means for determining the number and duration of marks and spaces in each group generated by said signal generator means, and selection means at certain of said points at said first station including a first means operative at each of said certain points to energize said control means to effect the generation of a group selection code signal having elongated spaces at the positions assigned to the code for the group of points which includes the point, and a second means at said first station operative responsive to complete transmission of said group selection code by said first means to immediately energize said control means to generate a point selection code signal having the elongated spaces at the positions assigned to the code for the point, means for coupling the generated impulses to said channel and circuit means at said second station operative only responsive to the receipt of said coded signals over said channel to effect selection of the point in the group identified by the elongated spaces in the group and point selection code signals, and means at said second station operative in response to the selection of the point to initiate the transmission of an indication signal in said self-checking code to said first station, the positions of the elongated spaces in the signal indicating the condition of the equipment at the selected point.

3. In a supervisory system including at least a control and a controlled station connected over a communication channel, a plurality of functional units at each station divided into groups and points in a group, each group of points being preassigned a different group selection code signal, and each point in a group being assigned a different point selection code signal, each code signal being of a self-checking code in which each signal has a fixed number of impulses and a fixed, like number of elongated spaces less than the total spaces in the code, the position of the elongated spaces being variable to provide different code signals, channel responsive means including signal generator means at the control station for generating impulses for transmission over said channel, control means for controlling the number and duration of the impulses generated by said signal generator means, selection means at one point at least at the control station for energizing said control means to enable the signal generator means to generate a group selection code signal of said fixed number of impulses including the elongated spaces at the positions assigned to the code signal for the group of points which includes said point, and thereafter a point selection code signal having said fixed number of impulses including the elongated spaces at the positions assigned to the code for the point, and signal responsive means at the controlled station, selection means operatively controlled by said signal responsive means responsive to the receipt of said group and point code signal at the controlled station to select the point identified by the elongated spaces in the received signals, and means at said point operative responsive to selection of the point to initiate generation of an indication code signal, the position of the elongated spaces in the indicator code signal indicating the condition of the functional unit at said point for transmission over the channel.

4. In a supervisory system including at least a control and a controlled station connected over a communication channel, a plurality of functional units at each station divided into groups and points in a group, each group of points being preassigned a different group selection code signal, and each point in a group being assigned a different point selection code signal, each code signal having a fixed, like number of elongated spaces less than the total spaces in the code which are elongated, the position of the elongated spaces being variable to provide different codes; signal generator means including signal responsive means at said control station for generating impulses for transmission over said channel, control means for controlling the number and duration of the impulses generated by said signal generator means, selection means at one point at least at said control station for energizing said control means to enable the signal generator means to generate a group selection code for a point, and thereafter the point selection code for said point; signal generator means including signal responsive means at the controlled station, group and point selection means operatively controlled by said signal responsive means at the controlled station in response to the receipt of a group and point selection code signal from the control station to select the point indicated by the positions of the elongated space in said group and point selection codes, means at said point operative to initiate the generation of coded indication signals by said signal generator means, the position of the elongated spaces in the signal indicating the condition of the functional unit at said point, indication means at said other station, and comparison means operatively controlled by said signal responsive means in response to the receipt of the indication signals over the channel to energize the indication means to identify the condition of the functional unit at said point at the controlled station.

5. An arrangement as set forth in claim 4 which includes storage means at said point in the control station for marking the last reported condition of the functional unit at the corresponding point in the controlled station, and indication disagreement means operatively controlled by said storage means responsive to a disagreement between the marked condition of the functional unit and the condition indicated by said code indication signal.

6. An arrangement as set forth in claim 4 which includes storage means at said point in the control station for marking the last reported condition of the functional unit at the corresponding point in the controlled station, and indication agreement means operatively controlled by said storage means responsive to an agreement between the marked condition of the functional unit and the condition indicated by said code indication signal.

7. An arrangement as set forth in claim 5 which includes indication finish means operative subsequent to the comparison of the last reported condition of said point and the condition indicated in said code to indicate the completion of the selection of the point at the control and controlled stations for control purposes.

8. An arrangement as set forth in claim 5 which includes means controlled by operation of said indication disagreement means to change the condition of the functional unit previously registered at said point to the condition indicated by the indication code.

9. An arrangement as set forth in claim 5 in which said functional unit at the controlled point is operative between a closed position, an open position, and a position between the closed or open position, and in which the indication disagreement relay at the control station is operatively controlled in response to the receipt of a code indicating that the unit is between the two conditions and the storage means are marked to indicate one of the two extreme conditions.

10. In a supervisory system, a plurality of stations connected over a communication channel, a plurality of functional units divided into groups and points in a group, each group of points being preassigned a different group selection code signal, and each point in a group being assigned a different point selection code signal, each code signal having a fixed, like number of elongated spaces less than the total spaces in the code signal which are elongated, the position of the elongated spaces being variable to provide different code signals; signal generator means at one station at least for generating impulses, control means for controlling the number and duration of the impulses generated by said signal generator means including a pause determination relay connected to control the generation of the elongated spaces by said signal generator means, a first register including a plurality of group selection relays for marking the group of the desired point and the group selection code to be transmitted therefrom, a second register including a plurality of point selection relays for marking the identity of the desired point, and the point selection code to be transmitted therefor, function control means for controlling transmission of different control codes, indication means for controlling the transmission of different indication codes, and energizing circuits connected to said pause determination member controlled by said group selection relays, said point selection relays, said function control means and said indication code means to selectively operate same in the provision of the elongated space by said signal generator means at the desired interval in the outgoing codes.

11. In a supervisory system, a plurality of stations connected over a communication channel, a plurality of functional units divided into groups and points in a group, each group of points being preassigned a different group selection code signal, and each point in a group being assigned a different point selection code signal, each code signal having a fixed, like number of impulses and a number of elongated spaces less than the total spaces in the code signal which are elongated, the position of the elongated spaces being variable to provide different code signals; signal generator means at each station for generating impulses, control means for controlling the number and duration of the impulses generated by said signal generator means including a pause determination switching member connected to control said signal generator means in the generation of the elongated spaces, a first register including a plurality of five group selection relays for marking the identity of the desired group in a two out of five marking pattern, a second register including a plurality of point selection means for marking the desired point in a two out of five marking pattern, and selection means for one point at least operative as enabled to energize the two group selection relay indications and the two point selection relays which identify the group and point of said point in said pattern.

12. In a supervisory system including at least a control and a controlled station connected over a communication channel, a plurality of functional units at each station divided into groups and points in a group, each group of points being preassigned a different group selection code signal, and each point in a group being assigned a different point selection code signal, each code signal having a fixed, like number of elongated spaces less than the total spaces in the code signal which are elongated, the position of the elongated spaces being variable to provide different code signals; signal generator means including channel responsive means at said control station, control means for controlling the number and duration of the impulses generated by said signal generator means, selection means at one point at least at said control station for energizing said control means to enable the signal generator means to generate the group selection code for a point, and thereafter the point selection code for said point; signal generator means including channel responsive means at the controlled station, control means energized by said channel responsive means responsive to receipt of a group and point selection code from the control station to select the point identified by the position of said elongated spaces in said group and point selection codes and to effect the transmission of a signal in said code over said channel to identify the condition of the apparatus for the point selected, indication means at said control station controlled by said channel responsive means responsive to receipt of the indication code thereat to indicate the condition of the functional unit at said point at the controlled station, selective control means selectively operative to initiate the generation of a control code for effecting operation of the functional unit at said point at said controlled station, and means at said controlled station energized by said channel responsive means responsive to receipt of a control code to effect the control operation, and to thereafter initiate the generation of an indication code signal to said control station, the position of the elongated spaces in the signal indicating the condition of the functional unit at the point subsequent to the control operation, indicator means at said control station, and comparison means at said control station energized by the channel responsive means thereat in response to receipt of the indicator code to compare the condition indicated by the received code with the condition previously registered on the indicator means, and indicator check code means at the control station operative thereafter to initiate transmission of an indication check code to the controlled station for checking purposes.

13. A supervisory system as set forth in claim 12 in which said control station includes reset means operative after operation of said check means to initiate the generation and transmission of a reset signal by said control means.

14. In a supervisory system including at least a control and a controlled station connected over a communication channel, a plurality of functional units at each station divided into groups and points in a group, each group of points being preassigned a different group selection code signal, and each point in a group being assigned a different point selection code signal, each code signal being comprised of mark and space elements and having a fixed, like number of elongated spaces less than the total spaces in the code signal which are elongated, the position of the elongated spaces being variable to provide different codes; signal generator means at the controlled station for generating impulses including channel responsive means for receiving impulses over said channel, control means for controlling the number and duration of the impulses generated by said signal generator means, selection means at one point at least at the controlled station for energizing said control means and said signal generator means to transmit the group selection code signal for a point, and thereafter the point selection code signal and an indication code signal for said point over said channel, the elongated spaces in each code identifying the point to be selected at the control station, signal generator means including channel responsive means at the control station for receiving impulses transmitted over said channel, check means operatively controlled by said channel responsive means responsive to receipt of the group selection and point selection codes to check the point indicated by the elongated spaces in the group and point selection codes, means responsive to receipt of the indication code to effect a functional operation at the selected point, and means operative responsive to completion of said functional operation to initiate generation of an indication check code for transmission over the channel to said controlled station.

15. A system as set forth in claim 14 which includes reset means operative responsive to complete transmission of the indication check code by said check means to generate the transmission of a reset signal.

16. In a supervisory system including a plurality of stations connected over a communication channel, a plurality of functional units divided into groups and points in a group, each group of points being preassigned a different group selection code signal, and each point in a group being assigned a different point selection code signal, each code signal being comprised of mark and space elements and having a number of elongated spaces less than the total spaces in the code which are elongated, the position of the elongated spaces being variable to provide different codes, different points of different groups being assigned to different stations; signal generator means at each station for generating impulses including channel responsive means for receiving the code signals, control means including register means for controlling the number and duration of the impulses generated by said signal generator means, selection means at one point at least at said stations for energizing said control means and said signal generator means to generate a group selection code signal for a point, and thereafter the point selection code signal for said point; group selection means at each of the other stations connected to operate only at the stations in the group identified by said group selection code signal in response to the receipt of said group selection code signal to prepare the station to respond to the point selection code signal, point selection means at each station for each point in said group, lockout means for each station, and means including said register means at each station connected only at the station including the point identified by the elongated elements in the group and point selection codes to complete a circuit for the point selection means identified in the code and connected at the other stations which include points in said group to complete a circuit to the lockout means.

17. In a supervisory system, a plurality of stations connected over a communication channel, a plurality of functional units divided into groups and points in a group, each group of points being preassigned a different group selection code signal, and each point in a group being assigned a different point selection code signal, each code signal being comprised of mark and space elements and having a number of elongated spaces less than the total spaces in the code which are elongated, the position of the elongated spaces being variable to provide different code signals at each station; and signal generator means for generating impulses including channel responsive means for receiving impulses, control means for controlling the number and duration of the impulses generated by said signal generator means, selection means at one point at least at said stations for energizing said control means to enable the signal generator means to generate a group selection code signal for a point including a final check pulse, and thereafter the point selection code for said point including a final check pulse position of the elongated spaces identifying the point to be selected, and lockout means at certain of said stations at least operative to terminate generation of a code by the signal generator means thereat responsive to generation of an elongated space by its signal generator means during the period that said channel responsive means receives a marking element transmitted over the channel by another one of said stations, whereby only one station of the plurality will be enabled at any given time.

18. A supervisory system as set forth in claim 17 in which one of said stations includes reset means for resetting said system, and circuit means connected to energize said reset means responsive to the generation of an elongated space by the signal generator means thereat during the period that the channel responsive means thereat is operated by a marking element on the channel.

19. In a supervisory system, a plurality of stations connected over a communication channel, a plurality of functional units divided into groups and points in a group, each group of points being preassigned a different group selection code signal, and each point in a group being assigned a different point selection code signal, each code signal being comprised of marking and spacing elements and having a fixed number of elongated spaces less than the total spaces in the code which are elongated, the position of the elongated spaces being variable to provide different codes; signal generator means at each station for generating impulses including channel responsive means for receiving impulses, control means for controlling the number and duration of the impulses generated by said signal generator means, selection means at one point at least in said stations for energizing said control means to enable the signal generator means to generate a group and a point selection code for a point, and lockout means at certain of said stations at least for terminating generation of a code by the signal generator means thereat responsive to generation of an elongated space by its signal generator means during the period that a marking element is transmitted over the channel by another one of said stations, whereby only one station of the plurality in the system will be enabled at any given time, and the one of the stations which is transmitting the code having the elongated spaces at the highest order of the code sequence will be given priority.

20. An arrangement as set forth in claim 19 which includes selection means for enabling said control means to initiate the transmission of a station check code for the purpose of effecting an automatic reporting of each point in the system, and in which said station check code is assigned the code in which the two elongated elements occurs at the two highest orders of the code sequence.

21. In a supervisory system, a plurality of stations connected over a communication channel, a plurality of functional units divided into groups and points in a group, each group of points being preassigned a different group selection code signal, and each point in a group being assigned a different point selection code signal, each code signal having a number of elongated spaces less than the total spaces in the code signal which are elongated, the position of the elongated spaces being variable to provide different code signals; signal generator means at each station for generating impulses, control means for controlling the number and duration of the impulses generated by said signal generator means, selection means at one point at least at said stations for energizing said control means and the signal generator means to generate a group selection code for a point, and thereafter the point selection code for said point, means at the station including said point operative to select the point identified by the elongated spaces in the code signal, and reset means at said station operative to reset the system responsive to the automatic change of condition of a functional unit at another point at the station subsequent to selection of said point and prior to the receipt of a control code signal thereat, whereby preference is provided in the system for automatic reporting of a change of position at a point.

22. An arrangement as set forth in claim 21 which includes substation preference lockout means operative in response to receipt of a control code signal to prevent reset of the system by said reset means responsive to an automatic change of condition of a functional unit at a point thereafter.

23. A supervisory system as set forth in claim 21 in which said reset means includes detection means which are operated responsive to the occurrence of an abnormal pause in the codes to energize said reset means.

24. In a supervisory system, a plurality of stations connected over a communication channel, a plurality of functional units divided into groups and points in a group, each group of points being preassigned a different group selection code signal, and each point in a group being assigned a different point selection code signal, each code signal having a number of elongated spaces less than the total spaces in the code signal which are elongated, the position of the elongated spaces being variable to provide different code signals; signal generator means at each station for generating impulses, control means for controlling the number and duration of the impulses generated by said signal generator means, means at one point at one of said stations at least operative in response to the change of position of a functional unit thereat to automatically energize said control means and the signal generator means to generate a group selection code signal for said point, a point selection code signal for said point, and an indication code to report said changes to a second station, the position of the elongated spaces in the group and point selection codes identifying the point to be selected, and repeat lockout means at said station for repeating generation of the codes a predetermined number of times by the signal generator means thereat responsive to failure of the second station to return an indication check code.

25. In a supervisory system including at least a first and a second station connected over a communication channel, a plurality of functional units divided into groups and points in a group, each group of points being preassigned a different group selection code signal, and each point in a group being assigned a different point selection code signal, each code signal being of a self-checking code in which each signal has a fixed, like number of impulses comprised of marking and spacing elements and includes a number of elements less than the total elements in the code which are elongated, the position of the elongated elements being varied to provide different code signals; circuit means at the first station, at least, operative to transmit, in immediate succession, a group and point selection code signal having elongated elements at the positions assigned to the code signals for the group and point to be selected, and circuit means at said second station including means operative responsive to the receipt of said coded signals over said channel to effect selection of the point identified by the position of the elongated elements in the group and point selection code signals, and means at said second station operative in response to selection of the point to control transmission of an indication signal in which the elongated elements are positioned to identify the condition of the functional unit at the selected point.

26. In a supervisory system including at least a first and a second station connected over a communication channel, a plurality of functional units divided into groups and points in a group, each group of points being preassigned a different group selection code signal, and each point in a group being assigned a different point selection code signal, each code signal being of a self-checking code in which each signal has a fixed, like number of impulses comprised of marking and spacing elements and includes a number of elements less than the total elements in the code which are elongated, the position of the elongated elements being varied to provide different code signals; circuit means at one of said stations, at least, operative to transmit, in immediate succession, a group selection code, a point selection code signal and an indication code, the position of the elongated elements in the group and point selection code identifying the desired group and point, and the position of the elongated elements in the indication code identifying the condition of the functional unit at the point, and circuit means at the other station including means operative responsive to the receipt of said coded signals over said channel to effect selection of the point identified by the elongated elements in the group and point selection code signals.

27. In a supervisory system including at least a first and second station connected over a communication channel, a plurality of functional units divided into groups and points in a group, each group of points being preassigned a different group selection code signal, and each point in a group being assigned a different point selection code signal, each code signal being of a self-checking code in which each signal has a fixed, like number of impulses comprised of marking and spacing elements and includes a number of elements less than the total elements in the code which are elongated, the position of the elongated elements being varied to provide different code signals; circuit means at one of said stations, at least, operative to transmit, in immediate succession, a group selection code, a point selection code signal and an indication code, the position of the elongated elements in the group and point selection code identifying the desired group and point, and the position of the elongated elements in the indication code identifying the condition of the functional unit at the point, circuit means at the other station including means operative responsive to the receipt of said coded signals over said channel to effect selection of the point identified by the elongated elements in the group and point selection code signals, and means at said other station operative in response to selection of the point to control transmission of an indication check code to said one station.

28. In a supervisory system including at least a first and a second station connected over a communication channel, a plurality of functional units divided into groups and points in a group, each group of points being preassigned a different group selection code signal, and each point in a group being assigned a different point selection code signal, each code signal having a fixed, like number of impulses comprised of marking and spacing elements, certain of said elements less than the total elements in the code being elongated, the position of the elongated elements being varied to provide different code signals; signal generator means at the first station, at least, for generating impulses for transmission over said channel, control means for determining the number and duration of elements in each group generated by said signal generator means, and selection means at certain of said points at said first station including a first means operative at each of said certain points to energize said control means to effect the generation of a group selection code signal having elongated elements at the positions assigned to the code for the group of points which includes the point, and a second means operative to energize said control means to generate a point selection code signal having the elongated elements at the positions assigned to the code for the point, and means in said control means connected common to said first and second means including common counting means for counting the elements in each code signal, and a common code stop means controlled by said counting means responsive to the generation of the last element of each of said coded signals to terminate the generation of the code signal.

References Cited in the file of this patent

UNITED STATES PATENTS

| | | |
|---|---|---|
| 2,409,696 | Lewis | Oct. 22, 1946 |
| 2,411,375 | Jackel | Nov. 19, 1946 |
| 2,492,766 | Purcell | Dec. 27, 1949 |
| 2,616,959 | Breese et al. | Nov. 4, 1952 |
| 2,623,939 | Deer | Dec. 30, 1952 |
| 2,629,088 | Kendall | Feb. 17, 1953 |
| 2,698,425 | Miller | Dec. 28, 1954 |
| 2,901,728 | Breese | Aug. 25, 1959 |